United States Patent
Shibata et al.

(10) Patent No.: US 7,653,128 B2
(45) Date of Patent: Jan. 26, 2010

(54) INFORMATION PROCESSING APPARATUS AND METHOD, RECORDING MEDIUM, AND PROGRAM

(75) Inventors: Shojiro Shibata, Kanagawa (JP); Shuji Tsunashima, Tokyo (JP); Kyohei Koyabu, Kanagawa (JP); Mototsugu Takamura, Kanagawa (JP); Shinjiro Kakita, Kanagawa (JP); Mitsuhisa Kaneko, Kanagawa (JP)

(73) Assignee: Sony Corporation, Tokyo (JP)

( * ) Notice: Subject to any disclaimer, the term of this patent is extended or adjusted under 35 U.S.C. 154(b) by 801 days.

(21) Appl. No.: 11/257,360

(22) Filed: Oct. 25, 2005

(65) Prior Publication Data

US 2006/0088286 A1  Apr. 27, 2006

(30) Foreign Application Priority Data

Oct. 26, 2004 (JP) ............................. 2004-311521
Aug. 24, 2005 (JP) ............................. 2005-242161

(51) Int. Cl.
*H04N 7/12* (2006.01)
*H04N 9/64* (2006.01)
*G06F 15/16* (2006.01)

(52) U.S. Cl. ............................ 375/240.01; 375/240.02; 375/240.03; 375/240.05; 348/715; 348/716; 709/201; 709/202; 709/203; 709/217; 709/219

(58) Field of Classification Search ............ 375/240.01, 375/240.02, 240.03, 240.05, E7.027, E7.088, 375/E7.093, E7.094, E7.179, E7.198, E7.211; 348/715, 716, E5.105, E5.108, E5.109, E7.073; 386/E5.002; 709/201, 202, 203, 217, 219
See application file for complete search history.

(56) References Cited

U.S. PATENT DOCUMENTS 5,943,102 A * 8/1999 Hoshi ......................... 348/715
6,028,632 A * 2/2000 Siong et al. ............. 375/240.01
6,798,833 B2 * 9/2004 Lee et al. ................ 375/240.03
7,123,657 B2 * 10/2006 Brightwell et al. ..... 375/240.24
7,346,650 B2 * 3/2008 Nomura et al. ............. 709/203

FOREIGN PATENT DOCUMENTS

| JP | 6-233242 | 8/1994 |
|---|---|---|
| JP | 2003-244643 | 8/2003 |
| JP | 2004-23303 | 1/2004 |

OTHER PUBLICATIONS

U.S. Appl. No. 11/255,205, filed Oct. 21, 2005, Shibata, et al.
Ingo Huetter, et al., "Entwicklung eines DVD-Players: Probleme und Loesungen", FKT Fernseh- UND Kino-Technik, vol. 53, No. 11, XP000947048, Nov. 1999, pp. 664-669.

* cited by examiner

*Primary Examiner*—Thai Tran
*Assistant Examiner*—Syed Y Hasan
(74) *Attorney, Agent, or Firm*—Oblon, Spivak, McClelland, Maier & Neustadt, L.L.P.

(57) ABSTRACT

An information processing apparatus for decoding compression-coded video data includes at least one decoder decoding the compression-coded video data, a supply controller controlling the supply of the compression-coded video data to the decoder, and a controller controlling processing executed by the supply controller and the decoder. The controller determines the order of decoding processing performed by the decoder so that, among pictures contained in a decoding processing unit for the decoding processing performed by the decoder, I-pictures and P-pictures are decoded before B-pictures. The controller selects pictures to be output from the decoder from among the pictures contained in the decoding processing unit on the basis of a playback speed instruction provided by a playback speed instruction unit.

24 Claims, 65 Drawing Sheets

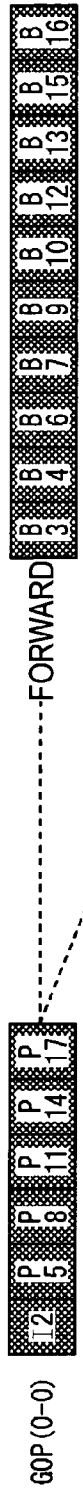
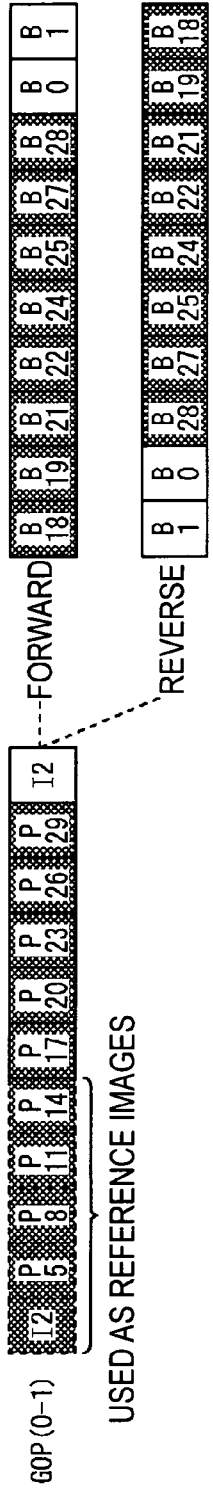
FIG. 49A
FIG. 49B

FIG. 50A
FIG. 50B

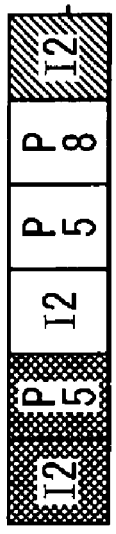
FIG. 53A
FORWARD GOP (0-0)
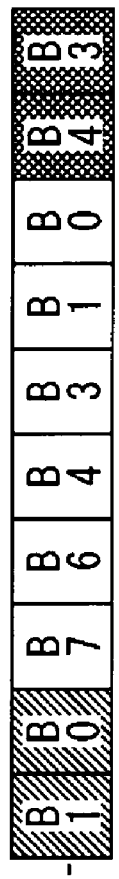
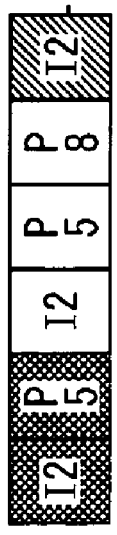
FIG. 53B
REVERSE GOP (0-0)

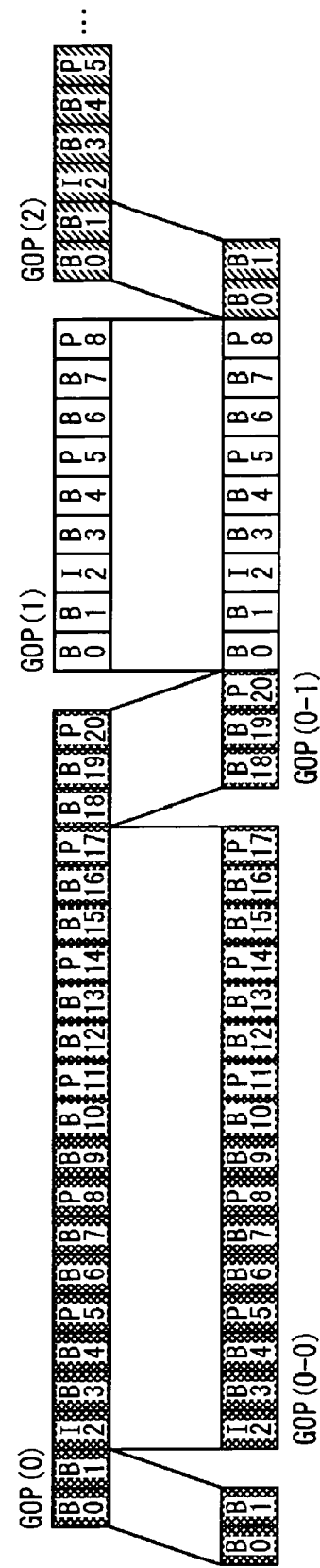

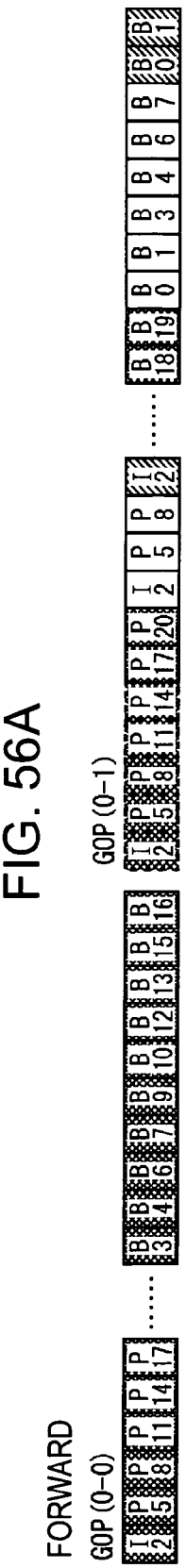
FIG. 56A
FIG. 56B

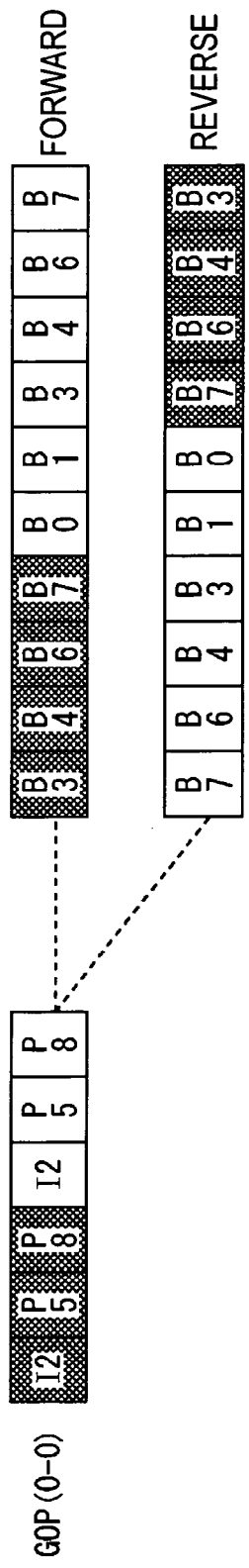
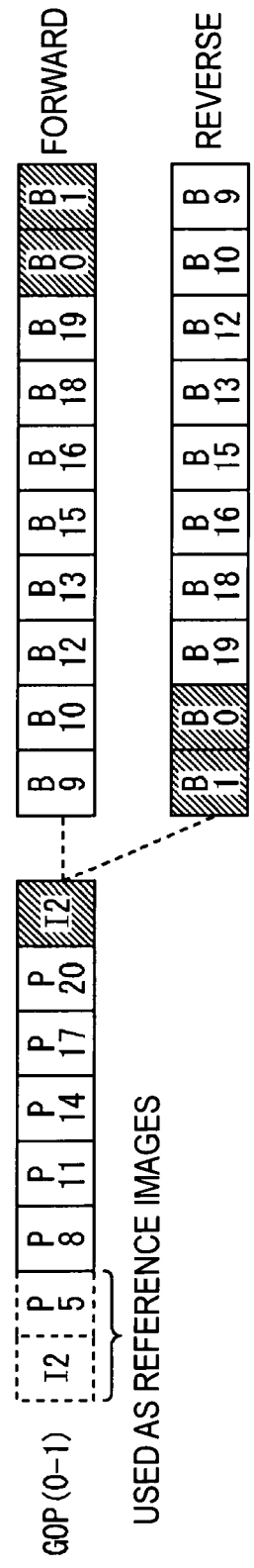
FIG. 58A
FIG. 58B

FIG. 59A
FIG. 59B
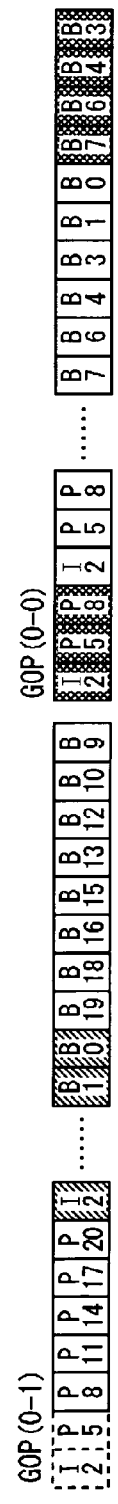

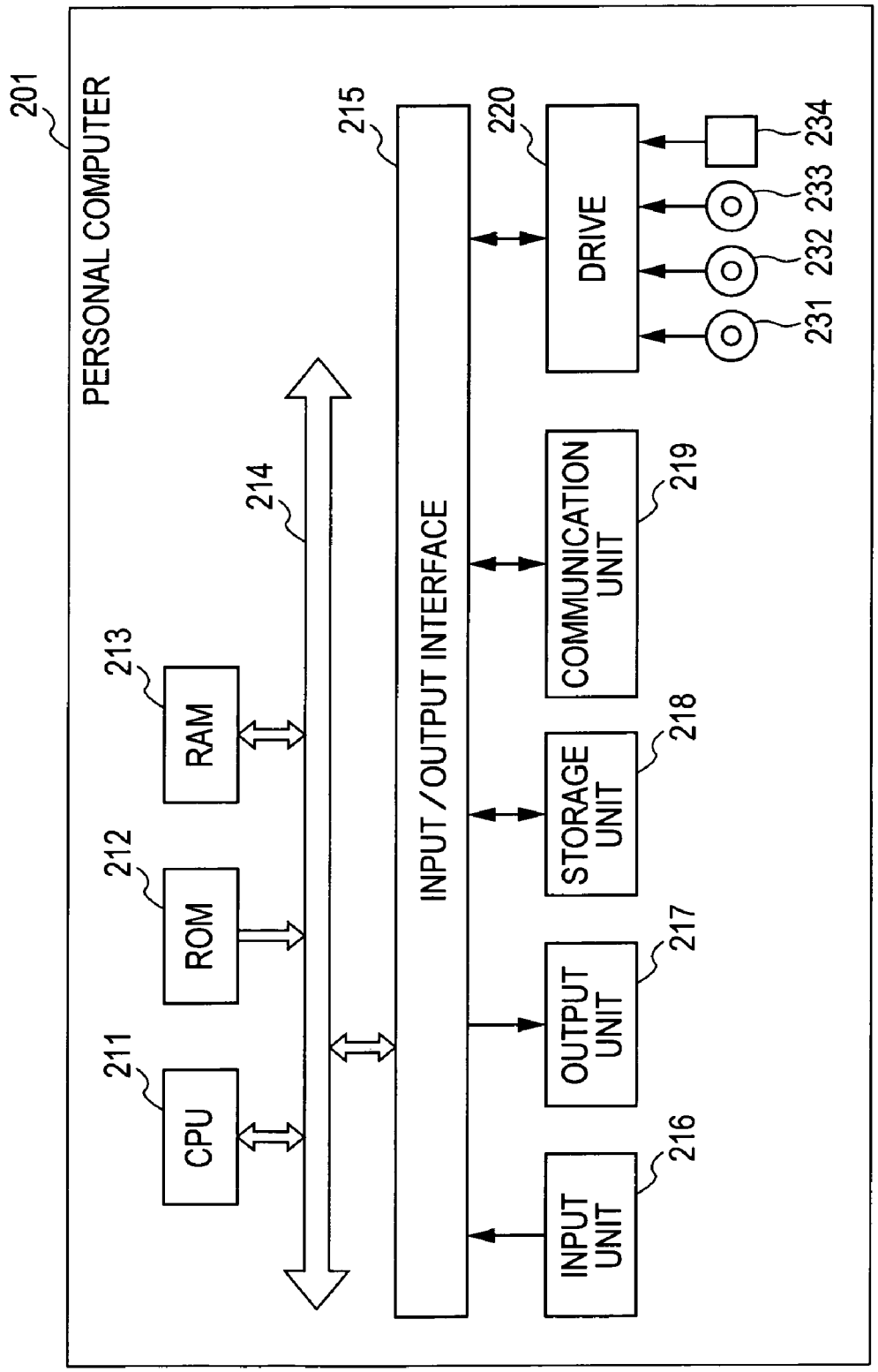

INFORMATION PROCESSING APPARATUS AND METHOD, RECORDING MEDIUM, AND PROGRAM

CROSS REFERENCES TO RELATED APPLICATIONS

The present invention contains subject matter related to Japanese Patent Application JP 2004-311521 filed in the Japanese Patent Office on Oct. 26, 2004 and JP 2005-242161 filed in the Japanese Patent Office on Aug. 24, 2005, the entire contents of which are incorporated herein by reference.

BACKGROUND OF THE INVENTION

1. Field of the Invention

The present invention relates to information processing apparatuses and methods, recording media, and programs. More particularly, the invention relates to an information processing apparatus and method, a recording medium, and a program in which compression-coded video data can be played back without performing complicated bank memory control.

2. Description of the Related Art

As video compression techniques, the Moving Picture Coding Group/Moving Picture Experts Group (MPEG) is widely used. Playback operations performed by decoding stream data coded by an MPEG method include, not only a normal playback operation, but also a fast playback operation or a reverse-direction playback operation.

For example, in MPEG long groups of pictures (GOPs), each GOP including 15 pictures, a fast playback operation can be performed at ×−3 to ×3 (the sign "−" in the speed indicates that the playback operation is performed in the reverse direction, and the same applies to the following description) by omitting bidirectionally predictive-coded (B)-pictures before being input into a decoder (for example, see Japanese Unexamined Patent Application Publication No. 8-98142). Additionally, a table indicating picture information to be displayed is provided for each playback speed so that playback operations can be performed at different speeds of the same number as that of tables.

Another playback technique is disclosed in Japanese Unexamined Patent Application Publication No. 8-56334. In this technique, 10 frames of a compression-coded signal are obtained intermittently at intervals of 5 frames. After demodulating all the 10 frames of the compression-coded signal, they are alternately supplied to two decoders, five frames to each decoder, and they are decoded and then written into a memory. The memory reads every other frame so that a ×2 playback signal can be output.

MPEG streams are best suited to a playback operation in the forward direction. For example, in MPEG long GOPs, the coding order of 15 pictures, i.e., intra-coded (I)-pictures, predictive-coded (P)-pictures, and B-pictures, forming one GOP is I(2), B(0), B(1), P(5), B(3), B(4), P(8), B(6), B(7), P(11), B(9), B(10), P(14), B(12), and B(13) (the numbers in parentheses indicate the order when the GOP pictures are rearranged in the display order from the coding order). P-pictures predict from one preceding I-pictures or P-pictures, and B-pictures predict from one preceding I-pictures or P-pictures and two preceding I-pictures or P-pictures in the coding order. Accordingly, by reserving two banks of a reference image memory, both the P-pictures and B-pictures can be decoded, thereby enhancing the efficient use of the memory.

To play back MPEG streams best suited to a forward-direction playback operation in the reverse direction, the following technique has been proposed in Japanese Unexamined Patent Application Publication No. 10-150635. A plurality of decoders are used for performing decoding processing, and a GOP immediately before a GOP to be decoded is added and the two GOPs are supplied to a decoder. This enables the correct use of reference images of pictures to be played back even in the reverse-direction playback operation.

SUMMARY OF THE INVENTION

In the technique disclosed in Japanese Unexamined Patent Application Publication No. 8-98142, although fast playback operations at ×−3 to ×3 can be implemented by omitting B pictures before being input into a decoder, the display interval of pictures becomes irregular, thereby making the displayed image unnatural.

The technique in which a plurality of decoder chips are used for performing decoding processing can be combined with processing for omitting B-pictures which are not to be displayed at the input stage. With this combination, a fast playback operation can be implemented (for example, ×2 with two decoder chips, ×4 with three decoder chips, ×5 with four decoder chips, and ×7 with five decoder chips) at regular intervals. In this case, however, the omission of I-pictures or P-pictures is necessary during output processing, which increases the complexity of the control operation for a baseband memory or processing for selecting data to be displayed from decoded data. Thus, it is difficult to perform a display operation by dynamically changing the playback speed by the use of known techniques.

As stated above, by providing a table indicating picture information to be displayed for each playback speed, playback operations at different speeds of the same number as that of the tables can be implemented. In this processing, however, the playback speed is switched in units of tables, and complicated control is required for smoothly displaying images when switching the speed.

As stated above, MPEG streams are best suited to a forward-direction playback operation. In a reverse-direction playback operation in the input order of MPEG streams, when performing a reverse-direction playback operation after decoding one GOP, a frame memory storing at least one GOP (for example, 15 frames) is necessary, and many reference image data banks should be reserved, thus requiring a large memory capacity.

In view of this background, it is desirable to achieve a fast playback operation, a reverse playback operation, and a reverse-direction fast playback operation by decoding compression-coded video data without performing complicated bank memory control.

According to an embodiment of the present invention, there is provided an information processing apparatus including: at least one decode means for decoding compression-coded video data; supply control means for controlling the supply of the compression-coded video data to the decode means; and control means for controlling processing executed by the supply control means and the decode means. The control means determines the order of decoding processing performed by the decode means so that, among pictures contained in a decoding processing unit for the decoding processing performed by the decode means, I-pictures and P-pictures are decoded before B-pictures. The control means selects pictures to be output from the decode means from among the pictures contained in the decoding processing unit on the basis of a playback speed instruction provided by playback speed instruction means.

The decode means may include: decode processing execution means for executing decoding processing, and picture supply control means for controlling the supply of pictures to the decode processing execution means. The picture supply control means may supply, under the control of the control means, the I-pictures and the P-pictures, and B-pictures to be selected as pictures output from the decode means to the decode processing execution means among the pictures contained in the decoding processing unit. The decode processing execution means may decode the pictures supplied from the picture supply control means and may also output the pictures selected as pictures to be output from the decode means under the control of the control means.

A plurality of the decode means may be provided. The information processing apparatus may further include output switch means for receiving non-compressed data output from the plurality of decode means and for selectively outputting the received non-compressed data. The control means may further control processing performed by the output switch means.

The decode means may include a bank memory for storing decoded pictures, the bank memory having a number of banks smaller than the number of pictures contained in the decoding processing unit. The decode means may perform decoding processing by using the decoded pictures stored in the bank memory as reference images if necessary.

The bank memory may store the number of pictures greater than the number of I-pictures and P-pictures contained in the decoding processing unit by two.

The number of the decode means may be three, and each of the decode means may include the bank memory which is capable of storing 8 pictures.

The control means may control the decode means to store the I-pictures and the P-pictures at fixed positions for the I-pictures and the P-pictures of the bank memory.

When the picture at the head of the decoding processing unit is an I-picture or a P-picture among decoded pictures output from the decode means, the control means may control the decode means so that the decode start timing at which the decode means starts decoding and the display output timing at which the decode means starts outputting the decoded pictures are displaced from each other by a first predetermined number of pictures.

The first predetermined number may be greater than the total number of the I-pictures and the P-pictures by one.

When the picture at the head of the decoding processing unit is a B-picture among decoded pictures output from the decode means, the control means may control the decode means so that the decode start timing at which the decode means starts decoding and the display output timing at which the decode means starts outputting the decoded pictures are displaced from each other by a second predetermined number of pictures.

The second predetermined number may be greater than the total number of the I-pictures and the P-pictures by two.

The control means may control the decode means so that the decode start timing at which the decode means starts decoding and the display output timing at which the decode means starts outputting decoded pictures are displaced from each other by a first predetermined number of pictures when the playback speed and the playback direction instructed by the playback speed instruction means are normal and forward, respectively.

The first predetermined number may be greater than the total number of the I-pictures and the P-pictures by one.

The control means may control the decode means so that the decode start timing at which the decode means starts decoding and the display output timing at which the decode means starts outputting decoded pictures are displaced from each other by a second predetermined number of pictures when the playback speed and the playback direction instructed by the playback speed instruction means are normal and reverse, respectively.

The second predetermined number may be greater than the total number of the I-pictures and the P-pictures by two.

The control means may determine the timing at which the decode means performs decoding processing so that the timing at which the B-pictures are decoded by the decode means is earlier than the timing at which the decoded B-pictures are output by one picture.

The compression-coded video data may include GOPs. Upon receiving a GOP including I-pictures or P-pictures having a number greater than the value obtained by subtracting three from the number of banks of the bank memory, the control means may divide the GOP into decoding processing units, each including I-pictures or P-pictures having a number smaller than the value obtained by subtracting two from the number of banks of the bank memory, and may control the supply control means to supply the compression-coded video data of the decoding processing units to the decode means.

The control means may form the decoding processing units such that the total number of the I-pictures or the P-pictures contained in the divided decoding processing units does not become greater by a predetermined number or more than the total number of I-pictures or P-pictures contained in a temporally prior GOP or a temporally prior decoding processing unit.

The compression-coded video data may include GOPs. Upon receiving a first GOP including I-pictures or P-pictures having a number smaller than the value obtained by subtracting three from the number of banks of the bank memory, the control means may detect the structure of a second GOP temporally continuous from the first GOP, and if the total number of the I-pictures or the P-pictures contained in the first GOP and the second GOP is smaller than the value obtained by subtracting three from the number of banks of the bank memory, the control means may combine the first GOP and the second GOP to form a decoding processing unit, and may control the supply control means to supply the compression-coded video data of the decoding processing unit to the decode means.

The control means may form the decoding processing unit such that the total number of the I-pictures or the P-pictures contained in the combined decoding processing unit does not become greater than the total number of I-pictures and P-pictures contained in a temporally prior GOP by a predetermined number or more.

The compression-coded video data may include GOPs. The control means may detect the structure of a first GOP and the structure of a second GOP temporally continuous from the first GOP, and if the total number of I-pictures or P-pictures contained in the first GOP and the second GOP is smaller than a twice a value obtained by subtracting three from the number of banks of the bank memory, the control means may combine the first GOP and the second GOP and then divides the combined GOP to form a first decoding processing unit and a second decoding processing unit, each including the I-pictures or the P-pictures smaller than the value obtained by subtracting two from the number of banks of the bank memory. The control means may control the supply control means to individually supply the compression-coded video data of the first decoding processing unit and the compression-coded video data of the second decoding processing unit to the decode means.

The control means may form the first decoding processing unit and the second decoding processing unit such that the total number of the I-pictures or the P-pictures contained in the first decoding processing unit and the second decoding processing unit does not become greater than the total number of I-pictures or P-pictures of a temporally prior decoding processing unit or a temporally prior GOP by a predetermined number or more.

According to another embodiment of the present invention, there is provided an information processing method, a program recorded on a recording medium, and a program including the steps of: obtaining a playback speed instruction; determining the order of decoding processing for pictures contained in a decoding processing unit for performing the decoding processing so that I-pictures and P-pictures are decoded before B-pictures; selecting pictures to be output from among the pictures contained in the decoding processing unit on the basis of the obtained playback speed instruction; controlling the supply of the I-pictures and the P-pictures, and B-pictures selected as pictures to be output from among the pictures contained in the decoding processing unit to a decoder; decoding the pictures supplied to the decoder; and controlling the output of the pictures selected as pictures to be output from among the decoded pictures.

According to the aforementioned information processing apparatus, the information processing method, the program recorded on the recording medium, and the program, a playback speed instruction is obtained, the order of decoding processing for pictures contained in a decoding processing unit for performing the decoding processing is determined so that I-pictures and P-pictures are decoded before B-pictures, pictures to be output from among the pictures contained in the decoding processing unit are selected on the basis of the obtained playback speed instruction, pictures to be output are selected from among the pictures contained in the decoding processing unit on the basis of the obtained playback speed instruction, the pictures supplied to the decoder are decoded, and the pictures selected as pictures to be output from among the decoded pictures are output.

According to another embodiment of the present invention, there is provided an information processing apparatus including: storage means for storing compression-coded video data; readout means for reading out the compression-coded video data from the storage means; decode means for decoding the compression-coded video data; supply control means for controlling the supply of the compression-coded video data read out by the readout means to the decode means; control means for controlling processing executed by the supply control means and the decode means; and playback speed instruction means for providing a playback speed instruction to the control means. The control means determines the order of decoding processing for pictures contained in a decoding processing unit for performing the decoding processing performed by the decode means so that I-pictures and P-pictures are decoded before B-pictures. The control means selects pictures to be output from the decode means among the pictures contained in the decoding processing unit on the basis of the playback speed instruction provided by the playback speed instruction means. The control means controls the supply control means to control the supply of, among the pictures contained in the decoding processing unit, the I-pictures and the P-pictures, and B-pictures selected as pictures to be output from the decode means to the decode means. The control means controls the decode means to decode the pictures supplied to the decode means under the control of the supply control means, and may control the output of the pictures selected as pictures to be output from the decode means.

According to another embodiment of the present invention, there is provided an information processing method, a program recorded on a recording medium, and a program including the steps of: reading out compression-coded video data stored in a storage unit; supplying a playback speed instruction; obtaining the supplied playback speed instruction; determining the order of decoding processing for pictures contained in a decoding processing unit for performing the decoding processing so that I-pictures and P-pictures are decoded before B-pictures; selecting pictures to be output from among the pictures contained in the decoding processing unit on the basis of the obtained playback speed instruction; controlling the supply of the I-pictures and the P-pictures, and B-pictures selected as pictures to be output from among the pictures contained in the decoding processing unit of the read compression-coded video data to a decoder; decoding the pictures supplied to the decoder; and controlling the output of the pictures selected as pictures to be output from among the decoded pictures.

According to the aforementioned information processing apparatus, the information processing method, the program recorded on the recording medium, and the program, stored compression-coded video data is read, a playback speed instruction is supplied and obtained, the order of decoding processing for pictures contained in a decoding processing unit for performing the decoding processing is determined so that I-pictures and P-pictures are decoded before B-pictures, pictures to be output are selected from among the pictures contained in the decoding processing unit on the basis of the obtained playback speed instruction, the I-pictures and the P-pictures, and B-pictures selected as pictures to be output from among the pictures contained in the decoding processing unit of the read compression-coded video data are supplied to a decoder, the pictures supplied to the decoder are decoded, and the pictures selected as pictures to be output from among the decoded pictures are output.

According to another embodiment of the present invention, there is provided an information processing apparatus including: decode means for decoding compression-coded video data; supply control means for controlling the supply of the compression-coded video data to the decode means; and control means for controlling processing executed by the supply control means and the decode means. The control means determines the order of decoding processing for pictures contained in a decoding processing unit for performing the decoding processing performed by the decode means so that I-pictures and P-pictures are decoded before B-pictures. The control means selects pictures to be output from the decode means among the pictures contained in the decoding processing unit on the basis of a playback speed instruction provided by playback speed instruction means. The control means controls the supply control means to control the supply of, among the pictures contained in the decoding processing unit, the I-pictures and the P-pictures, and B-pictures selected as pictures to be output from the decode means to the decode means. The control means controls the decode means to decode the pictures supplied to the decode means under the control of the supply control means, and controls an output of the pictures selected as pictures to be output from the decode means.

The information processing apparatus may further include a bank memory for storing the pictures decoded by the decode means, the bank memory having a number of banks smaller than the number of pictures contained in the decoding processing unit. The decode means may perform decoding processing by using the decoded pictures stored in the bank memory as reference images if necessary.

The bank memory may store the number of pictures greater than the number of I-pictures and P-pictures contained in the decoding processing unit by two.

The bank memory may store 8 pictures.

The I-pictures and the P-pictures may be stored at fixed positions for the I-pictures and the P-pictures of the bank memory.

When the picture at the head of the decoding processing unit is an I-picture or a P-picture among decoded pictures output from the decode means, the control means may control the decode means so that the decode start timing at which the decode means starts decoding and the display output timing at which the decode means starts outputting the decoded pictures are displaced from each other by a first predetermined number of pictures.

The first predetermined number may be greater than the total number of the I-pictures and the P-pictures by one.

When the picture at the head of the decoding processing unit is a B-picture among decoded pictures output from the decode means, the control means may control the decode means so that the decode start timing at which the decode means starts decoding and the display output timing at which the decode means starts outputting the decoded pictures are displaced from each other by a second predetermined number of pictures.

The second predetermined number may be greater than the total number of the I-pictures and the P-pictures by two.

The control means may control the decode means so that the decode start timing at which the decode means starts decoding and the display output timing at which the decode means starts outputting decoded pictures are displaced from each other by a first predetermined number of pictures when the playback speed and the playback direction instructed by the playback speed instruction means are normal and forward, respectively.

The first predetermined number may be greater than the total number of the I-pictures and the P-pictures by one.

The control means may control the decode means so that the decode start timing at which the decode means starts decoding and the display output timing at which the decode means starts outputting decoded pictures are displaced from each other by a second predetermined number of pictures when the playback speed and the playback direction instructed by the playback speed instruction means are normal and reverse, respectively.

The second predetermined number may be greater than the total number of the I-pictures and the P-pictures by two.

The control means may determine the timing at which the decode means performs decoding processing so that the timing at which the B-pictures are decoded by the decode means is earlier than the timing at which the decoded B-pictures are output by one picture.

The compression-coded video data may include GOPs. Upon receiving a GOP including I-pictures or P-pictures having a number greater than the value obtained by subtracting three from the number of banks of the bank memory, the control means may divide the GOP into decoding processing units, each including I-pictures or P-pictures having a number smaller than the value obtained by subtracting two from the number of banks of the bank memory, and may control the supply control means to supply the compression-coded video data of the decoding processing units to the decode means.

The control means may form the decoding processing units such that the total number of the I-pictures or the P-pictures contained in the divided decoding processing units does not become greater by a predetermined number or more than the total number of I-pictures or P-pictures contained in a temporally prior GOP or a temporally prior decoding processing unit.

The compression-coded video data may include GOPs. Upon receiving a first GOP including I-pictures or P-pictures having a number smaller than the value obtained by subtracting three from the number of banks of the bank memory, the control means may detect the structure of a second GOP temporally continuous from the first GOP, and, if the total number of the I-pictures or the P-pictures contained in the first GOP and the second GOP is smaller than the value obtained by subtracting three from the number of banks of the bank memory, the control means may combine the first GOP and the second GOP to form a decoding processing unit, and may control the supply control means to supply the compression-coded video data of the decoding processing unit to the decode means.

The control means may form the decoding processing unit such that the total number of the I-pictures or the P-pictures contained in the combined decoding processing unit does not become greater than the total number of I-pictures and P-pictures contained in a temporally prior GOP by a predetermined number or more.

The compression-coded video data may include GOPs. The control means may detect the structure of a first GOP and the structure of a second GOP temporally continuous from the first GOP, and if the total number of I-pictures or P-pictures contained in the first GOP and the second GOP is smaller than a twice a value obtained by subtracting three from the number of banks of the bank memory, the control means may combine the first GOP and the second GOP and then divides the combined GOP to form a first decoding processing unit and a second decoding processing unit, each including the I-pictures or the P-pictures smaller than the value obtained by subtracting two from the number of banks of the bank memory. The control means may control the supply control means to individually supply the compression-coded video data of the first decoding processing unit and the compression-coded video data of the second decoding processing unit to the decode means.

The control means may form the first decoding processing unit and the second decoding processing unit such that the total number of the I-pictures or the P-pictures contained in the first decoding processing unit and the second decoding processing unit does not become greater than the total number of I-pictures or P-pictures of a temporally prior decoding processing unit or a temporally prior GOP by a predetermined number or more.

According to the aforementioned information processing apparatus, the order of decoding processing for pictures contained in a decoding processing unit for performing the decoding processing performed by the decode means is determined so that I-pictures and P-pictures are decoded before B-pictures, pictures to be output from the decode means are selected from among the pictures contained in the decoding processing unit on the basis of the obtained playback speed, among the pictures contained in the decoding processing unit, the I-pictures and the P-pictures, and B-pictures selected as pictures to be output from the decode means are supplied to the decode means, the pictures supplied to the decode means are decoded, and the pictures selected as pictures to be output from the decode means are output.

As described above, according to an embodiment of the present invention, a fast playback operation, a reverse-direction playback operation, or a fast reverse-direction playback operation can be performed on compressed-coded data. In particular, I-pictures and P-pictures, and B-pictures selected as pictures to be output are decoded, and only pictures selected as pictures to be output among the decoded pictures are output. It is thus possible to perform a fast playback operation, a reverse-direction playback operation, or a fast reverse-direction playback operation on compression-coded video data without performing a complicated bank memory control operation.

BRIEF DESCRIPTION OF THE DRAWINGS

FIGS. 48 through 50B illustrate decode units formed by dividing GOPs;

FIGS. 51 through 53B illustrate decode units formed by combining GOPs;

FIGS. 54 through 59B illustrate decode units formed by combining and dividing GOPs;

FIG. 65 is a block diagram illustrating the configuration of a personal computer.

DESCRIPTION OF THE PREFERRED EMBODIMENTS

Figure 1:
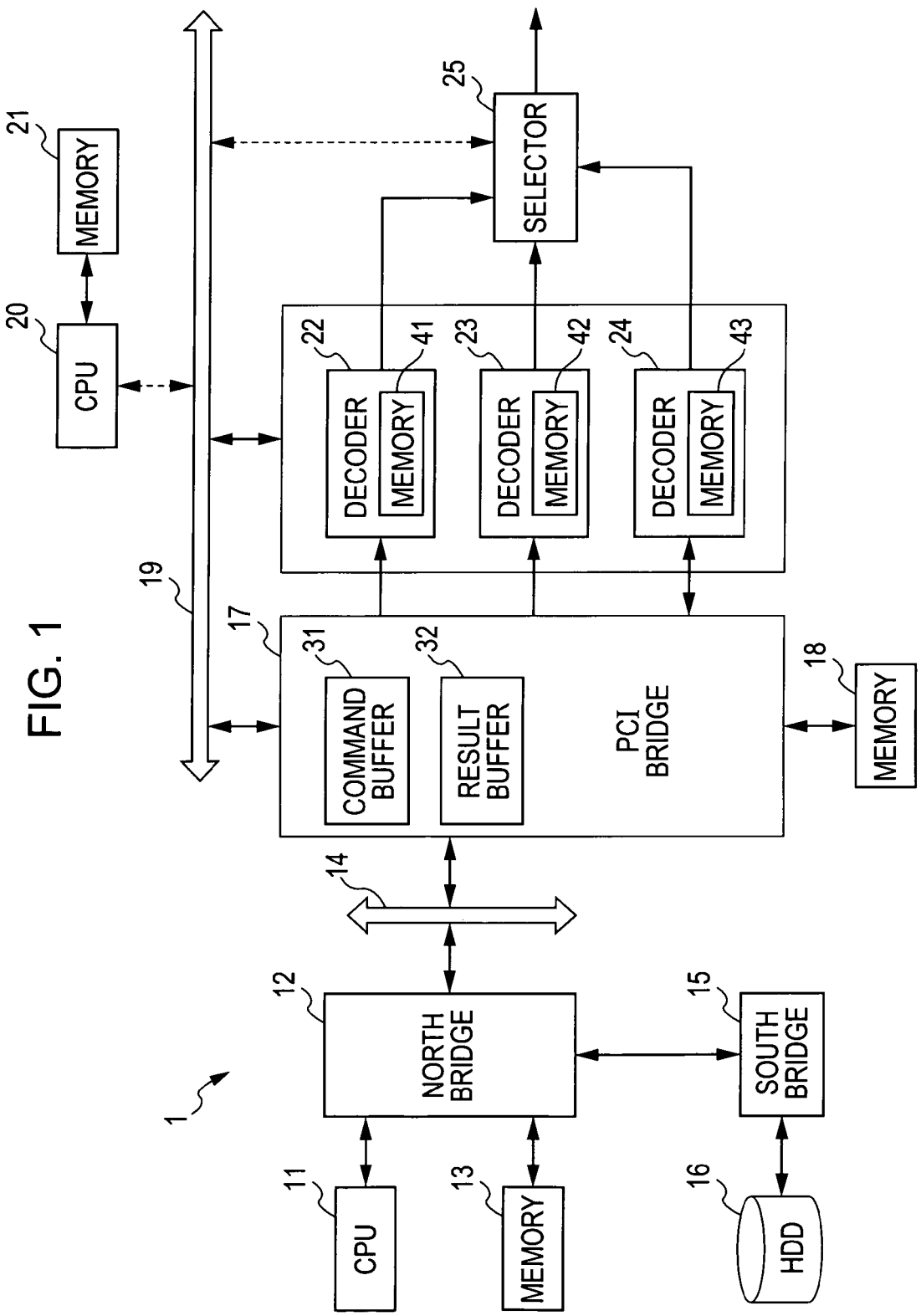
FIG. 1 is a block diagram illustrating the configuration of a playback apparatus according to an embodiment of the present invention.

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

An information processing apparatus (for example, a playback apparatus 1 shown in FIG. 1) according to an embodiment of the present invention includes: at least one decode means (for example, a decoder 22, 23, or 24 shown in FIG. 1) for decoding compression-coded video data; supply control means (for example, a PCI bridge 17 shown in FIG. 1) for controlling the supply of the compression-coded video data to the decode means; and control means (for example, a CPU 20 shown in FIG. 1) for controlling processing executed by the supply control means and the decode means. The control means determines the order of decoding processing performed by the decode means so that, among pictures contained in a decoding processing unit (for example, in the forward-direction playback operation, a total of 16 pictures including 13 pictures other than first two B-pictures in a first GOP and first three I-, B-, and B-pictures of a second GOP subsequent to the first GOP in the coding order, and in the reverse-direction playback operation, a total of 16 pictures including 13 pictures other than first two B-pictures in the second GOP and first three I-, B-, and B-pictures of a third GOP prior to the second GOP) for the decoding processing performed by the decode means, I-pictures and P-pictures are decoded before B-pictures. The control means selects pictures to be output from the decode means from among the pictures contained in the decoding processing unit on the basis of a playback speed instruction provided by playback speed instruction means.

The decode means may include: decode processing execution means (for example, a decode processor 77 shown in FIG. 2) for executing decoding processing, and picture supply control means (an elementary-stream address determining unit 73 shown in FIG. 2) for controlling the supply of pictures to the decode processing execution means. The picture supply control means may supply, under the control of the control means, the I-pictures and the P-pictures, and B-pictures to be selected as pictures output from the decode means to the decode processing execution means among the pictures contained in the decoding processing unit. The decode processing execution means may decode the pictures supplied from the picture supply control means and may also output the pictures selected as pictures to be output from the decode means under the control of the control means.

A plurality of the decode means may be provided. The information processing apparatus may further include output switch means (for example, a selector 25 shown in FIG. 1) for receiving non-compressed data output from the plurality of decode means and for selectively outputting the received non-compressed data. The control means may further control processing performed by the output switch means.

The decode means may include a bank memory (for example, a video bank memory 82 shown in FIG. 2) for storing decoded pictures, the bank memory having a number of banks smaller than the number of pictures contained in the decoding processing unit. The decode means may perform decoding processing by using the decoded pictures stored in the bank memory as reference images if necessary.

Figure 18:
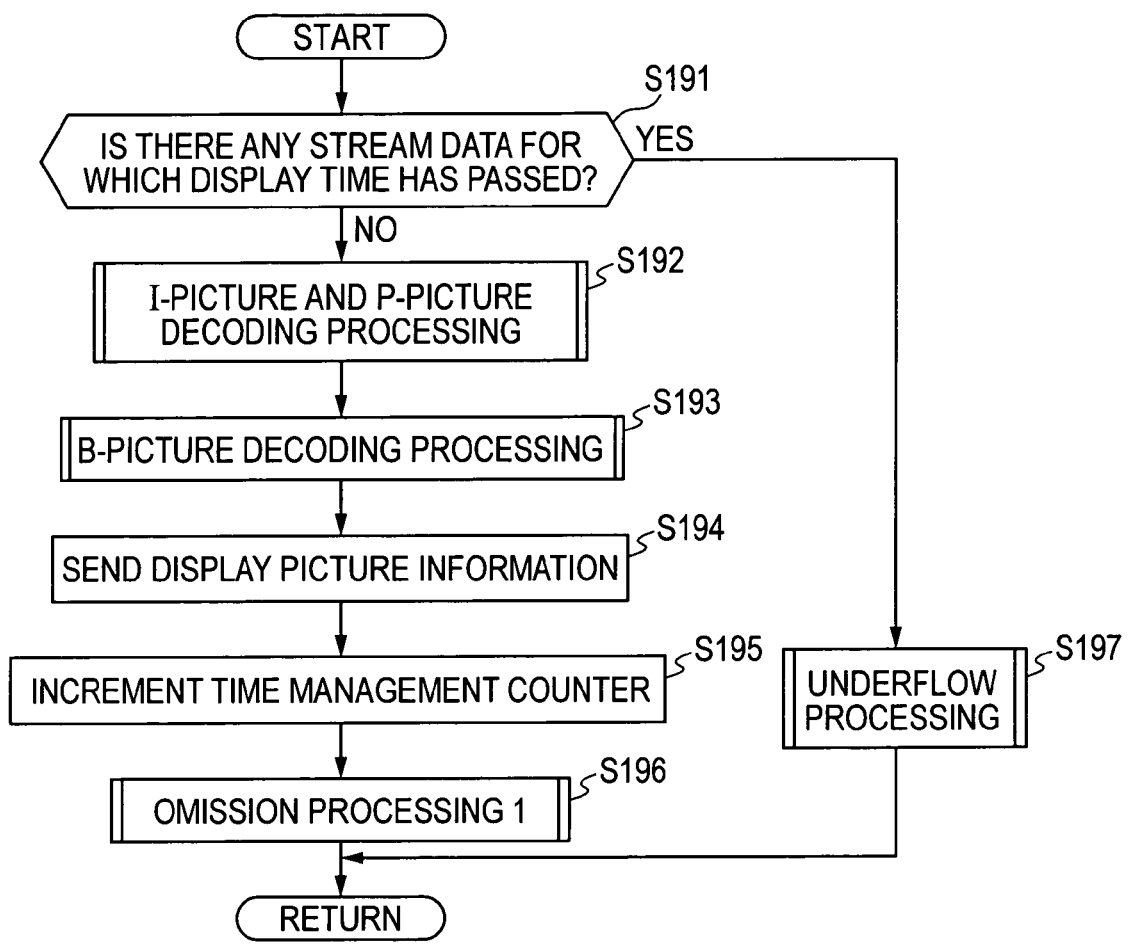
FIG. 18 is a flowchart illustrating frame control processing 1.
Figure 38:
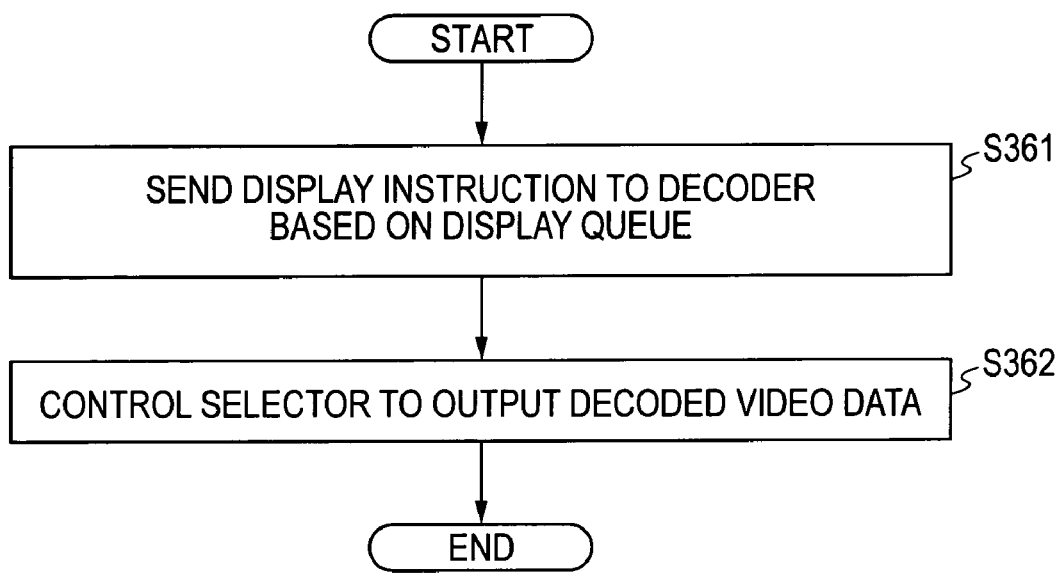
FIG. 38 is a flowchart illustrating one-frame delay processing.
Figure 41:
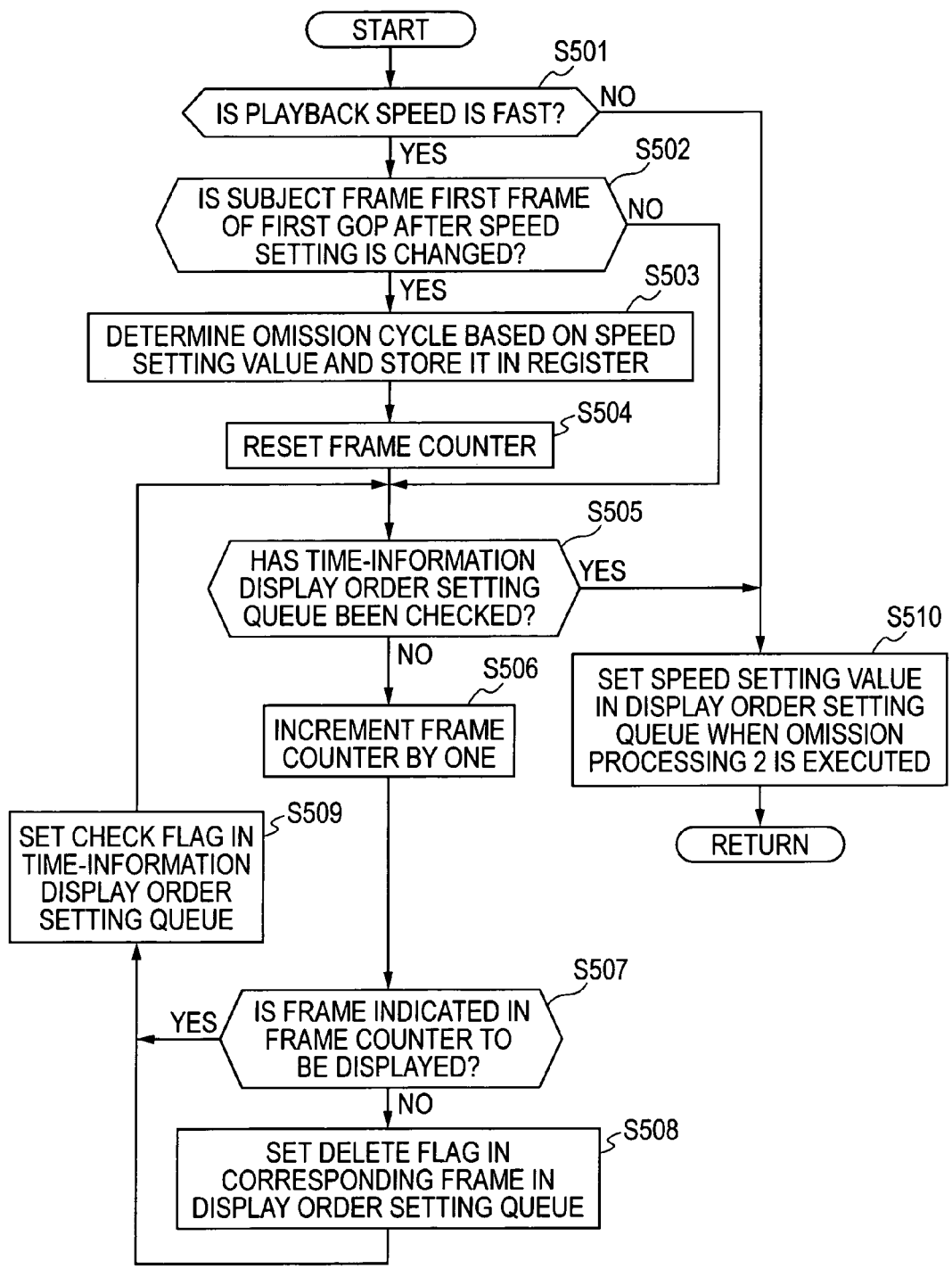
FIG. 41 is a flowchart illustrating omission processing 2.
Figure 42:
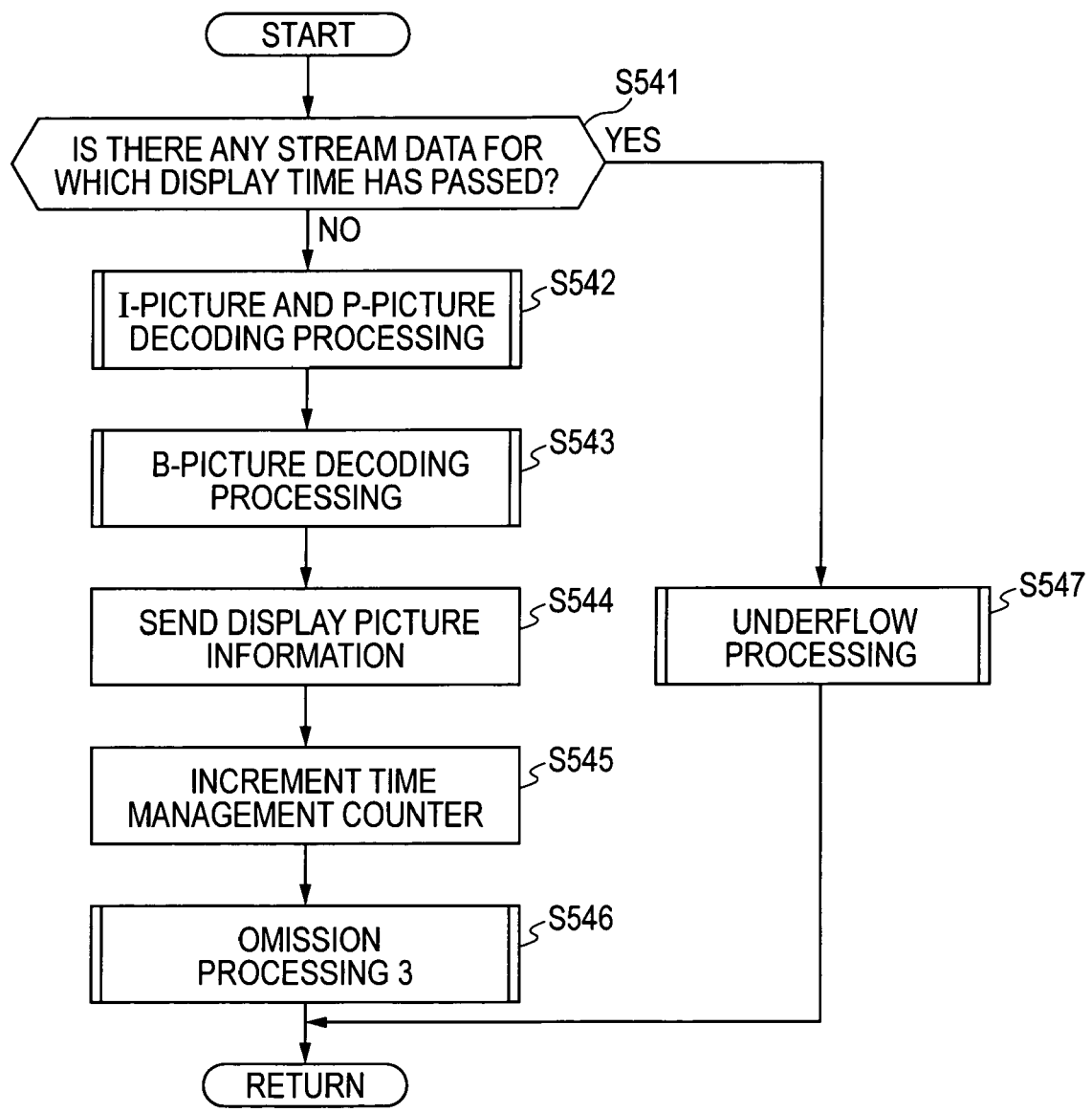
FIG. 42 is a flowchart illustrating frame control processing 2.

An information processing method, a program recorded on a recording medium, and a program according to another embodiment of the present invention includes the steps of: obtaining a playback speed instruction (for example, step S101 shown in FIG. 15); determining the order of decoding processing for pictures contained in a decoding processing unit (for example, in the forward-direction playback operation, a total of 16 pictures including 13 pictures other than first two B-pictures in a first GOP and first three I-, B-, and B-pictures of a second GOP subsequent to the first GOP in the coding order, and in the reverse-direction playback operation, a total of 16 pictures including 13 pictures other than first two B-pictures in the second GOP and first three I-, B-, and B-pictures of a third GOP prior to the second GOP) for performing the decoding processing so that I-pictures and P-pictures are decoded before B-pictures (for example, steps S75, S78 through S80 in FIG. 6); selecting pictures to be output from among the pictures contained in the decoding processing unit on the basis of the obtained playback speed instruction (for example, processing shown in FIG. 23, 41, or 43); controlling the supply of the I-pictures and the P-pictures, and B-pictures selected as pictures to be output from among the pictures contained in the decoding processing unit to a decoder (for example, decode processor 77 shown in FIG. 2) (for example, step S105 in FIG. 15 after step S196 in FIG. 18); decoding the pictures supplied to the decoder (for example, step S192 or S193 in FIG. 18); and controlling the output of the pictures selected as pictures to be output from among the decoded pictures (for example, processing shown in FIG. 38 after step S196 in FIG. 18 or step S546 in FIG. 42).

An information processing apparatus (for example, the playback apparatus 1 shown in FIG. 1) according to another embodiment of the present invention includes: storage means (for example, a hard disk drive (HDD) 16 shown in FIG. 1) for storing compression-coded video data; readout means (for example, a south bridge 15 shown in FIG. 1) for reading out the compression-coded video data from the storage means; decode means (for example, the decoder 22, 23, or 24 shown in FIG. 1) for decoding the compression-coded video data; supply control means (for example, the PCI bridge 17 shown in FIG. 1) for controlling the supply of the compression-coded video data read out by the readout means to the decode means; control means (for example, the CPU 20 shown in FIG. 1) for controlling processing executed by the supply control means and the decode means; and playback speed instruction means (for example, the CPU 11 shown in FIG. 1) for providing a playback speed instruction to the control means. The control means determines the order of decoding processing for pictures contained in a decoding processing unit (for example, in the forward-direction playback operation, a total of 16 pictures including 13 pictures other than first two B-pictures in a first GOP and first three I-, B-, and B-pictures of a second GOP subsequent to the first GOP in the coding order, and in the reverse-direction playback operation, a total of 16 pictures including 13 pictures other than first two B-pictures in the second GOP and first three I-, B-, and B-pictures of a third GOP prior to the second GOP) for performing the decoding processing performed by the decode means so that I-pictures and P-pictures are decoded before B-pictures. The control means selects pictures to be output from the decode means among the pictures contained in the decoding processing unit on the basis of the playback speed instruction provided by the playback speed instruction means. The control means controls the supply control means to control the supply of, among the pictures contained in the decoding processing unit, the I-pictures and the P-pictures, and B-pictures selected as pictures to be output from the decode means to the decode means. The control means controls the decode means to decode the pictures supplied to the decode means under the control of the supply control means, and may control the output of the pictures selected as pictures to be output from the decode means.

An information processing method, a program recorded on a recording medium, and a program according to another embodiment of the present invention includes the steps of: reading out compression-coded video data stored in a storage unit (for example, step S1 shown in FIG. 3); supplying a playback speed instruction (for example, step S5 or S11 in FIG. 3); obtaining the supplied playback speed instruction (for example, step S101 in FIG. 5); determining the order of decoding processing for pictures contained in a decoding processing unit (for example, in the forward-direction playback operation, a total of 16 pictures including 13 pictures other than first two B-pictures in a first GOP and first three I-, B-, and B-pictures of a second GOP subsequent to the first GOP in the coding order, and in the reverse-direction playback operation, a total of 16 pictures including 13 pictures other than first two B-pictures in the second GOP and first three I-, B-, and B-pictures of a third GOP prior to the second GOP) for performing the decoding processing so that I-pictures and P-pictures are decoded before B-pictures (for example, step S75, steps S78 through S80 in FIG. 6); selecting pictures to be output from among the pictures contained in the decoding processing unit on the basis of the obtained playback speed instruction (for example, processing shown in FIG. 23, 41, or 43); controlling the supply of the I-pictures and the P-pictures, and B-pictures selected as pictures to be output from among the pictures contained in the decoding processing unit of the read compression-coded video data to a decoder (for example, the decode processor 77 in FIG. 2) (for example, step S105 in FIG. 15 after step S196 in FIG. 18); decoding the pictures supplied to the decoder (for example, step S192 or S193 in FIG. 18); and controlling the output of the pictures selected as pictures to be output from among the decoded pictures (for example, processing shown in FIG. 38 after S196 in FIG. 18 or step S546 in FIG. 42).

Figure 2:
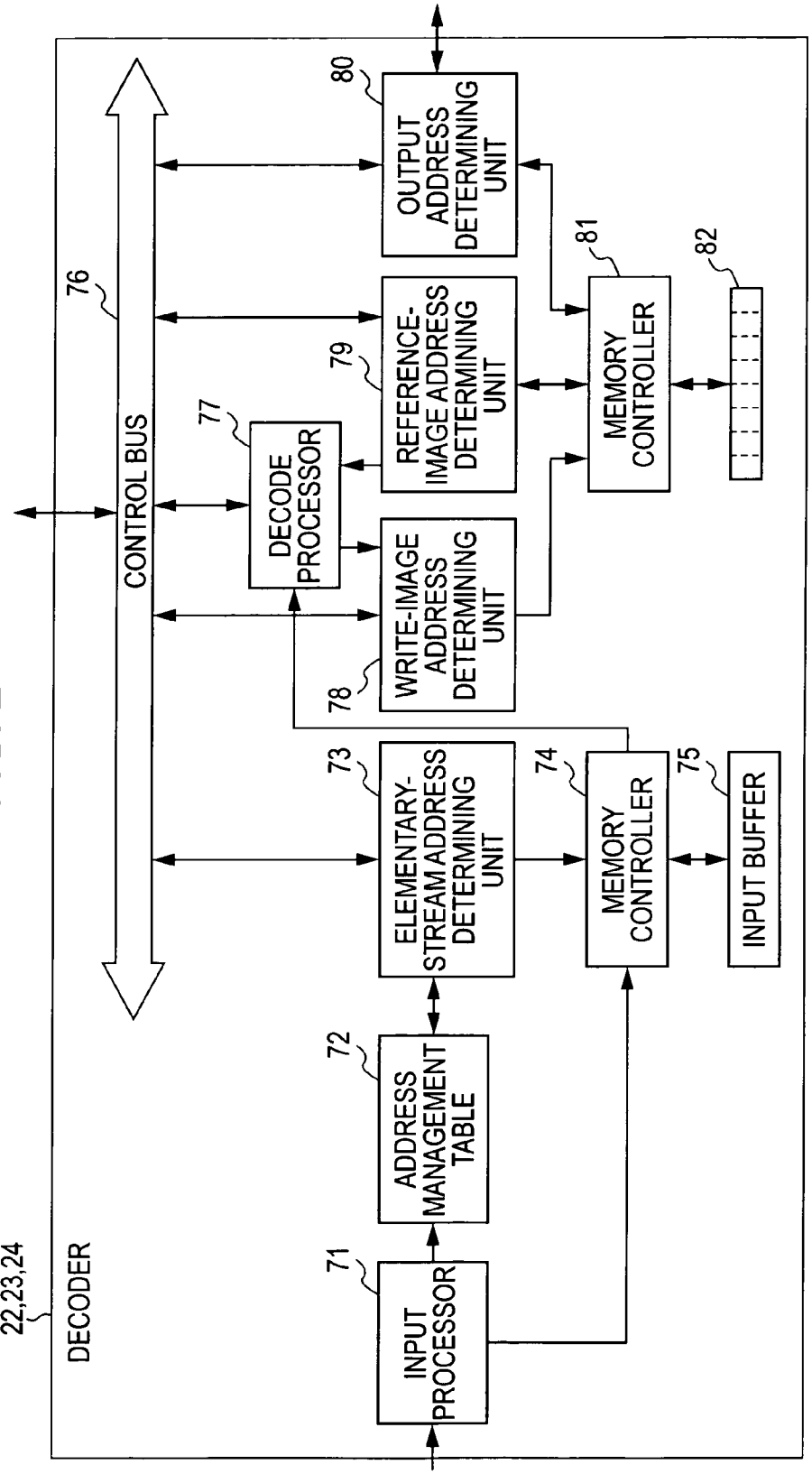
FIG. 2 is a block diagram illustrating a detailed configuration of a decoder shown in FIG. 1.

An information processing apparatus (for example, the playback apparatus 1 shown in FIG. 1) according to another embodiment of the present invention includes: decode means (for example, the decode processor 77 shown in FIG. 2) for decoding compression-coded video data; supply control means (for example, the elementary-stream address determining unit 73 shown in FIG. 2) for controlling the supply of the compression-coded video data to the decode means; and control means (for example, the CPU 20 shown in FIG. 1) for controlling processing executed by the supply control means and the decode means. The control means determines the order of decoding processing for pictures contained in a decoding processing unit (for example, in the forward-direction playback operation, a total of 16 pictures including 13 pictures other than first two B-pictures in a first GOP and first three I-, B-, and B-pictures of a second GOP subsequent to the first GOP in the coding order, and in the reverse-direction playback operation, a total of 16 pictures including 13 pictures other than first two B-pictures in the second GOP and first three I-, B-, and B-pictures of a third GOP prior to the second GOP) for performing the decoding processing performed by the decode means so that I-pictures and P-pictures are decoded before B-pictures. The control means selects pictures to be output from the decode means among the pictures contained in the decoding processing unit on the basis of a playback speed instruction provided by playback speed instruction means. The control means controls the supply control means to control the supply of, among the pictures contained in the decoding processing unit, the I-pictures and the P-pictures, and B-pictures selected as pictures to be output from the decode means to the decode means. The control means controls the decode means to decode the pictures supplied to the decode means under the control of the supply control means, and controls an output of the pictures selected as pictures to be output from the decode means.

The information processing apparatus may further include a bank memory (for example, the video bank memory 82 shown in FIG. 2) for storing the pictures decoded by the decode means, the bank memory having a number of banks smaller than the number of pictures contained in the decoding processing unit. The decode means may perform decoding processing by using the decoded pictures stored in the bank memory as reference images if necessary.

The present invention is described in detail below with reference to the accompanying drawings through illustration of a preferred embodiment.

FIG. 1 is a block diagram illustrating the hardware configuration of a playback apparatus 1 according to an embodiment of the present invention.

In the playback apparatus 1, a central processing unit (CPU) 11, which is connected to a north bridge 12, controls the reading of data stored in a hard disk drive (HDD) 16 or generates and outputs commands for providing instructions to start, change, and finish processing, such as controlling the decode scheduling, decoding, and display executed by a CPU 20. The north bridge 12, which is connected to a peripheral component interconnect/interface (PCI) bus 14, receives data stored in the HDD 16 via a south bridge 15 and supplies the received data to a memory 18 via the PCI bus 14 and a PCI bus 17 under the control of the CPU 11. The north bridge 12 is also connected to a memory 13 and sends and receives data required for the processing of the CPU 11.

The memory 13 is a fast-access storage memory, such as a double data rate (DDR), in which data required for the processing executed by the CPU 11 can be stored. The south bridge 15 controls the reading and writing of data from and into the HDD 16 in which compression-coded stream data is stored.

The PCI bridge 17 has a built-in command buffer 31 and result buffer 32, and is connected to the memory 18 in which stream data read from the HDD 16 under the control of the CPU 11 is buffered. The PCI bridge 17 can supply the stream data read from the HDD 16 under the control of the CPU 11 to the memory 18 and stores the stream data therein. The PCI bridge 17 can also read stream data stored in the memory 18 and supplies the stream data to decoders 22, 23, and 24 under the control of the CPU 20. The PCI bridge 17 also controls the sending and receiving of control signals corresponding to commands or results via the PCI bus 14 or a control bus 19.

The command buffer 31 receives commands from the CPU 11 via the north bridge 12 and the PCI bus 14, and also reads out commands from the command buffer 31 to the CPU 20 via the control bus 19. The result buffer 32 receives results from the CPU 20 in response to commands via the control bus 19 and also reads out results stored in the result buffer 32 to the CPU 11 via the PCI bus 14 and the north bridge 12.

The memory 18, which is, for example, a synchronous dynamic random access memory (SDRAM), stores compression-coded stream data read from the HDD 16 under the control of the PCI bridge 17.

The CPU 20 reads commands written into the command buffer 31 of the PCI bridge 17 by the CPU 11 via the control bus 19, and controls processing executed by the PCI bridge 17, the decoders 22 through 24, and a selector 25 according to the read commands. A memory 21 stores data required for the processing executed by the CPU 20.

The decoders 22, 23, and 24 decode the received compression-coded stream data under the control of the CPU 20, and output non-compressed video signals. The decoders 22, 23, and 24 have built-in memories 41, 42, and 43, respectively, to store the received compression-coded stream data and the decoded video signals if necessary. It is not essential that the decoders 22, 23, and 24 be contained in the playback apparatus 1. That is, the decoders 22, 23, and 24 may be provided separately from the playback apparatus 1.

The selector 25 can switch the output of each frame (picture) of non-compressed serial digital interface (SDI) data supplied from the decoder 22, 23, or 24.

The playback apparatus 1 shown in FIG. 1 may be formed as one device or a plurality of devices. For example, the CPU 11, the north bridge 12, the memory 13, the south bridge 15, and the HDD 16 may be provided as components of a personal computer, and the functions of the PCI bus 14, the PCI bridge 17, the memory 18, the control bus 19, the CPU 20, the memory 21, the decoders 22, 23, and 24, and the selector 25 may be provided in an expansion card, such as a PCI card or a PCI-express card, or an expansion board. Then, the expansion card is inserted into the personal computer, thereby implementing the functions of the playback apparatus 1. The above-described elements may be contained in a more number of devices to form the playback apparatus 1.

The operation of the above-configured playback apparatus 1 is described below.

In the HDD 16, video data compressed with the MPEG long GOP method is stored.

The CPU 11 controls the south bridge 15 to read out the compression-coded stream data from the HDD 16 via the north bridge 12 in response to the input from an input operation unit (not shown) by a user, and to supply the read stream data to the memory 18 via the north bridge 12, the PCI bus 14, and the PCI bridge 17 and stores the read data in the memory 18. The CPU 11 also writes information indicating the playback speed and the playback direction and a decode start command or a display start command into the command buffer 31 of the PCI bridge 17 via the north bridge 12 and the PCI bus 14.

The CPU 20 determines the decode and display schedules for the compression-coded stream data on the basis of a command supplied from the CPU 11 and stored in the command buffer 31. More specifically, the CPU 20 selects the decoder 22, 23, or 24 used for decoding, and determines the input timing of the compression-coded stream data into the selected decoder 22, 23, or 24, the decode timing for each frame, the setting of bank positions at which reference images are stored, the allocation of a bank memory in decoding processing, and the output of decoded pictures, i.e., the display timing.

The CPU 20 then controls the PCI bridge 17 to supply the compression-coded stream data stored in the memory 18 to the selected decoder 22, 23, or 24 based on the determined schedule.

The CPU 20 controls the decoder 22, 23, or 24 to decode the supplied compression-coded stream data. The decoder 22, 23, or 24 then decodes the stream data to generate non-compressed SDI data and output it to the selector 25.

The CPU 20 then controls the selector 25 to switch the output of the non-compressed SDI data output from the decoder 22, 23, or 24.

FIG. 2 is a block diagram illustrating a detailed configuration of the decoder 22, 23, or 24.

An input processor 71 supplies the compression-coded stream data from the PCI bridge 17 to a memory controller 74 and stores the stream data in an input buffer 75. The input processor 71 also obtains the head address, data size, picture header information, picture size information, and Q matrix, of each picture from the supplied stream data, and supplies the obtained information to an address management table 72.

The address management table 72 stores the above-described information supplied from the input processor 71 for each picture as table information that can be identified by the table ID.

An elementary-stream address determining unit 73 reads the head address and picture size information of the corresponding picture from the table information represented by the predetermined table ID stored in the address management table 72 and supplies the read head address and picture size information to the memory controller 74 based on a control signal supplied from the CPU 20 via the control bus 19 so that the stream data stored in the input buffer 75 can be supplied to a decode processor 77 in units of pictures.

The memory controller 74 controls the reading and writing of stream data from and into the input buffer 75. That is, the memory controller 74 writes the stream data supplied from the input processor 71 into the input buffer 75 and also reads out the predetermined picture to the decode processor 77 based on the head address and picture size information of the corresponding picture supplied from the elementary-stream address determining unit 73.

The input buffer 75 corresponds to part of the recording areas of the memories 41, 42, and 43 shown in FIG. 1, which are SDRAMs, and stores stream data under the control of the memory controller 74.

A control bus 76 supplies control signals received from the CPU 20 via the control bus 19 to the elementary-stream address determining unit 73, the decode processor 77, a write-image address determining unit 78, a reference-image address determining unit 79, and an output address determining unit 80, and also supplies information concerning the processing executed within the decoder 22, 23 or 24 to the CPU 20 via the control bus 19.

The decode processor 77 decodes the MPEG video stream read from the input buffer 75 under the control of the memory controller 74 by referring to the corresponding reference image supplied from the reference-image address determining unit 79 if necessary, and supplies the decoded baseband (non-compressed) video signal to the write-image address determining unit 78.

The write-image address determining unit 78 obtains, via the control bus 76, a control signal supplied from the CPU 20 via the control bus 19, and determines based on this control signal the recording position, i.e., the storage bank position, of the baseband video signal decoded and supplied from the decode processor 77 in a video bank memory 82. The write-image address determining unit 78 then stores the baseband video signal at the determined bank position of the video bank memory 82 via a memory controller 81.

The reference-address determining unit 79 obtains, via the control bus 76, a control signal supplied from the CPU 20 via the control bus 19, and controls, based on this control signal, the memory controller 81 to read out frame image data stored in a bank designated as a preceding reference image bank for a P-picture or frame image data stored in a bank designated as preceding and upcoming reference image banks for a B-picture from the video bank memory 82, and supplies the read frame image data to the decode processor 77.

The output address determining unit 80 obtains, via the control bus 76, a control signal supplied from the CPU 20 via the control bus 19, and specifies, based on this control signal, the bank for an output image, i.e., the bank for a frame to be displayed, from the frame image data stored in the video bank memory 82, and controls the memory controller 81 to read out the output image.

The memory controller 81 controls the reading and writing of frame images from and into the video bank memory 82. The video bank memory 82 corresponds to part of the recording areas of the memories 41, 42, and 43 shown in FIG. 1, which are SDRAMs, and is an 8-bank frame image bank memory for storing each frame of image data in a prescribed bank under the control of the memory controller 81.

The control processing executed by the CPU 11 is described below with reference to the flowchart of FIG. 3.

In step S1, the CPU 11 controls the north bridge 12 and the south bridge 15 to read out from the HDD 16 a plurality of GOPs of compression-coded stream data, which are to be decoded and output, specified by the user.

In step S2, the CPU 11 supplies the read stream data to the PCI bridge 17 via the PCI bus 14 and transfers the stream data to the memory 18.

In step S3, the CPU 11 sends a data transfer completion message and picture information concerning pictures contained in the GOPs transferred to the memory 18 to the CPU 20 by supplying, via the north bridge 12 and the PCI bus 14, the data transfer completion message and the picture information to the command buffer 31 of the PCI bridge 17. The picture information includes, for example, the picture types, header information concerning the header of each picture, and the picture sizes.

In step S4, the CPU 11 receives a ready message from the CPU 20 and the memory 18. More specifically, the CPU 11 reads, via the PCI bus 14 and the north bridge 12, results in response to the data transfer completion message and the picture information supplied from the CPU 20 to the result buffer 32 via the control bus 19, and also receives a message indicating that the GOP stream data has been stored from the memory 18 via the PCI bridge 17, the PCI bus 14, and the north bridge 12.

In step S5, the CPU 11 receives an instruction to start playback output processing from a user via an operation input unit (not shown), and sends a decode start command to the command buffer 31 via the north bridge 12 and the PCI bus 14 and causes the decoder 22, 23, or 24 to start decoding processing. The decode start command includes display speed information.

In step S6, the CPU 11 sends a display start command to the command buffer 31 via the north bridge 12 and the PCI bus 14. In step S7, the CPU 11 starts displaying one GOP of an SDI signal, i.e., a baseband image signal, decoded by the corresponding decoder.

In step S8, the CPU 11 detects that one GOP has been displayed. More specifically, the CPU 11 checks which picture has been displayed by reading, via the PCI bus 14 and the north bridge 12, results in response to the display start command supplied from the CPU 20 to the result buffer 32 via the control bus 19, i.e., a display completion message written into the result buffer 32 by the CPU 20 in step S194 of FIG. 18, which is discussed below, indicating that each frame has been displayed.

In step S9, the CPU 11 determines whether the displayed GOP is the final GOP of the stream data. If the displayed GOP is found to be the final GOP, the processing is completed.

If it is determined in step S9 that the displayed GOP is not the final GOP, the process proceeds to step S10 to determine based on a signal supplied from an operation input unit (not shown) whether an instruction to change the input stream state, for example, to finish playing back the stream data, change the stream data which is being played back, or change the playback speed or direction, has been input from the user.

If an instruction to change the input stream state is found in step S10, the process proceeds to step S11 in which the CPU 11 sends a command corresponding to the user operation to the command buffer 31 via the north bridge 12 and the PCI bus 14.

If it is determined in step S10 that an instruction to change the input stream state has not been input, or after step S11, the process proceeds to step 12 to determine whether there is any stream data to be displayed in the HDD 16. If it is determined in step S12 that there is no stream data to be displayed, the process returns to step S7 to process stream data transferred to the memory 18.

If it is determined in step S12 that there is stream data to be displayed, the process proceeds to step S13 in which the CPU 11 controls the north bridge 12 and the south bridge 15 to read out the subsequent GOP of the stream data from the HDD 16.

In step S14, the CPU 11 supplies the read GOP to the PCI bridge 17 via the PCI bus 14 and transfers the GOP to the memory 18. That is, basically, in the memory 18, a predetermined number of GOPs are stored, except when the end portion of the stream data to be played back is stored.

In step S15, the CPU 11 sends a data transfer completion message and picture information concerning pictures contained in the GOP transferred to the memory 18 to the CPU 20 by supplying, via the north bridge 12 and the PCI bus 14, the data transfer completion message and the picture information to the command buffer 31. The picture information includes, for example, the type and size of each picture.

In step S16, the CPU 11 receives a ready message from the CPU 20 and the memory 18. More specifically, the CPU 11 reads, via the PCI bus 14 and the north bridge 12, results in response to the data transfer completion message and the picture information supplied from the CPU 20 to the result buffer 32 via the control bus 19, and also receives a message indicating that the GOP stream data has been stored from the memory 18 via the PCI bridge 17, the PCI bus 14, and the north bridge 12.

After step S16, the process proceeds to step S7, and performs the subsequent processing.

According to the above-described processing, by supplying a command to the CPU 20 and receiving a result in response to the supplied command, the CPU 11 can control the decoding of stream data and the display of the decoded data.

In this processing, the decoded data is displayed in units of GOPs. When outputting the SDI signal decoded by the corresponding decoder to an external source, the CPU 11 can perform processing similar to the above-described processing. Accordingly, by supplying a command to the CPU 20 and receiving the result in response to the supplied command, the CPU 11 can control the decoding of the stream data and the output of the decoded data to an external source.

The CPU 20 then controls the decoding processing performed by a plurality of decoders (decoders 22, 23, and 24 in FIG. 1) on the basis of the command supplied from the CPU 11. More specifically, the CPU 20 selects the decoder 22, 23, or 24 used for decoding, i.e., the decoder 22, 23, or 24 to which compression-coded video data is supplied. The CPU 20 also controls the PCI bridge 17, the decoders 22, 23, and 24, and the selector 25 based on the input timing of the stream data to the selected decoder, the decode timing for each picture, the setting of positions of reference images in banks, the allocation of the bank memory in decoding processing, and the output timing of the decoded pictures, i.e., the display timing. The decoding and display output control operation performed by the CPU 20 is discussed below with reference to FIGS. 4 through 38.

The memory 21 has a plurality of registers and information queues for storing various types of information to allow the CPU 20 to control the decoding processing by the decoders 22, 23, and 24 and the selection processing of the SDI signal output from the selector 25. The information queues are first-in first-out (FIFO) queues in which commands supplied from the CPU 11, the picture IDs associated with the picture type information, and information (for example, time information) accompanying the picture IDs can be stored at a predetermined depth according to the decode timing schedule or the decode/display control purpose.

The CPU 20 controls the decode and display timing by using the information stored in the corresponding information queues. That is, instead of queuing pictures in the memory 21, the picture IDs are stored in the corresponding information queues under the control of the CPU 20, thereby allowing the CPU 20 to perform computation for controlling the decode and display timing.

The information queues storing various types of information and used for various control operations by the CPU 20 includes: a command queue storing commands obtained from the command buffer 31 via the control bus 19; an input picture queue in which the pictures IDs of input pictures corresponding to a queue are stored in the coding order; a display order information queue in which the picture IDs stored in the input picture queue reordered in the display order are stored; an I/P-picture decode queue in which I-pictures and P-pictures extracted from the picture IDs stored in the display order information queue and rearranged in the decoding order are stored; a time-information I/P-picture decode queue in which, in addition to the picture IDs set in the I/P-picture decode queue, time information corresponding to the picture IDs are stored; a display order setting queue in which pictures IDs are set in the display order; a time-information display order setting queue in which, in addition to the picture IDs set in the display order setting queue, time information associated with the picture IDs is stored; and a display queue storing a picture ID of a picture to be subsequently displayed. Details of the information stored in the individual queues, the depths of the queues, and processing executed by using the information are discussed below.

Frame processing 1 performed on each frame is described below with reference to the flowchart of FIG. 4. This processing routine is repeated for each frame until stream data to be displayed has been processed or until an instruction to finish a displaying operation is provided.

Figure 5:
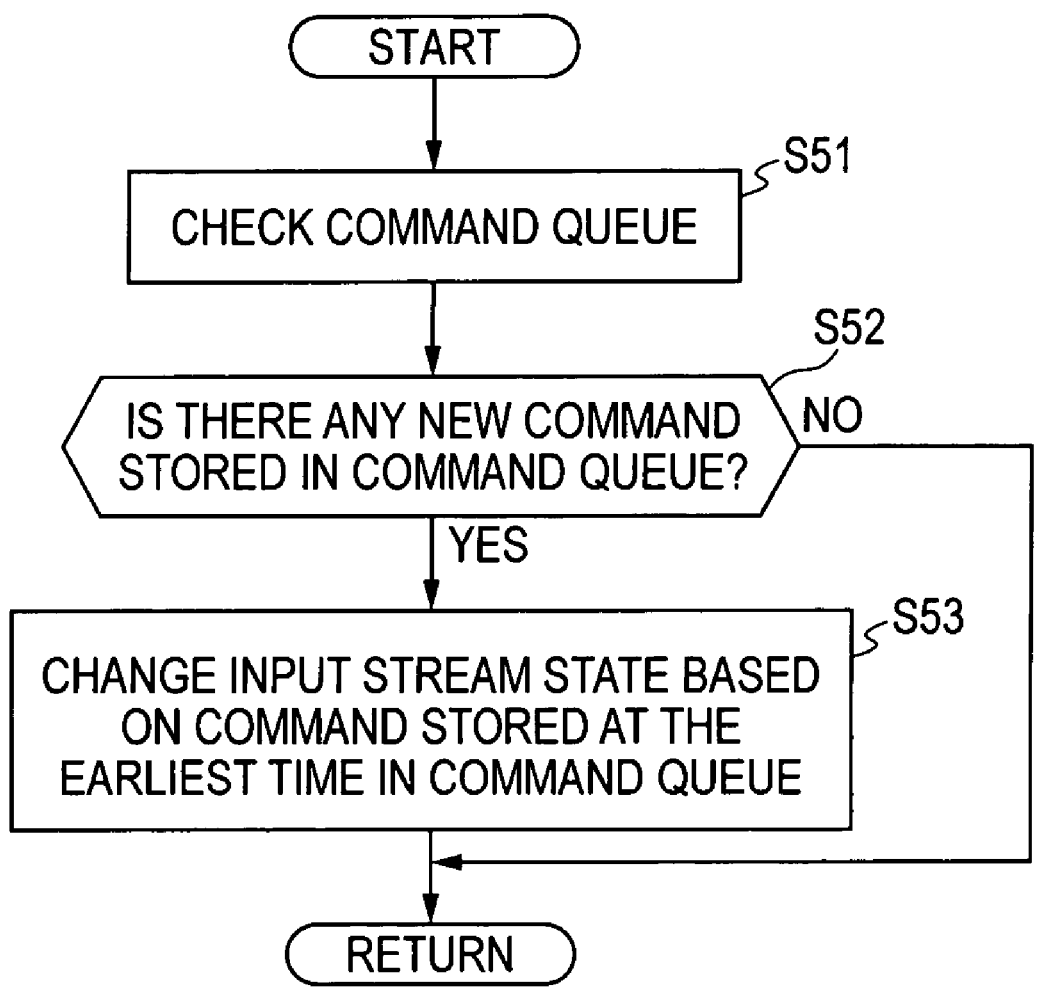
FIG. 5 is a flowchart illustrating input-stream state changing processing.

In step S31, input stream state changing processing, which is described in detail below with reference to FIG. 5, is executed. In the input stream state changing processing, the CPU 20 checks for a new command issued from the CPU 11.

Figure 6:
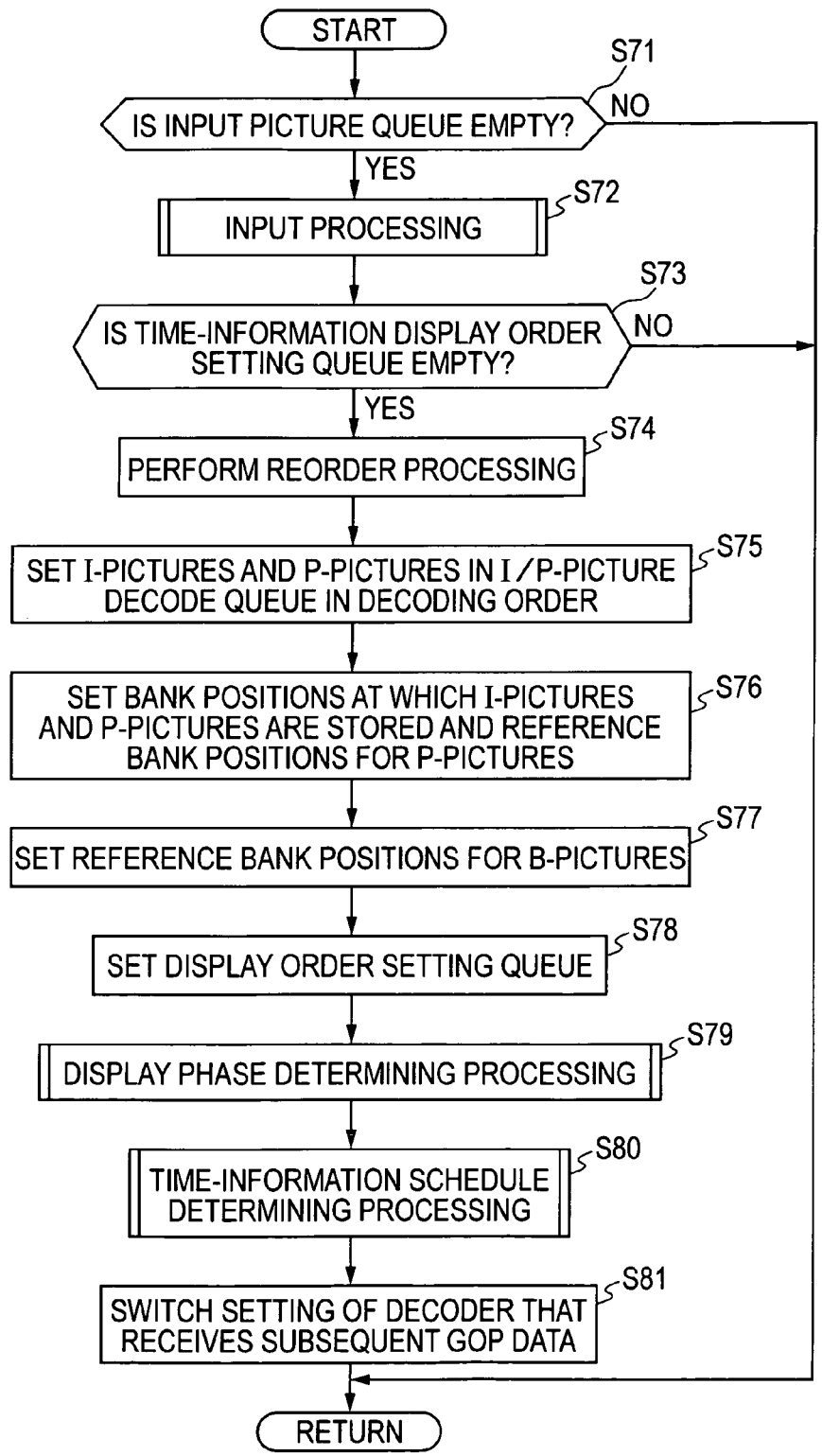
FIG. 6 is a flowchart illustrating decode schedule processing 1.

In step S32, decode schedule processing 1, which is described in detail below with reference to FIG. 6, is executed. In the decode schedule processing 1, the decode timing is scheduled.

In step S33, the CPU 20 refers to a time counter indicating the processing time for one frame to determine whether the subject frame is one of the first through sixth frames of stream data to be played back in the decoding order.

If it is determined in step S33 that the subject frame is not one of the first through sixth frames of the stream data, the process proceeds to step S34 in which one-frame delay display setting processing, which is described below with reference to FIG. 38, is executed. In the one-frame delay display setting processing, a baseband frame image decoded and generated in frame control processing 1 in step S35 of the previous processing routine is set.

If it is determined in step S33 that the subject frame is one of the first through sixth frames of the stream data, or after step S34, the process proceeds to step S35 in which frame control processing 1, which is discussed below with reference to FIG. 18, is executed. In the frame control processing 1, a frame to be processed is decoded.

In step S36, the CPU 20 determines whether all frames have been processed. If it is determined in step S36 that not all frames have been processed, the process proceeds to step S37 in which the CPU 20 increments the time counter in units of frames. Then, the process returns to step S31, and the subsequent processing is repeated.

If it is determined in step S36 that all frames have been processed, the processing is completed.

Figure 4:
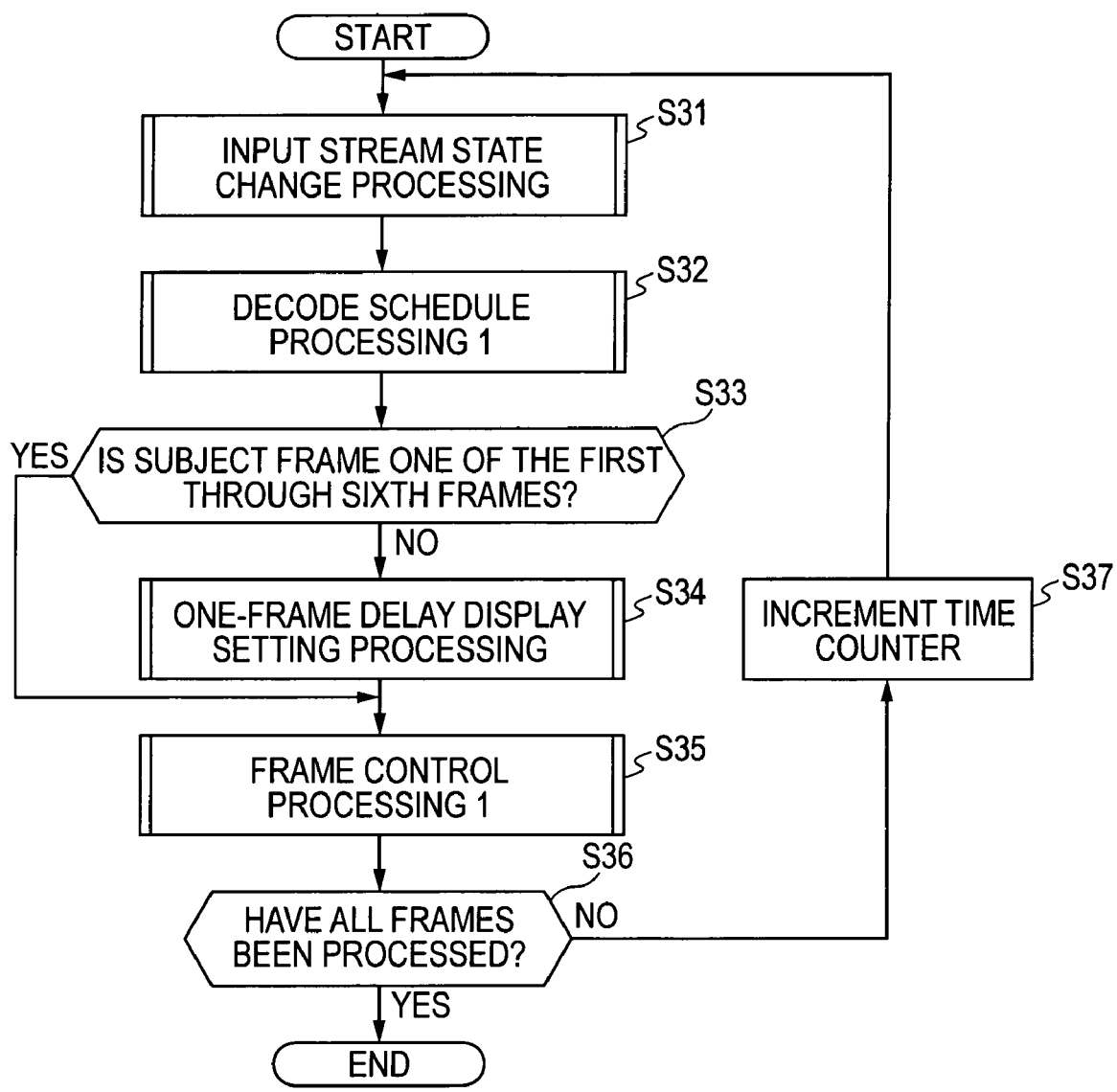
FIG. 4 is a flowchart illustrating frame processing 1 performed on each frame.

According to the processing shown in FIG. 4, the CPU 20 increments the time counter for each frame, and schedules the decoding processing in accordance with the playback speed instructed by the user and allows the corresponding decoder to decode each frame.

Details of the input stream state changing processing in step S31 of FIG. 4 are discussed below with reference to the flowchart of FIG. 5.

In step S51, the CPU 20 checks the command queue storing commands from the command buffer 31.

In step S52, the CPU 20 determines whether a new command to change the input stream state, such as to change the playback speed and the playback direction or to finish the playback operation, is stored in the command queue.

If it is determined in step S52 that a new command is stored, the process proceeds to step S53 in which the CPU 20 changes the input stream state, for example, the playback speed and the playback direction, based on the command stored at the earliest time in the command queue. If it is determined in step S52 that a new command is not stored in the command queue, or after step S53, the process returns to step S31 in FIG. 4.

According to this processing, the command stored at the earliest time in the command queue storing commands obtained from the command buffer 31 is checked, and based on this command, the input stream state is changed.

Details of the decode schedule processing 1 executed in step S32 of FIG. 4 are described below with reference to the flowchart of FIG. 6.

In step S71, the CPU 20 refers to the input picture queue to determine whether the input picture queue is empty. The input picture queue is an information queue, which is set in the input processing performed in step S72, storing the picture IDs of input pictures for which decode scheduling is to be conducted and pictures required for the scheduling.

Figure 7:
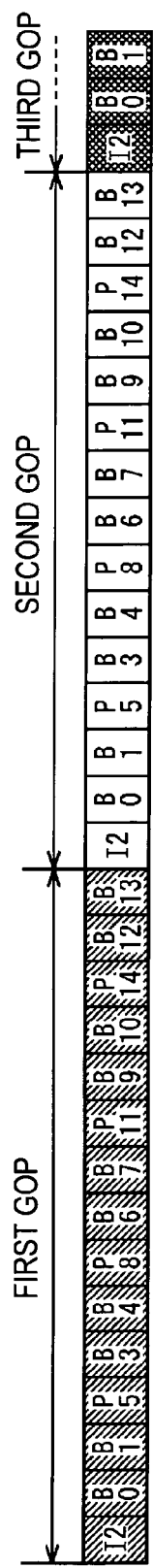
FIG. 7 illustrates an MPEG long GOP.

It is now assumed that stream data handled in the playback apparatus 1 is MPEG long GOP stream data, each GOP including 15 pictures, such as that shown in FIG. 7. Each of the decoders 22, 23, and 24, which performs decoding processing for each group of 15 pictures, receives a total of 16 pictures, i.e., 13 pictures, except for the first two B-pictures in the display order, of one GOP and the first three IBB-pictures of the subsequent GOP (in the case of the forward-direction playback operation) or the first three IBB-pictures of the previous GOP (in the case of the reverse-direction playback operation).

Figure 8A:
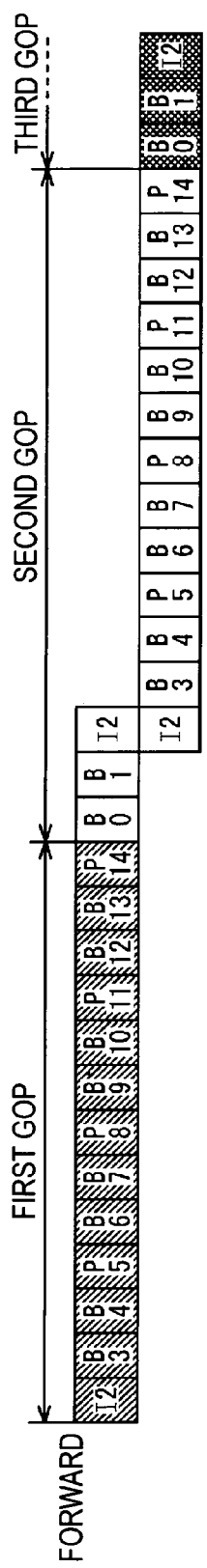
FIGS. 8A and 8B illustrate the decoding processing unit for decoding processing performed by one decoder.
Figure 8B:
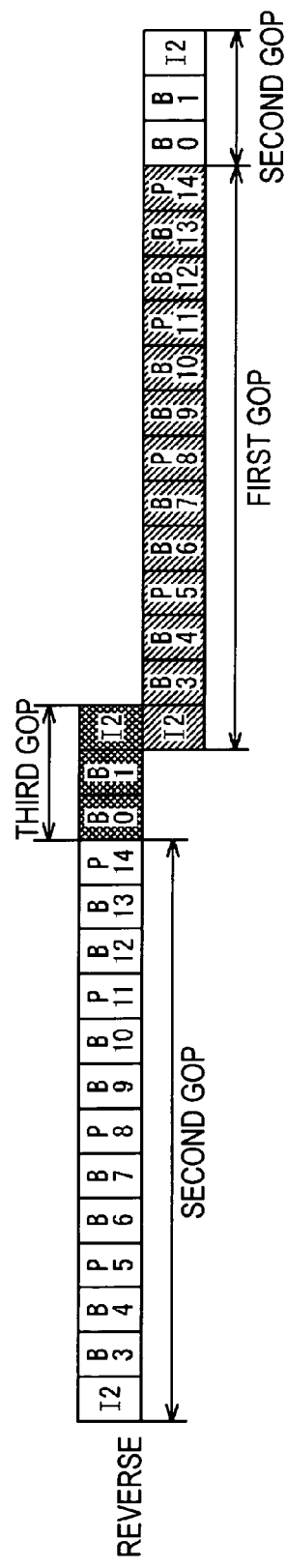

The decode units assigned to the decoders 22, 23, and 24 are discussed below with reference to FIGS. 8A and 8B. In FIGS. 8A and 8B, the arrangements of the pictures supplied to the decoders 22, 23, and 24 are shown in the display order. In the playback apparatus 1, each GOP having 15 pictures is decoded in one of the decoders 22, 23, and 24. As stated above, each of the decoders 22, 23, and 24 receives a total of 16 pictures, i.e., 13 pictures, except for the first two B-pictures in the display order, of one GOP and the first three pictures of the previous or subsequent GOP. That is, if the playback direction is forward, as shown in FIG. 8A, a first decoder selected from the decoders 22, 23, and 24, receives the 13 pictures, except for the first two B-pictures, of the first GOP and the first three pictures of the second GOP, and a second decoder receives the 13 pictures, except for the first two B-pictures in the display order, of the second GOP and the first three pictures of the third GOP. Similarly, a third decoder receives the 13 pictures, except for the first two pictures, of the third GOP and the first three pictures of the fourth GOP. If the playback direction is reverse, as shown in FIG. 8B, the first decoder selected from the decoders 22, 23, and 24 receives the 13 pictures, except for the first two B-pictures, of the second GOP and the first three pictures of the third GOP, and the second decoder receives the 13 pictures, except for the first two B-pictures, of the first GOP and the first three pictures of the second GOP.

In the input picture queue, the picture IDs of the input pictures for which decode scheduling is to be conducted and the pictures required for the scheduling are set. That is, in the input picture queue, the picture IDs of a total of 18 pictures, i.e., the picture IDs of 15 pictures of one GOP and the first three IBB-pictures of the previous or subsequent GOP of MPEG long GOP stream data are stored.

Figure 9A:
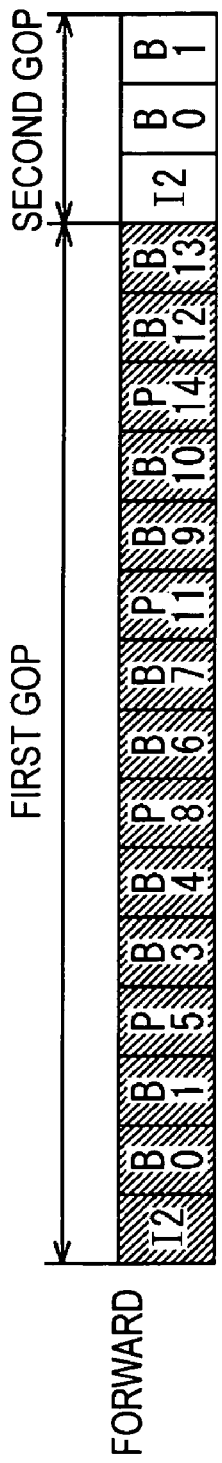
FIGS. 9A and 9B illustrate information stored in an input picture queue.
Figure 9B:
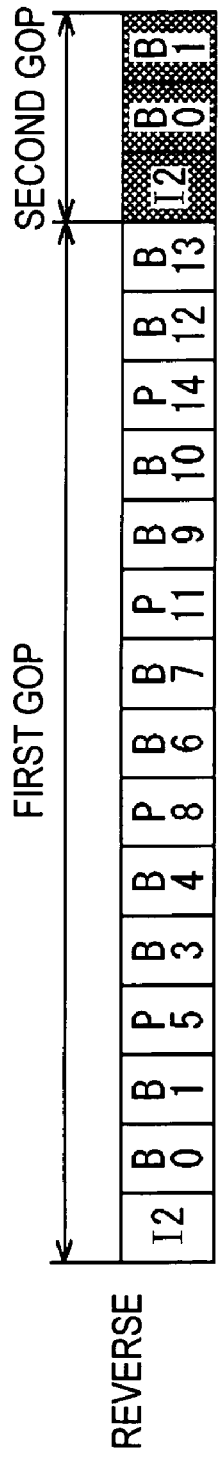

FIG. 9A illustrates the picture IDs of the 15 pictures of the first GOP and the first three IBB-pictures of the second GOP, which is subsequent to the first GOP, of the MPEG long GOP stream data stored in the input picture queue to perform a forward-direction playback operation. FIG. 9B illustrates the picture IDs of the 15 pictures of the second GOP and the first three IBB-pictures of the third GOP, which is prior to the second GOP, of the MPEG long GOP stream data stored in the input picture queue to perform a reverse-direction playback operation.

If it is determined in step S71 that the input picture queue is not empty, the process returns to step S32 in FIG. 4. That is, in the decode schedule processing, a total of 16 pictures, i.e., the 13 pictures from the third picture to the 15-th picture of a GOP and the first three pictures of the subsequent GOP, are processed as the processing unit.

Figure 15:
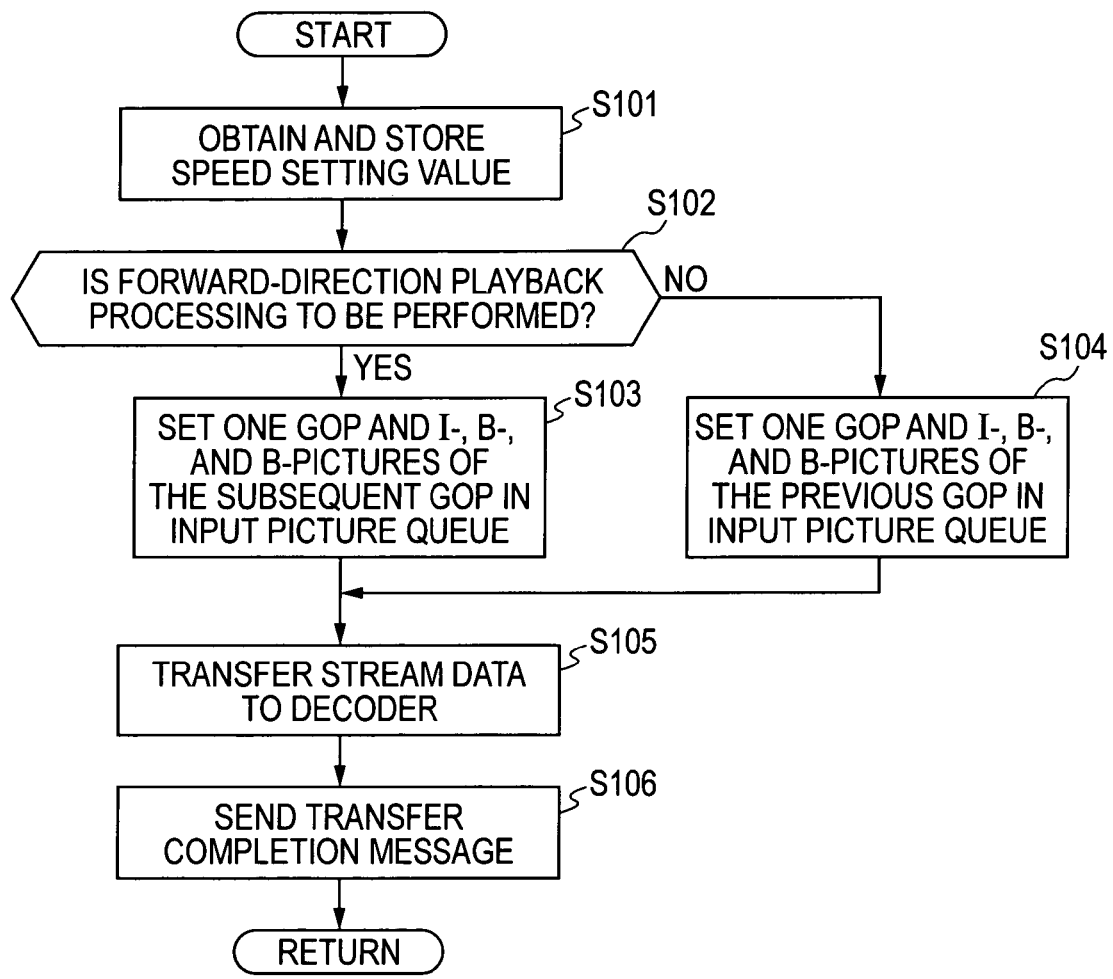
FIG. 15 is a flowchart illustrating input processing.

If it is determined in step S71 that the input picture queue is empty, the input processing in step S72, which is discussed below with reference to the flowchart of FIG. 15, is performed.

In step S73, the CPU 20 determines based on the register value indicating the decoder that receives the subsequent data whether the time-information display order setting queue, which is set in accordance with the decoder that receives the subsequent data, is empty. The time-information display order setting queue is a queue set in the time-information schedule determining processing in step S80 for each of a plurality of decoders (decoders 22, 23, and 24 in FIG. 1). Details of the time-information schedule determining processing are given below with reference to the flowchart of FIG. 17.

If it is determined in step S73 that the time-information display order setting queue corresponding to the decoder that receives the subsequent data is not empty, that is, if the decoding processing or display processing is being executed on each frame of the pictures of the scheduled GOP, the process returns to step S32 in FIG. 4.

If it is determined in step S73 that the time-information display order setting queue is empty, the process proceeds to step S74 in which the CPU 20 performs reorder processing. In the reorder processing, the picture IDs of the 18 pictures arranged in the coding order set in the input picture queue are rearranged in the display order and are set in the display order information queue.

Figure 10A:
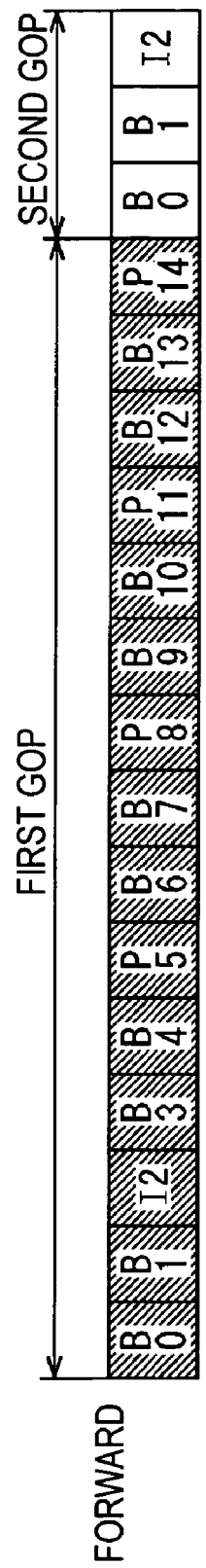
FIGS. 10A and 10B illustrate information stored in a display order information queue.
Figure 10B:
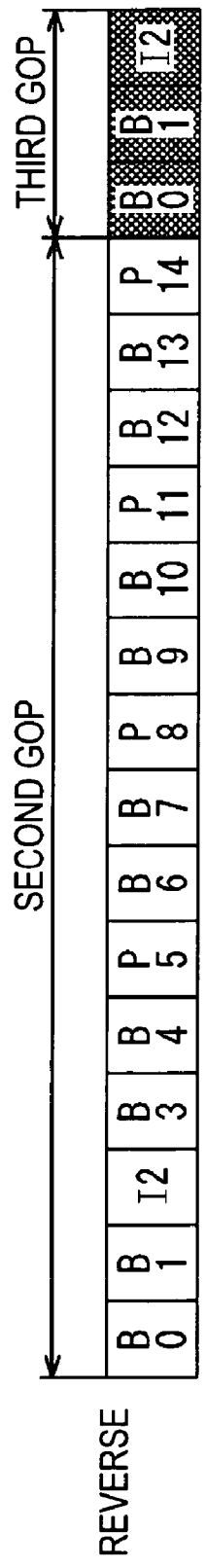

Accordingly, if the playback direction is forward, the picture IDs set in the input picture queue, as discussed with reference to FIG. 9A, rearranged in the display order as shown in FIG. 10A are set in the display order information queue. If the playback direction is reverse, the picture IDs set in the input picture queue, as discussed with reference to FIG. 9B, rearranged in the display order as shown in FIG. 10B are set in the display order information queue.

When the reorder processing is executed to set the picture IDs in the display order information queue in step S74, all the picture IDs queued in the input picture queue are output and the input picture queue becomes empty. That is, if it is determined in step S71 that the input picture queue is empty, it means that the picture IDs queued in the input picture queue are reordered. If it is determined in step S71 that the input picture queue is not empty, it means that the reorder processing in step S74 is not executed since the time-information display order setting queue corresponding to the decoder that receives the subsequent data is not empty after executing the input processing 1 in step S72 in the previous decode schedule processing.

In step S75, the CPU 20 refers to the display order information queue set in step S74 and sets the picture IDs of I-pictures and P-pictures of a GOP to be decoded in the I/P-picture decode queue in the decoding order. The I/P-picture decode queue is a queue in which the picture IDs of I-pictures and P-pictures to be decoded prior to B-pictures are set in the decoding order.

Figure 11A:
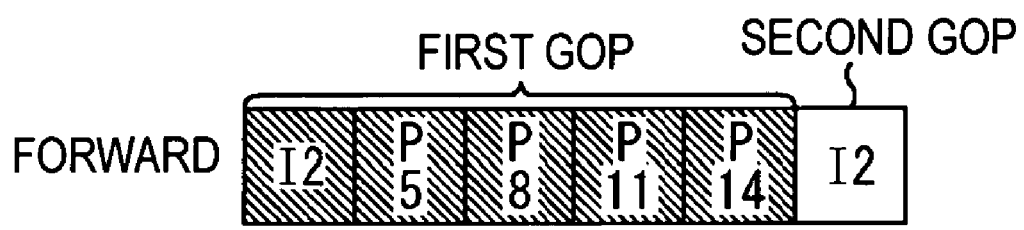
FIGS. 11A and 11B illustrate information stored in an I/P-picture decode queue.
Figure 11B:
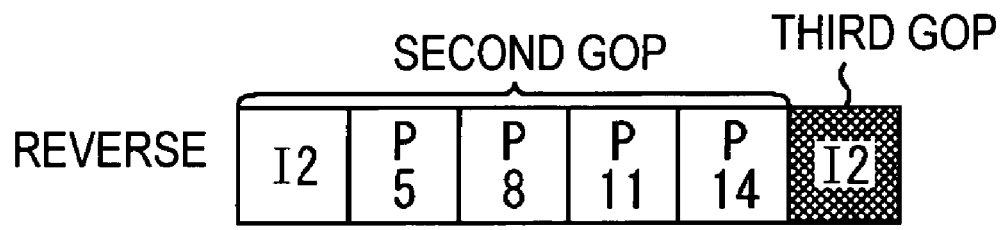

FIGS. 11A and 11B respectively illustrate the I/P-picture decode queue when the fast forward-direction playback operation and the reverse-direction playback operation are performed. In the I/P-picture decode queue when the forward-direction playback operation is performed, as shown in FIG. 11A, the picture IDs of 6 pictures corresponding to the I-pictures and P-pictures of the picture IDs set in the display order information queue shown in FIG. 10A are set. In the I/P-picture decode queue when the reverse-direction playback operation is performed, as shown in FIG. 11B, the picture IDs of 6 pictures corresponding to the I-pictures and P-pictures of the picture IDs set in the display order information queue shown in FIG. 10B are set.

In step S76, the CPU 20 designates bank positions at which I-pictures and P-pictures are stored and also designates reference image banks for decoding P-pictures. For I-pictures and P-pictures, 6 fixed banks of the 8 banks in the video bank memory 82 shown in FIG. 2 are used.

By decoding I-pictures and P-pictures (also referred to as "anchor frames") first and by fixing bank positions at which the decoded I-pictures and P-pictures are stored, stream data can be played back from any picture in the forward-direction playback operation, the reverse-direction playback operation, or the random playback operation. By decoding 6 I-pictures and P-pictures first, as the processing time for the I-pictures and P-pictures is shorter, the time from when an instruction to start the playback operation or to change the playback speed or the playback direction is given from the user to when the pictures are displayed by reflecting the instruction can be reduced regardless of the position of the display start frame in a GOP. Additionally, the display time when a desired picture is displayed in a scrub playback operation can be reduced. As a result, the performance during the fast playback operation can be improved.

In step S77, the CPU 20 designates the positions of reference image banks for decoding B-pictures based on the bank position at which each of I-pictures and P-pictures is stored, as designated in step S76. Bank positions at which B-pictures are stored are designated in the frame control processing 1, which is discussed below.

In step S78, the CPU 20 sets the display order setting queue.

Figure 12A:
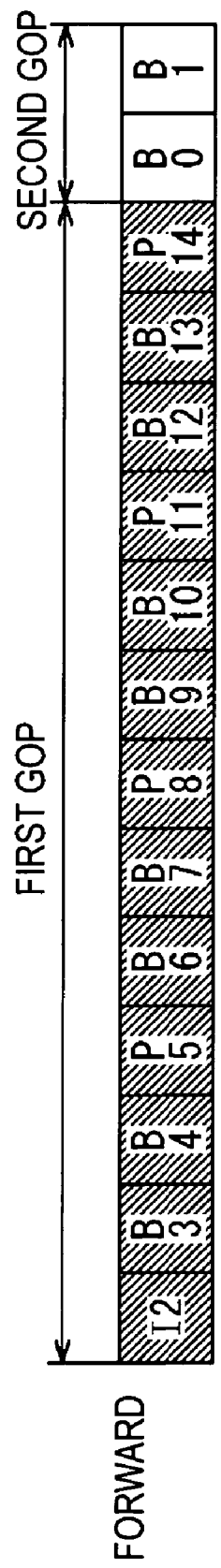
FIG. 12 illustrates information stored in a display order setting queue.
Figure 12B:
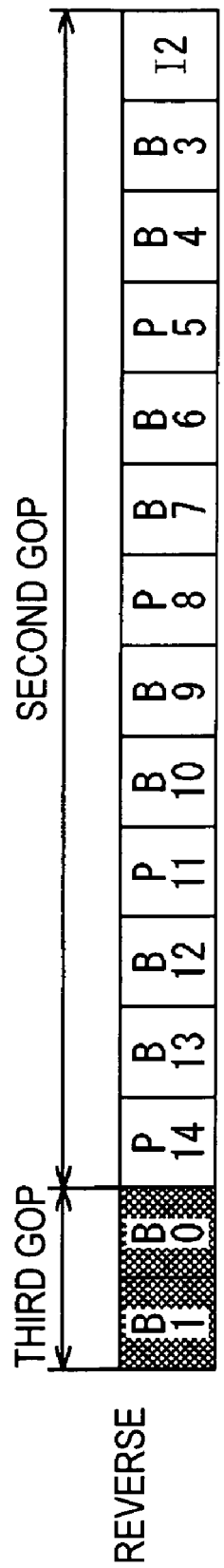

FIGS. 12A and 12B illustrate the display order setting queue in the forward-direction playback operation and the reverse-direction playback operation, respectively. In the display order setting queue when the forward-direction playback operation is performed, the 18 picture IDs queued in the display order information queue shown in FIG. 10A, except for the first two B-pictures and the final I picture, namely, the 15 picture IDs, i.e., the 16 picture IDs shown in FIG. 8A supplied to one of the decoders 22, 23, and 24, except for the final I-picture, are set in the display order, as shown in FIG. 12A.

In the display order setting queue when the reverse-direction playback operation is performed, the 18 picture IDs queued in the display order information queue shown in FIG. 10B, except for the first two B-pictures and the final I picture, namely, the 15 picture IDs, i.e., the 16 picture IDs shown in FIG. 8B supplied to one of the decoders 22, 23, and 24, except for the final I-picture, are set in the display order, as shown in FIG. 12B.

When the display order setting queue is set in step S78, pictures IDs queued in the display order information queue are all output, and the display order information queue becomes empty.

Figure 16:
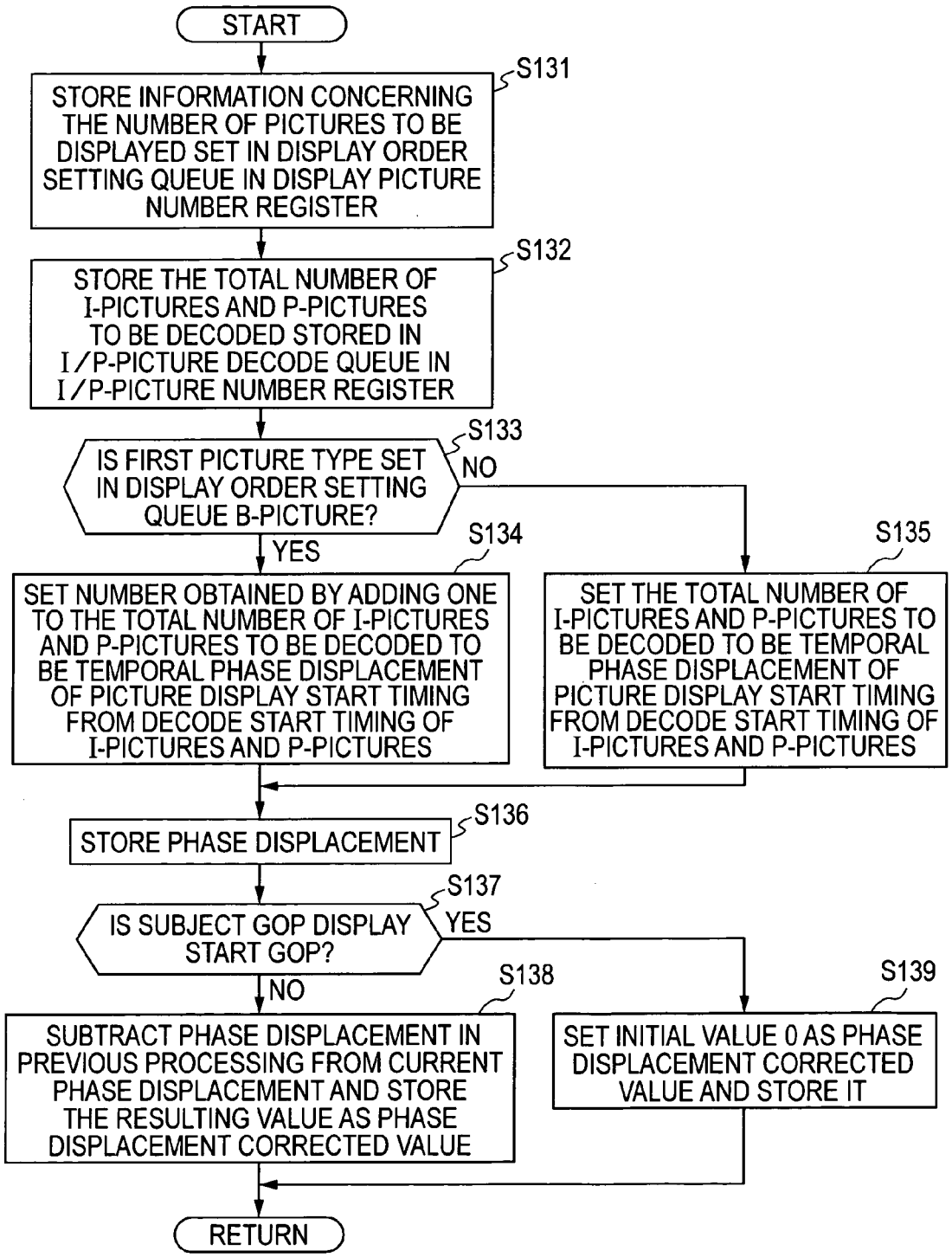
FIG. 16 is a flowchart illustrating display phase determining processing.

In step S79, display phase determining processing, which is discussed below with reference to FIG. 16, is executed. In the display phase determining processing, a displacement between the decode start timing and the display start timing in the processing unit, which is equal to one GOP including 15 frames and one frame, is determined.

Figure 17:
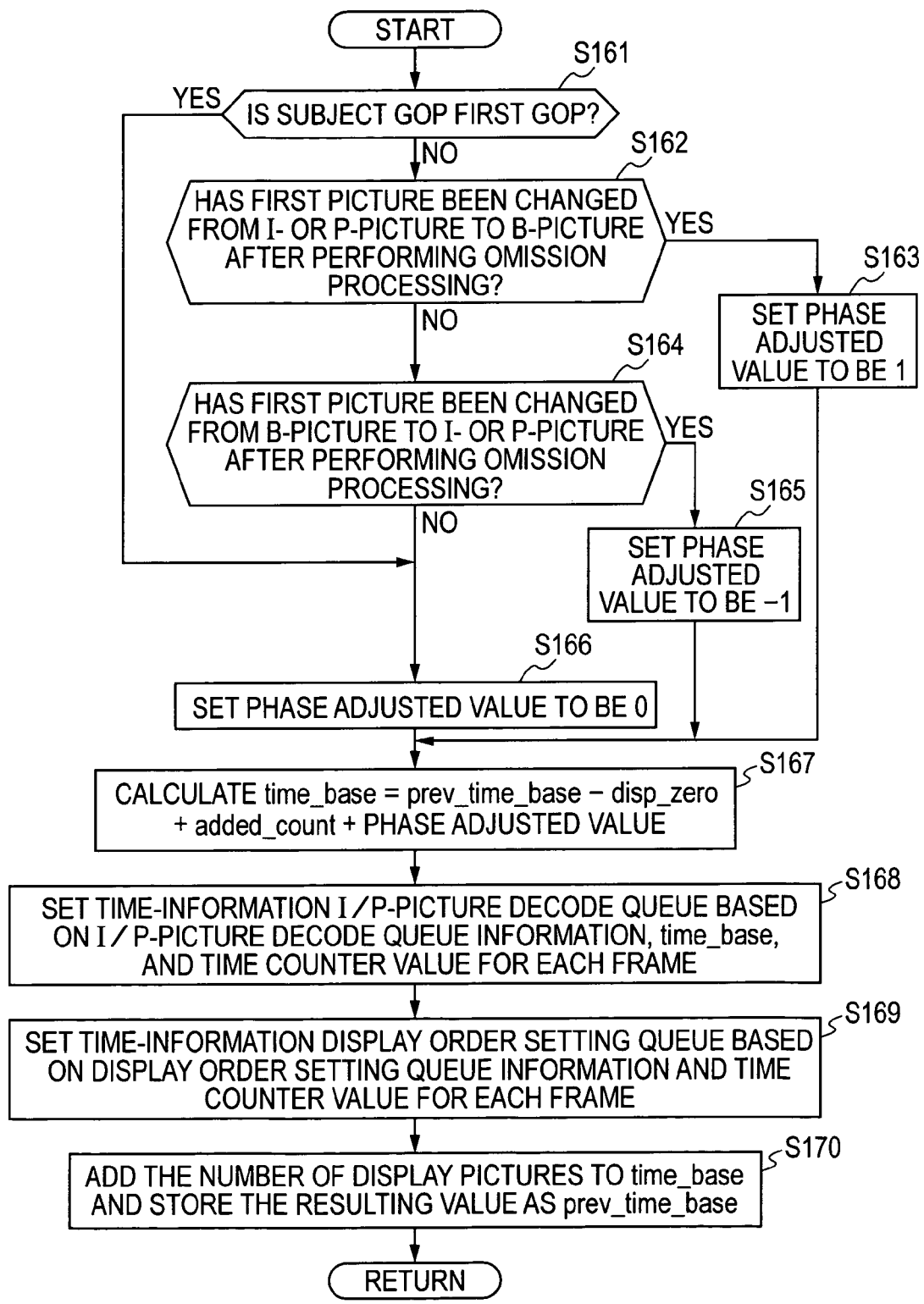
FIG. 17 is a flowchart illustrating time-information schedule determining processing.

In step S80, time-information schedule determining processing, which is discussed below with reference to the flowchart of FIG. 17, is executed. In the time-information schedule determining processing, to control the decode timing for each frame, the decode scheduling is conducted, and the time information is set in the predetermined information queue in association with the picture IDs.

Figure 13:
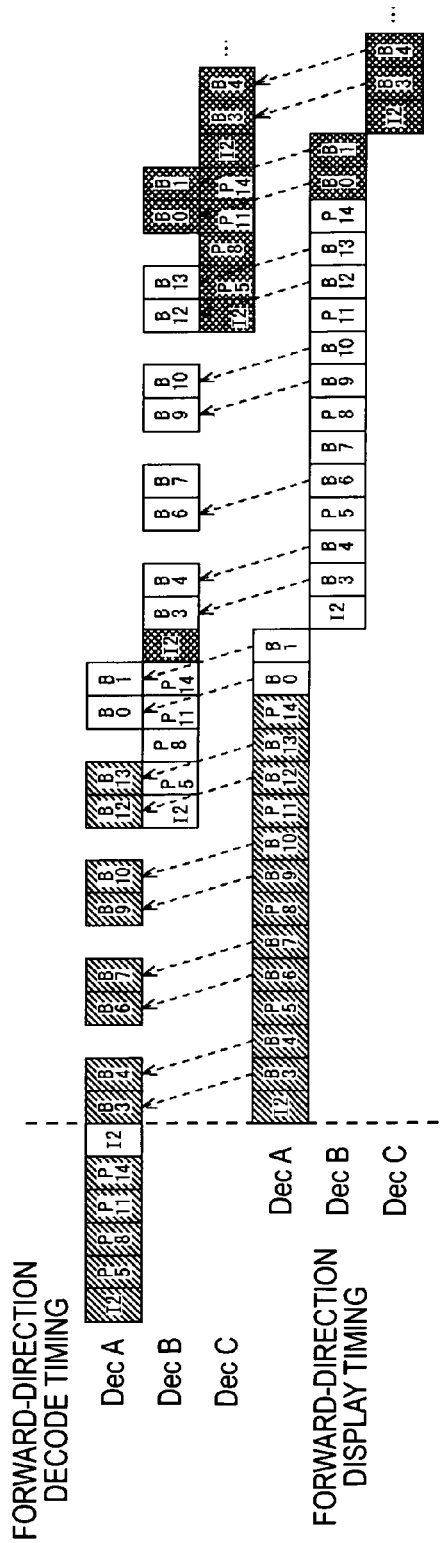
FIGS. 13 and 14 illustrate the decode timing and display timing.
Figure 14:
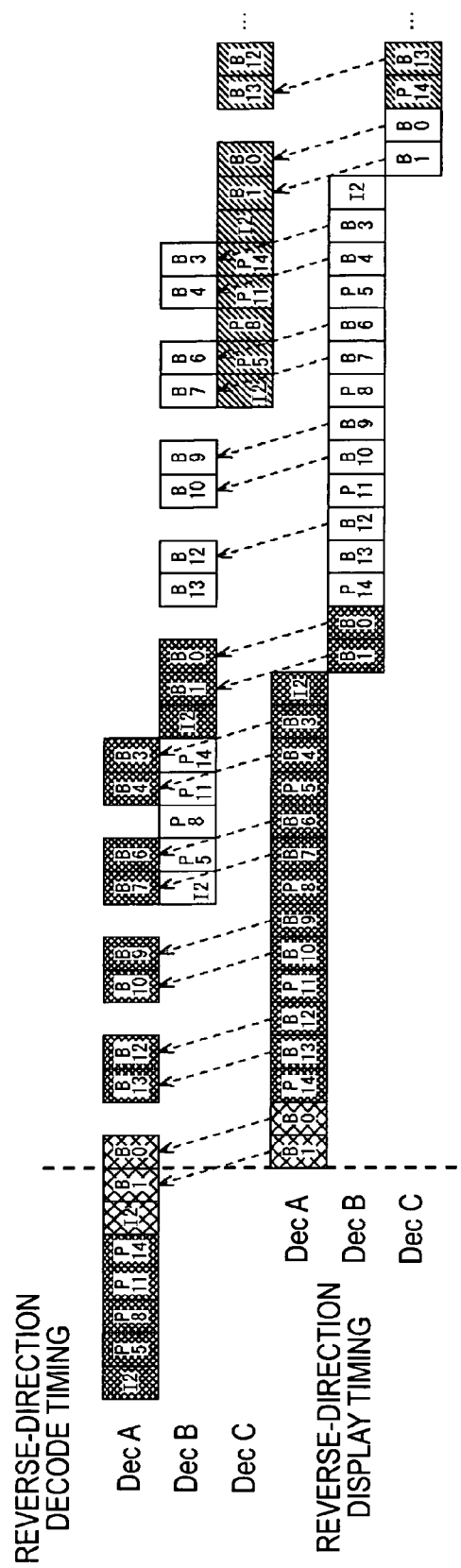

In steps S79 and S80, the decode timing and the display timing are scheduled. More specifically, when the head of the display image is an I-picture or a P-picture, it means that the playback operation direction and the playback speed are forward and normal. In this case, I-pictures and P-pictures are decoded before the B-pictures, as shown in FIG. 13, and the decode timing and display timing are scheduled so that the display start timing is displaced from the decode start timing by 6 pictures, with the result that the display timing of B-pictures is displaced from the decode timing of B-pictures by one frame. When the head of the display image is a B-picture, it means that the playback direction is reverse, in other words, the speed setting indicates a negative value. In this case, the I-pictures and P-pictures are decoded before the B-pictures, as shown in FIG. 14, and the decode timing and display timing are scheduled so that the display start timing is displaced from the decode start timing by 7 pictures, with the result that the display timing of B-pictures is displaced from the decode timing of B-pictures by one frame.

In step S81, the CPU 20 switches the decoder that receives the subsequent data. More specifically, when the register value indicating the decoder that receives the subsequent data is equal to the value smaller than the number of decoders (3 in the playback apparatus 1 shown in FIG. 1) by one (i.e., 2 in the playback apparatus 1 shown in FIG. 1), the CPU 20 sets the register value to be 0. When the register value is smaller than the number of decoders by two or more, the CPU 20 increments the register value by one. After step S81, the process returns to step S32 in FIG. 4.

According to the above-described processing, the decode timing and the display timing are scheduled.

A description is now given of the input processing executed in step S72 in FIG. 6 with reference to the flowchart of FIG. 15.

Figure 3:
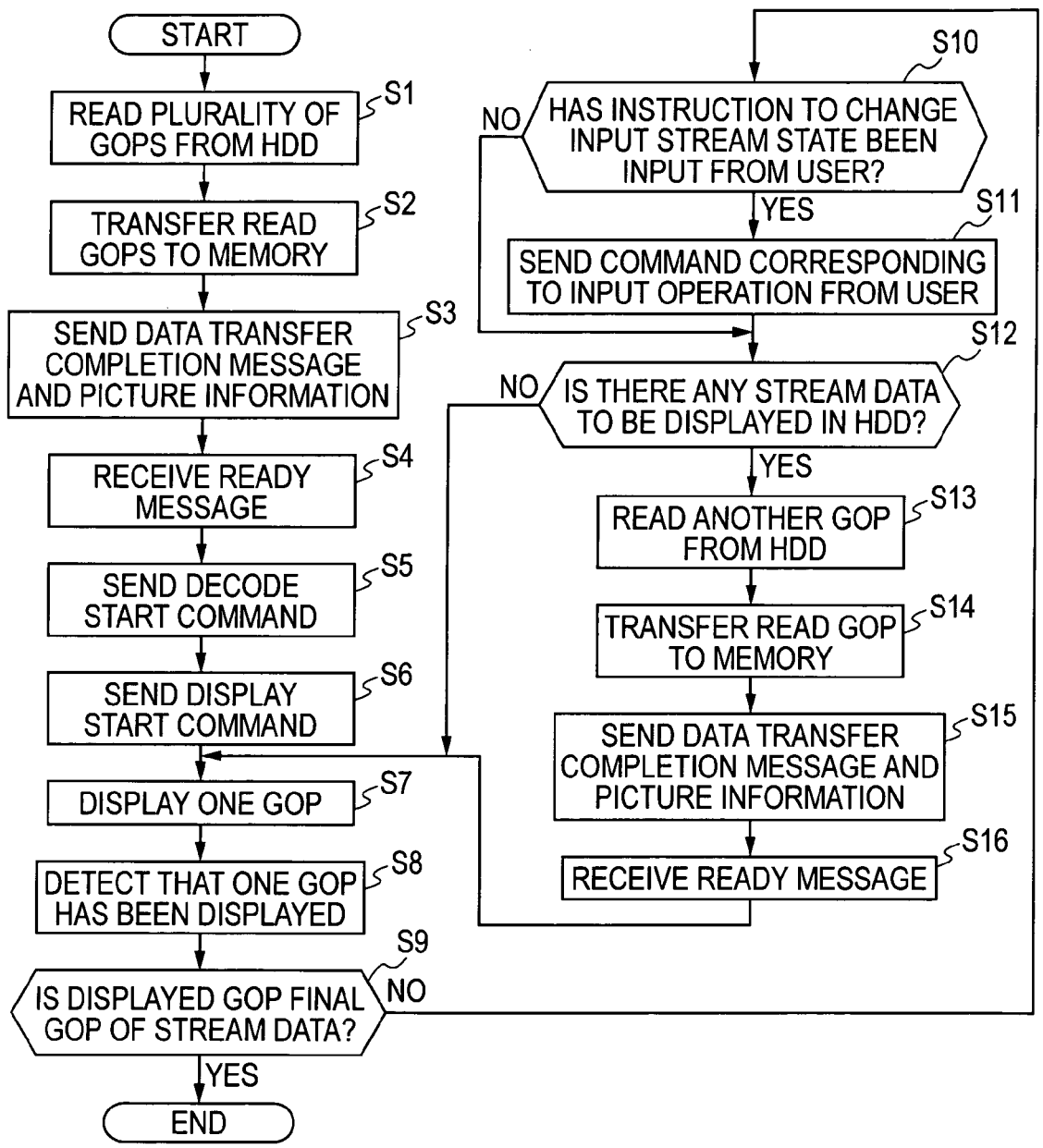
FIG. 3 is a flowchart illustrating control processing.

In step S101, the CPU 20 obtains the display speed information contained in the decode start command sent to the command buffer 31 by the CPU 11 in step S5 in FIG. 3 or obtains the speed setting value from the command sent to the command buffer 31 by the CPU 11 in response to the input from the user in step S11 in FIG. 3, and stores the obtained information in the memory 21. If the speed setting value is positive, the playback direction is forward, and if the speed setting value is negative, the playback direction is reverse.

The speed setting values are determined as follows. If the speed setting value is 1, the normal playback operation is performed. If the speed setting value is greater than 1, the fast playback operation is performed. If the speed setting value is a positive value smaller than 1, the low-speed playback operation is performed. If the speed setting value is −1, the normal-speed reverse-direction playback operation is performed. If the speed setting value is smaller than −1, the fast reverse-direction playback operation is performed. If the speed setting value is a negative value smaller than the absolute value 1, the low-speed reverse-direction playback operation is performed.

The CPU 11 then determines in step S102 whether the processing to be performed is a forward-direction playback operation or a reverse-direction playback operation according to whether the speed setting value obtained in step S101 is positive or negative.

If the playback direction is found to be forward in step S102, the process proceeds to step S103. In step S103, the CPU 20 sets the picture IDs of the 13 frames from the head of a GOP to be decoded and the I-, B-, and B-pictures of the subsequent GOP in the input picture queue discussed with reference to FIG. 9A.

If it is determined in step S102 that the playback direction is not forward, that is, the playback direction is reverse, the process proceeds to step S104. In step S104, the CPU 20 sets the picture IDs of the 13 frames from the end of a GOP to be decoded and the I-, B-, and B-pictures of the previous GOP in the input picture queue discussed with reference to FIG. 9B.

After step S103 or S104, in step S105, the CPU 20 controls the PCI bridge 17 to transfer the 16-frame compressed image data discussed with reference to FIGS. 8A and 8B among the stream data stored in the memory 18 to the predetermined decoder selected from the decoders 22, 23, and 24 on the basis of the setting of the input picture queue and the register value indicating the decoder that receives the subsequent data. In this case, for the first GOP of the stream data, the register value is the value determined in the initial setting, and for the second or subsequent GOP, the register value is the value determined in step S81 of FIG. 6.

In the decoder 22, 23, or 24, the input processor 71 supplies the 16 frame data to the memory controller 74 and stores the data in the input buffer 75. The input processor 71 also supplies information concerning, for example, the head address, data size, picture size information, and Q matrix, of each picture to the address management table 72 and stores the information for each picture as table information that can be identified by the table ID.

In step S106, the CPU 20 sends a stream transfer completion message to the CPU 11 by supplying a result indicating that one GOP stream has been transferred to the predetermined decoder to the result buffer 32 of the PCI bridge 17 via the control bus 19. The process then returns to step S72 in FIG. 6.

According to the input processing, the 16 frame data, which serves as the decoding processing unit, discussed with reference to FIGS. 8A and 8B, is supplied to the decoder 22, 23, or 24.

The display phase determining processing for setting the phase that delays the display start timing with respect to the decode start timing executed in step S79 of FIG. 6 is described below with reference to the flowchart of FIG. 16.

In step S131, the CPU 20 stores information concerning the number of pictures to be displayed set in the display order setting queue shown in FIGS. 12A and 12B in the display picture number register. Since the picture IDs of the 15 pictures are set in the display order setting queue in FIGS. 12A and 12B, 15 is set in the display picture number register.

In step S132, the CPU 20 stores the total number of I-pictures and P-pictures to be decoded, which are stored in the I/P-picture decode queue shown in FIGS. 11A and 11B, in the I/P-picture number register. Since the picture IDs of the 6 pictures are set in the I/P-picture decode queue shown in FIGS. 11A and 11B, 6 is stored in the I/P-picture number register.

In step S133, the CPU 20 determines whether the picture type of picture ID set at the head of the display order setting queue is a B-picture. In other words, it is determined in step S133 whether the playback direction is forward or reverse when calculating a phase displacement in the normal-speed forward-direction or reverse-direction playback operation. After performing omission processing 1, which is described below, even if the picture type of picture ID at the head of the display order setting queue is a B-picture, the playback direction may be forward or reverse depending on the playback speed.

If the picture type of the picture ID at the head of the display order setting queue is found to be a B-picture in step S133, the process proceeds to step S134. In step S134, the CPU 20 sets the number obtained by adding one to the total number of I-pictures and P-pictures to be decoded as the temporal phase displacement disp_phase of the display start timing of the pictures of the picture IDs set in the display order setting queue from the decode start timing of the I-pictures and P-pictures of the picture IDs set in the I/P-picture decode queue.

For example, when the playback speed is ×−1, as shown in FIG. 14, the picture type of picture ID at the head of the display order setting queue is a B-picture. After decoding the I-pictures and P-pictures, the B-pictures are decoded so that the display timing of the B-picture is displaced from the decode timing of the I-pictures and P-pictures by 7 pictures, with the result that the display timing of the B-picture is displaced from the decode timing of the B-picture by one frame.

If it is determined in step S133 that the picture type of picture ID at the head of the display order setting queue is not a B-picture, the process proceeds to step S135. In step S135, the CPU 20 sets the total number of I-pictures and P-pictures to be decoded as the temporal phase displacement disp_phase of the display start timing of the pictures of the picture IDs set in the display order setting queue from the decode start timing of the I-pictures and P-pictures of the picture IDs set in the I/P-picture decode queue.

For example, when the playback speed is ×1, as shown in FIG. 13, the picture type of picture ID at the head of the display order setting queue is not a B-picture but an I-picture. After decoding the I-pictures and P-pictures, the B-pictures are decoded so that the display timing of the I-picture is displaced from the decode timing of the I-pictures and P-pictures by 6 pictures, with the result that the display timing of the B-picture is displaced from the decode timing of the B-picture by one frame.

After step S134 or S135, in step S136, the CPU 20 stores the display phase displacement disp_phase determined in step S134 or S135 in a built-in register.

In step S137, the CPU 20 determines whether the subject GOP is the display start GOP (including the case where the subject GOP is located at the position where the playback operation is restarted after the playback speed is changed).

If it is determined in step S137 that the subject GOP is not a display start GOP, the process proceeds to step S138. In step S138, the CPU 20 subtracts the phase displacement prev_disp_phase in the previous GOP in the previous processing from the display phase displacement disp_phase determined in step S134 or S135, and stores the resulting value as the displacement corrected value disp_zero in the built-in register. The CPU 20 also substitutes the display phase displacement disp_phase determined in step S134 or S135 into the display phase displacement prev_disp_phase in the previous GOP. The process then returns to step S79 in FIG. 6.

If it is determined in step S137 that the subject GOP is a display start GOP, the process proceeds to step S139 in which the CPU 20 sets the initial value 0 as the displacement corrected value disp_zero in the built-in register. The process then returns to step S79 in FIG. 6.

According to the display phase determining processing, the phase that delays the display start timing with respect to the decode start timing can be determined.

The time-information schedule determining processing executed in step S80 of FIG. 6 is described below with reference to the flowchart of FIG. 17.

In step S161, the CPU 20 determines whether the subject GOP is the decoding processing unit corresponding to the first GOP after changing the input stream state. The decoding processing unit whose picture type has been changed after performing omission of pictures is not the first decoding processing unit but the second or subsequent decoding processing unit. Accordingly, if it is determined in step S161 that the subject GOP is the decoding processing unit corresponding to the first GOP, the process proceeds to step S166.

If it is determined in step S161 that the subject GOP is not the decoding processing unit corresponding to the first GOP, the process proceeds to step S162 to determine whether the first picture has been changed from an I-picture or a P-picture to a B-picture after performing omission of pictures.

If it is determined in step S162 that the first picture has been changed from an I-picture or a P-picture to a B-picture after performing omission of pictures, the process proceeds to step S163 in which the CPU 20 sets the phase adjusted value to be 1. The process proceeds to step S167.

If it is determined in step S162 that the first picture has not been changed from an I-picture or a P-picture to a B-picture after performing omission of pictures, the process proceeds to step S164 to determine whether the first picture has been changed from a B-picture to an I-picture or a P-picture after performing omission of pictures.

If it is determined in step S164 that the first picture has been changed from a B-picture to an I-picture or a P-picture after performing omission of pictures, the process proceeds to step S165 in which the CPU 20 sets the phase adjusted value to be −1. The process then proceeds to step S167.

If it is determined in step S161 that the subject GOP is the first decoding processing unit, or if it is determined in step S164 that the first picture has not been changed from a B-picture to an I-picture or a P-picture after performing omission of pictures, the process proceeds to step S166 in which the CPU 20 sets the phase adjusted value to be 0.

After step S163, S165, or S166, the process proceeds to step S167. In step S167, the CPU 20 calculates the decode start time information time_base indicating the timing at which the first frame of 16 pictures, which is the decoding processing unit, is decoded in one of the decoders 22, 23, and 24 by using the decode start time information prev_time_base of the previous decoding processing unit, the phase displacement corrected value disp_zero, the time information adjusted value added_count calculated in the omission processing 1, which is described below, and the phase adjusted value determined in steps S161 through S166, as in equation (1).

$$\begin{aligned}\text{Decode start time information time\_base} = &\text{decode start} \\ &\text{time information prev\_time\_base of the previous} \\ &\text{GOP-phase displacement corrected value} \\ &\text{disp\_zero+time information adjusted value} \\ &\text{added\_count+phase adjusted value} \end{aligned} \quad (1)$$

To calculate the decode start time information for the display start GOP by using equation (1), the decode start time information prev_time_base of the previous GOP and the time information adjusted value added_count calculated in the omission processing 1 for the previous GOP are set to be 0.

In step S168, the CPU 20 sets the time-information I/P-picture decode queue for the decoder that receives the subsequent data.

In the time-information I/P-picture decode queue, decode start time information time_base of a picture to be first decoded and the count value of the time counter for counting each frame are set in association with the picture IDs set in the I/P-picture decode queue shown in FIGS. 11A and 11B. The time-information I/P-picture decode queue is provided for each of the decoders 22, 23, and 24.

More specifically, the CPU 20 sets the time-information I/P-picture decode queue for the decoder that receives the subsequent data by referring to the register value indicating the decoder that receives the subsequent data. The CPU 20 uses the decode start time information time_base as information indicating the timing at which the frame corresponding to the first picture ID of the picture IDs queued in the I/P-picture decode queue is decoded, and uses the count value of the time counter as information indicating the timing at which the frames corresponding to the other picture IDs are decoded.

When the time-information I/P-picture decode queue is set in step S168, the I/P-picture decode queue becomes empty since all the picture IDs queued in the I/P-picture decode queue are output.

In step S169, the CPU 20 sets the time-information display order setting queue for the decoder that receives the subsequent data.

In the time-information display order setting queue, the value obtained by subtracting one from the phase displacement of the display start timing with respect to the decode start timing for the first picture to be displayed and the count value of the time counter are set in association with the picture IDs set in the display order setting queue discussed with reference to FIGS. 12A and 12B. The time-information display order setting queue is provided for each of the decoders 22, 23, and 24 of the playback apparatus 1.

More specifically, the CPU 20 sets the time-information display order setting queue for the decoder that receives the subsequent data by referring to the register value indicating the decoder that receives the subsequent data. The CPU 20 uses, as the reference time information adjusted to the decode timing of B-pictures, the value obtained by subtracting one from the phase displacement disp_phase indicating the display timing of the first frame in the display order determined in the display phase determining processing, and uses the count value of the time counter as information indicating the timing at which the frames corresponding to the other picture ID are decoded.

When the time-information display order setting queue is set in step S169, the display order setting queue becomes empty since all the picture IDs queued in the display order setting queue are output.

In step S170, the CPU 20 stores in the register the value obtained by adding the number of pictures to be displayed, which are stored in the display picture number register in step S131 of FIG. 16, to the decode start time information time_base as the decode start time information prev_time_base of the previous GOP. The process then returns to step S80 in FIG. 6.

According to the time-information schedule determining processing, the decoding processing timing for 16 frames, which is the decoding processing unit, is set.

According to the display phase determining processing and the time-information schedule determining processing discussed with reference to FIGS. 16 and 17, respectively, the decode phase and display phase are set as time information on the basis of the numbers of I-pictures and P-pictures, the number of pictures to be displayed, and whether the first picture to be displayed is a B-picture. Accordingly, decoded images can be continuously displayed by dynamically changing the speed in accordance with a change in the number of pictures to be decoded and displayed in each decoder, which occurs when fast forward and reverse playback operations are performed by using a plurality of decoders. Even if the omission cycle is changed in response to an instruction to change the playback speed starting from a certain picture, the playback speed can be continuously changed for each frame within the corresponding speed range by increasing or decreasing the number of pictures to be displayed.

According to the processing discussed with reference to FIGS. 6 through 17, the decode schedule processing 1 in step S32 of FIG. 4 can be executed.

Then, if it is determined in step S33 that the subject frame is one of the first through sixth frames, the process proceeds to step S35 by skipping the one-frame delay display setting processing in step S34. In step S35, the frame control processing 1 is executed.

The frame control processing 1 executed in step S35 in FIG. 4 is discussed below with reference to the flowchart in FIG. 18.

In step S191, the CPU 20 determines whether there is any stream data for which the display time has passed by referring to the time-information I/P-picture decode queue and a time management counter for managing the timing of each processing executed in the playback apparatus 1. If it is determined in step S191 that there is stream data for which the display time has passed, the process proceeds to step S197.

Figure 19:
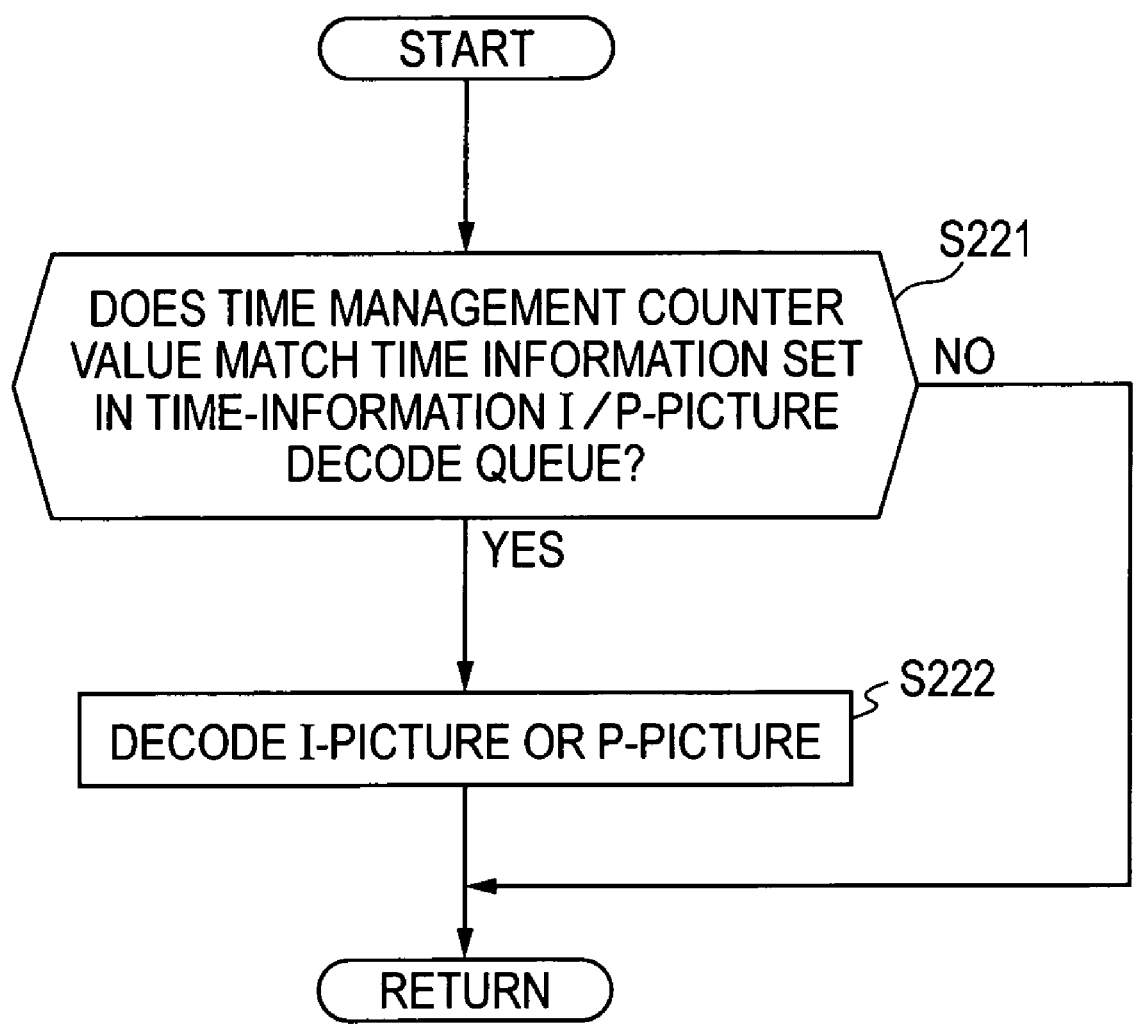
FIG. 19 is a flowchart illustrating I-picture/P-picture decoding processing.

If it is determined in step S191 that there is no stream data for which the display time has passed, the process proceeds to step S192 in which I-picture/P-picture decoding processing, which is discussed below with reference to FIG. 19, is executed.

Figure 20:
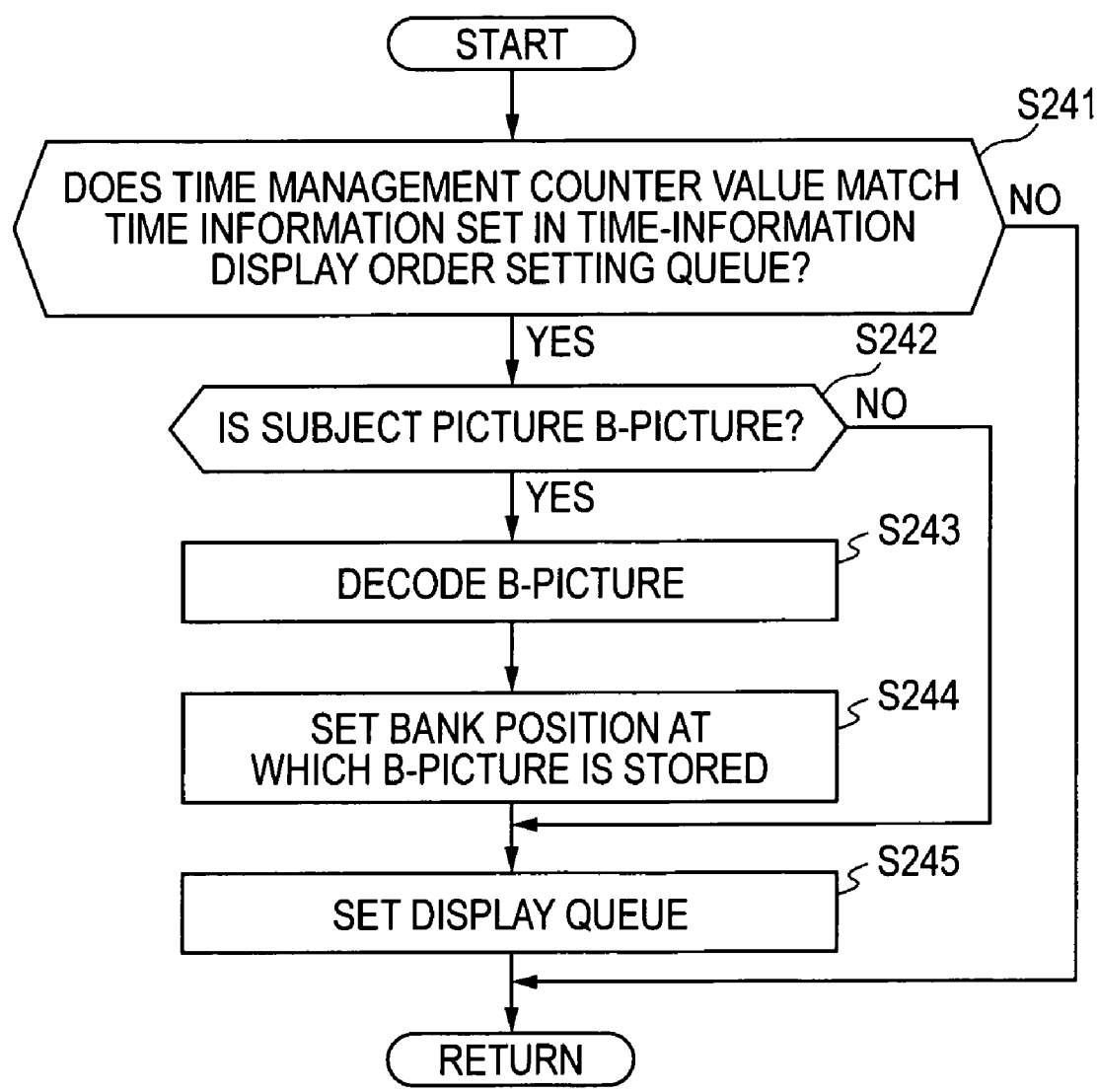
FIG. 20 is a flowchart illustrating B-picture decoding processing.

In step S193, B-picture decoding processing, which is discussed below with reference to FIG. 20, is executed.

In step S194, the CPU 20 sends display picture information to the CPU 11 by writing the display picture information into the result buffer 32 of the PCI bridge 17 via the control bus 19 in response to the display start command sent from the CPU 11 in step S6 of FIG. 3. This enables the CPU 11 to understand which picture of which GOP to be displayed by referring to the display picture information stored in the result buffer 32.

In step S195, the CPU 20 increments the time management counter.

Figure 23:
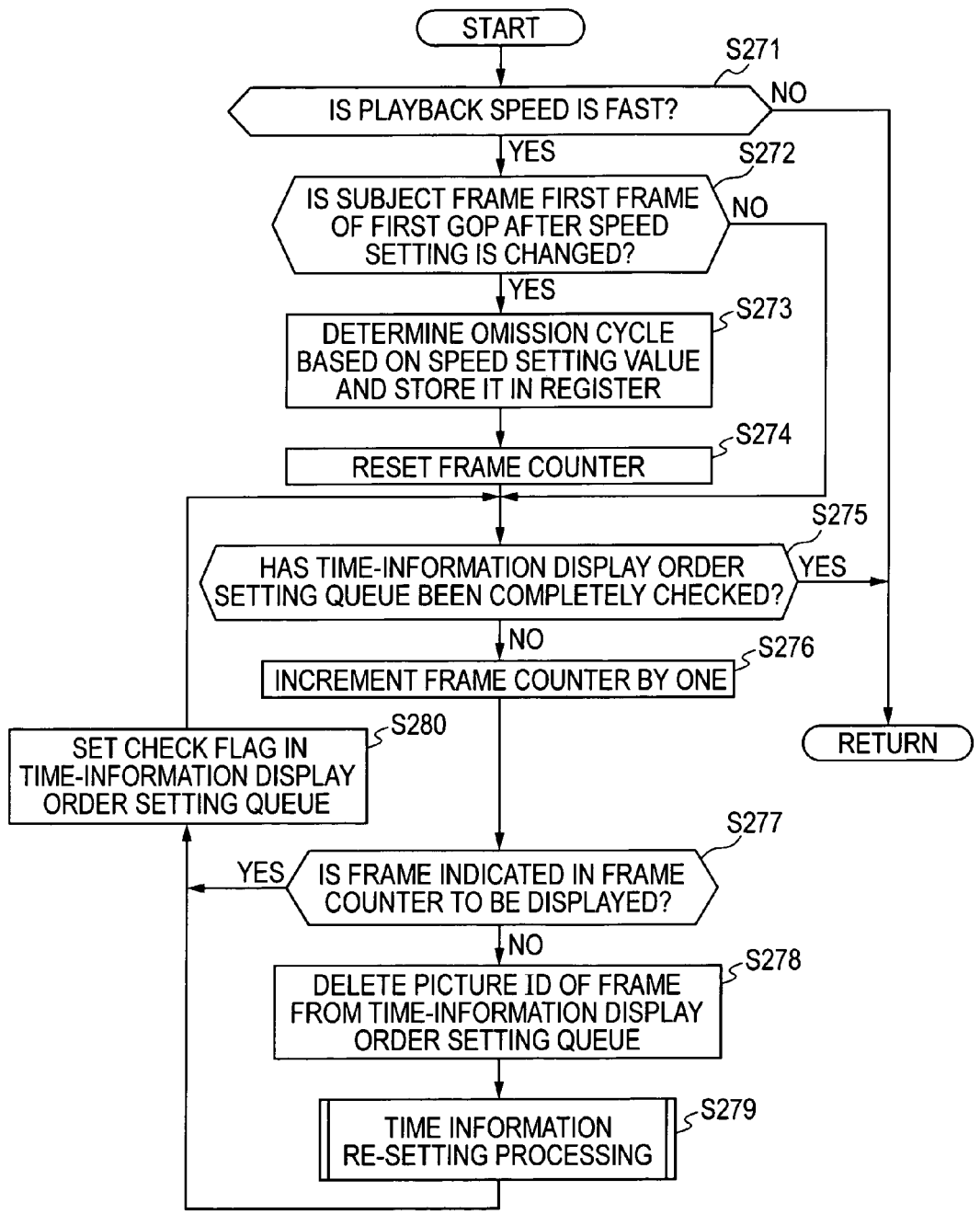
FIG. 23 is a flowchart illustrating omission processing 1.

Then, in step S196, the omission processing 1, which is described below with reference to FIG. 23, is executed, and the process then returns to step S35 in FIG. 4.

Figure 35:
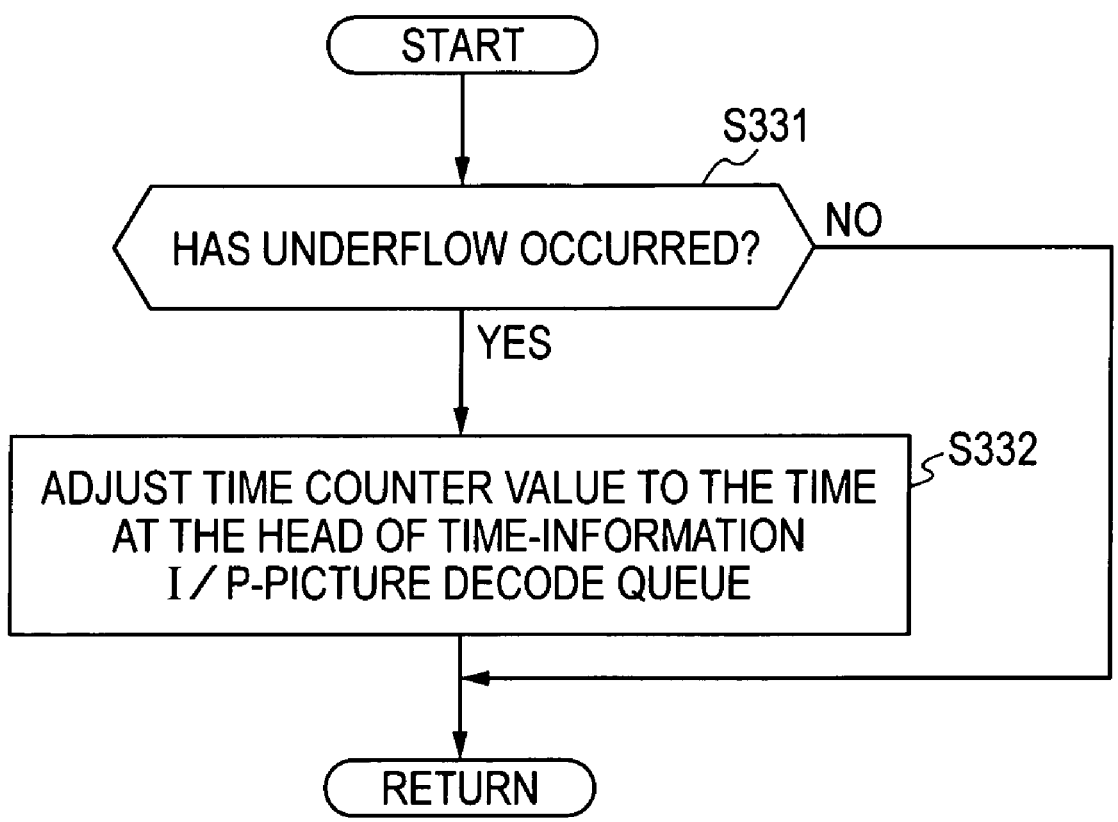
FIG. 35 is a flowchart illustrating underflow processing.

If it is determined in step S191 that there is stream data for which the display time has passed, the process proceeds to step S197 in which underflow processing, which is described below with reference to FIG. 35, is executed. The process then returns to step S36 in FIG. 4.

According to the frame control processing, if there is no stream data for which the display time has passed, one frame is decoded based on the decode schedule, and the display picture information is sent to the CPU 11, and the omission processing 1 is executed. If there is stream data for which the display time has passed, the underflow processing, which is described below, is executed.

A description is now given of the I-picture/P-picture decoding processing executed in step S192 in FIG. 18 with reference to the flowchart of FIG. 19.

In step S221, the CPU 20 determines whether the value of the time management counter matches the time information which is associated with the picture ID of the picture to be subsequently decoded and which is set in the time-information I/P-picture decode queue. If it is determined in step S221 that the value of the time management counter does not match the time information, the process returns to step S192 in FIG. 18.

If it is determined in step S221 that the value of the time management counter matches the time information, the process proceeds to step S222. In step S222, the CPU 20 controls the decoder 22, 23, or 24, specified as a decoder to perform decoding, via the control bus 19 to decode the I-picture or P-picture, and deletes the picture ID of the decoded picture from the time-information I/P-picture decode queue.

More specifically, the CPU 20 refers to the register value indicating the decoder that receives the subsequent data, and controls the elementary-stream address determining unit 73 of the corresponding decoder to allow the memory controller 74 to read from the input buffer 75 the picture data corresponding to the picture ID set in the time-information I/P-picture decode queue and to supply the read data to the decode processor 77.

If the picture to be decoded is an I-picture, the CPU 20 controls the decode processor 77 to decode the I-picture supplied from the memory controller 74, and also controls the write-image address determining unit 78 to supply the decoded frame data to the memory controller 81 and to store the decoded I-picture in the bank specified as an I-picture storage bank in step S76 in FIG. 6. If the picture to be decoded is a P-picture, the CPU 20 controls the reference-image address determining unit 79 to read the reference image stored in the video bank memory 82 based on the P-picture reference bank position set in step S76 in FIG. 6 under the control of the memory controller 81 and to supply the read reference image to the decode processor 77, and controls the decode processor 77 to decode the P-picture supplied from the memory controller 74. The CPU 20 also controls the write-image address determining unit 78 to supply the decoded frame data to the memory controller 81 and to store the decoded P-picture in the bank specified as P-picture storage bank set in step S76 in FIG. 6.

After step S222, the process returns to step S192 in FIG. 18.

According to the I-picture/P-picture decoding processing, an I-picture or a P-picture can be decoded based on a prescribed schedule.

A description is now given of the B-picture decoding processing executed in step S193 in FIG. 18 with reference to the flowchart of FIG. 20.

In step S241, the CPU 20 determines whether the value of the time counter coincides with the time information corresponding to the first picture ID set in the time-information display order setting queue. The time information set in the time-information display order setting queue is the value (reference time information adjusted to the decode timing of B-pictures) obtained by subtracting one from the phase displacement disp_phase determined in the display phase determining processing, which indicates the display timing of the first frame among the 15 frames in the display order, or is the count value of the time counter associated with the picture IDs of the frames other than the first frame in the display order. If it is determined in step S241 that the value of the time counter does not coincide with the time information corresponding to the first picture ID set in the time-information display order setting queue, the process returns to step S193 in FIG. 18.

If it is determined in step S241 that the value of the time management counter coincides with the time information set in the time-information display order setting queue, the process proceeds to step S242 to determine whether the picture ID whose time information coincides with the value of the time management counter is a B-picture.

If it is determined in step S242 that the corresponding picture ID is a B-picture, the process proceeds to step S243 in which the CPU 20 controls the decoder 22, 23, or 24, specified as a decoder to perform decoding, via the control bus 19, to decode the B-picture indicated by the corresponding picture ID.

More specifically, the CPU 20 refers to the value stored in the register indicating the decoder that receives the subsequent data, and controls the elementary-stream address determining unit 73 of the corresponding decoder to allow the memory controller 74 to read the picture data of the picture ID set in the time-information display order setting queue from the input buffer 75 and to supply the read picture data to the decode processor 77. The CPU 20 then controls the reference-image address determining unit 79 to allow the memory controller 81 to read the reference images stored in the video bank memory 82 based on the reference bank positions for B-pictures set in step S77 in FIG. 6 and to supply the read reference images to the decode processor 77. The CPU 20 then controls the decode processor 77 to decode the B-picture supplied from the memory controller 74.

In step S244, the CPU 20 sets the bank position at which the B-picture is stored. More specifically, the CPU 20 controls the write-image address determining unit 78 to alternately store B-pictures in the two banks that are not specified as I-picture/P-picture storage banks in the video bank memory 82. The CPU 20 controls the write-image address determining unit 78 to supply the frame data decoded by the decode processor 77 to the memory controller 81, and stores the decoded frame data in the bank positions set in the video bank memory 82.

If it is determined in step S242 that the corresponding picture ID is not a B-picture, or after step S244, the process proceeds to step S245. In step S245, the CPU 20 sets the first picture ID set in the time-information display order setting queue in the display queue. The display queue is a queue having a depth storing only one picture ID.

More specifically, if it is determined in step S242 that the corresponding picture ID is not a B-picture, in step S245, the CPU 20 sets the picture ID of the I-picture or the P-picture that has been decoded in step S222 in FIG. 19 in the display queue. If it is determined in step S242 that the corresponding picture ID is a B-picture, the process proceeds to step S243 in which the B-picture is decoded. In this case, in step S245, the CPU 20 sets the first picture ID set in the time-information display order setting queue, i.e., the picture ID of the decoded B-picture, in the display queue.

The first picture ID set in the time-information display order setting queue is output from the time-information display order setting queue, and the picture ID of the picture subsequent to the picture of the picture ID set in the display queue is set at the head of the time-information display order setting queue, or the time-information display order setting queue becomes empty. After step S245, the process returns to step S193 in FIG. 18.

Figure 21:
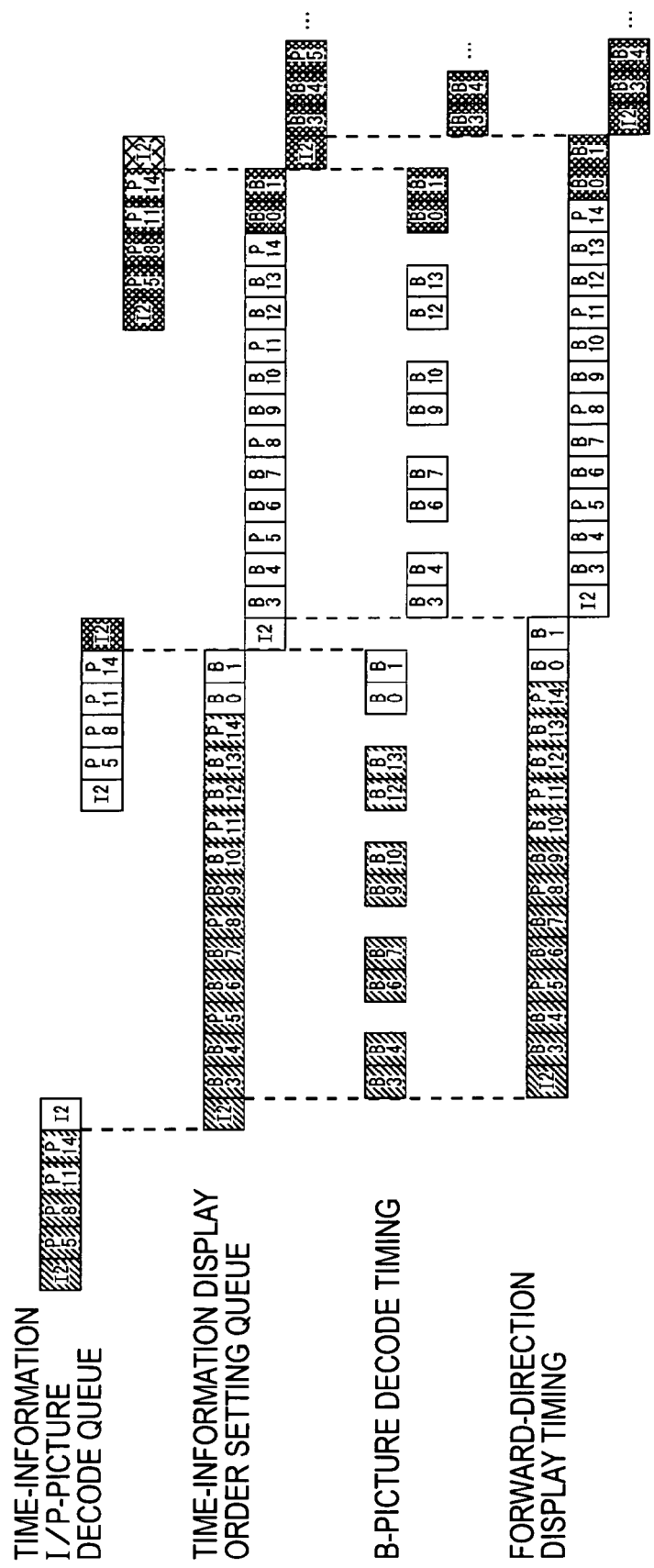
FIGS. 21 and 22 illustrate decode and display scheduling.

As discussed above, decoding is performed based on the time information set in the time-information I/P-picture decode queue and the time-information display order setting queue. In the forward-direction playback operation, as shown in FIG. 21, I-pictures and P-pictures are decoded based on the time information set in the time-information I/P-picture decode queue, and B-pictures are decoded based on the time information set in the time-information display order setting queue. In the reverse-direction playback operation, as shown in FIG. 22, I-pictures and P-pictures are decoded based on the time information set in the time-information I/P-picture decode queue, and B-pictures are decoded based on the time information set in the time-information display order setting queue.

Figure 22:
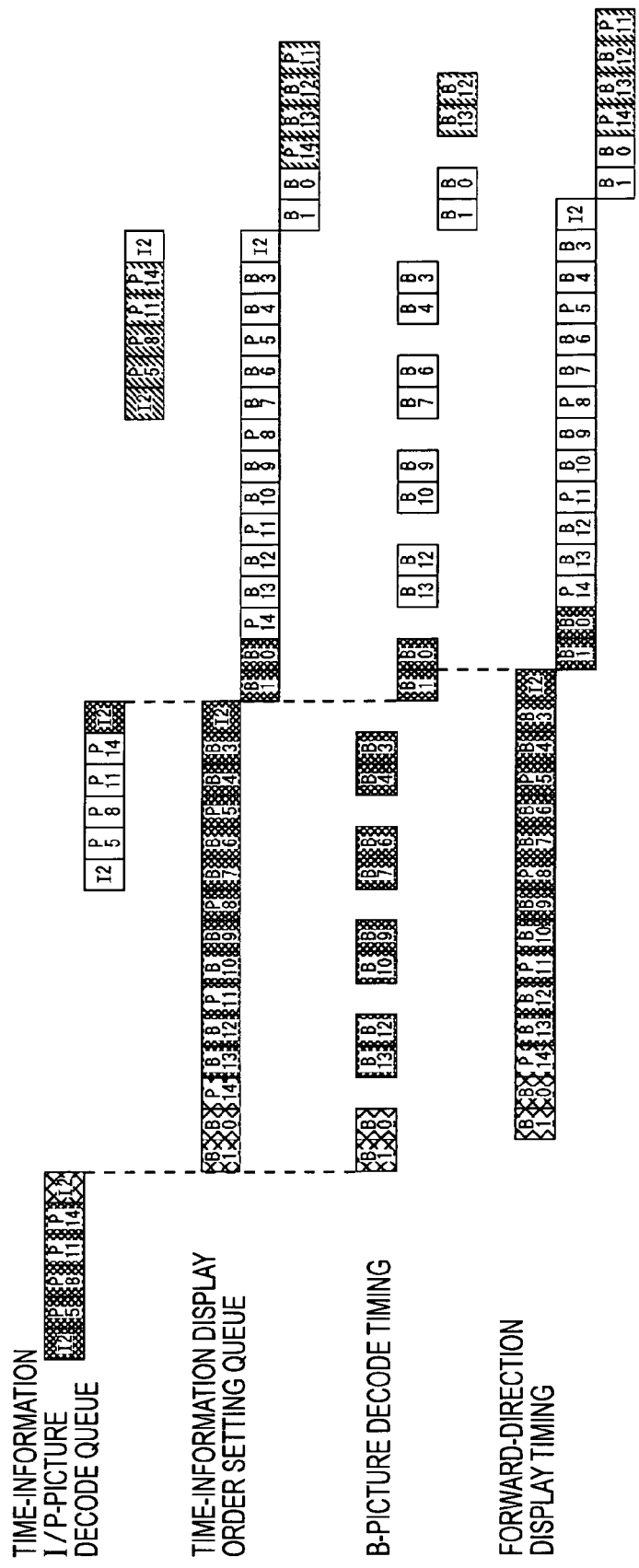

The decode timing of B-pictures is set, as shown in FIGS. 21 and 22, so that the decode timing of B-pictures is displaced from the display timing of B-pictures by one frame by performing the one-frame delay display setting processing, which is discussed below, regardless of whether the playback direction is forward or reverse.

FIGS. 21 and 22 illustrate the decode timing and display timing when the playback speed is ×1 and ×−1, respectively. In a fast playback operation, the setting of the time-information display order setting queue is changed by the omission processing 1, which is described below, and decoding is performed in the subsequent processing routine based on the changed setting of the time-information display order setting queue after the omission processing 1. In a fast playback operation, not all B-pictures are decoded, while I-pictures and P-pictures are all decoded.

The omission processing 1 executed in step S196 in FIG. 18 is described below with reference to the flowchart in FIG. 23.

In step S271, the CPU 20 determines based on the input stream state set in the input stream state changing processing discussed with reference to in FIG. 5 whether the playback speed set by the user is a fast playback operation. If it is determined in step S271 that the playback speed is not fast, the process returns to step S196 in FIG. 18, and proceeds to step S36 in FIG. 4.

If it is determined in step S271 that the fast playback operation is performed, the process proceeds to step S272 to determine whether the subject frame is the first frame of the first GOP after changing the speed setting.

If the subject frame is found to be first frame of the first GOP in step S272, the process proceeds to step S273 in which the CPU 20 determines the omission cycle based on the speed setting value and stores the determined omission cycle in the register.

More specifically, if the playback speed is ×2 or ×−2, the CPU 20 sets the omission cycle to be ½ and stores it in the register. If the playback speed is ×3 or ×−3, the CPU 20 sets the omission cycle to be ⅓ and stores it in the register.

In step S274, the CPU 20 resets the frame counter for counting the number of frames regardless of the decoding processing unit in the omission processing 1.

If it is determined in step S272 that the subject frame is not the first frame of the first GOP after changing the input stream state, or after step S274, the process proceeds to step S275 to determine whether a check flag is set in association with each picture ID stored in the time-information display order setting queue, thereby determining whether the picture IDs set in the time-information display order setting queue have been all checked. The check flag is a flag set in the time-information display order setting queue in step S280, which is discussed below. If it is determined in step S275 that all the picture IDs stored in the time-information display order setting queue have been checked in step S275, the process returns to step S196 in FIG. 18 and proceeds to step S36 in FIG. 4.

If it is determined in step S275 that not all the picture IDs in the time-information display order setting queue have been checked, in other words, that there are some picture IDs for which check flags are not set, the process proceeds to step S276 in which the CPU 20 increments the frame counter by one.

Then, in step S277, the CPU 20 refers to the omission cycle determined and stored in the register and the frame counter value to determine whether the frame indicated in the frame counter is to be displayed. More specifically, if the frame counter indicates 2n (n is a positive integer) when the omission cycle is ½, the CPU 20 determines that the subject frame is to be displayed, and in other cases, the CPU 20 determines that the subject frame is not displayed. If the frame counter indicates 3n (n is a positive integer) when the omission cycle is ⅓, the CPU 20 determines that the subject frame is to be displayed, and in other cases, the CPU 20 determines that the subject frame is not displayed. If it is determined in step S277 that the subject frame is to be displayed, i.e., the frame is not omitted, the process proceeds to step S280.

If it is determined in step S277 that the subject frame is not displayed, i.e., the frame is to be omitted, the process proceeds to step S278. In step S278, the CPU 20 deletes the picture ID of the subject frame from the time-information display order setting queue or sets a flag indicating that the frame is not displayed (non-display flag) in the picture ID in the time-information display order setting queue.

Figure 24:
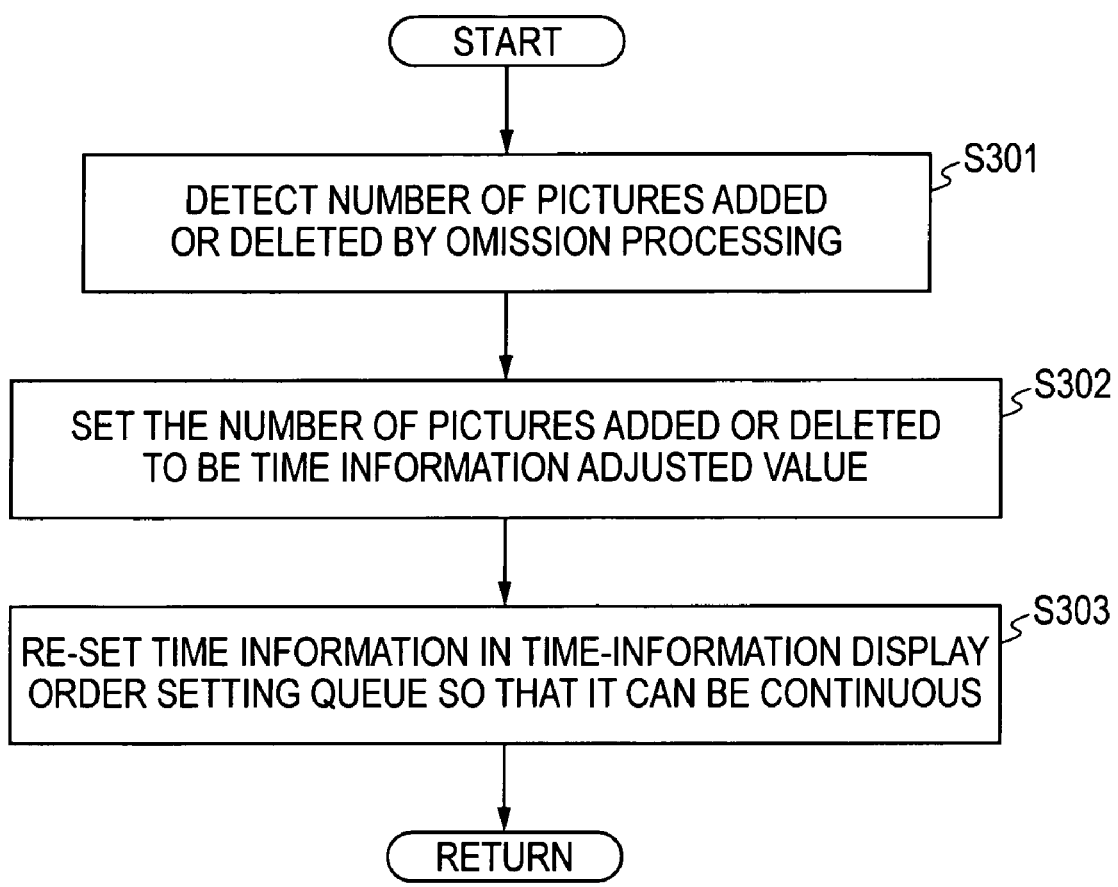
FIG. 24 is a flowchart illustrating time information re-setting processing.

In step S279, time-information re-setting processing, which is described below with reference to FIG. 24, is executed.

If it is determined in step S277 that the frame indicated in the frame counter is to be displayed, or after step S279, the process proceeds to step S280. In step S280, the CPU 20 sets a check flag in the picture ID of the frame indicated in the frame counter in the time-information display order setting queue. The process returns to step S275, and the corresponding processing is repeated.

According to the omission processing 1, the picture IDs of frames that are not displayed are deleted from the time-information display order setting queue, or a non-display flag is set in the corresponding picture IDs in the time-information display order setting queue. B-picture display processing and one-frame delay display setting processing (discussed below) are performed by referring to the time-information display order setting queue. Since the setting of the time-information display order setting queue is updated in response to the setting of the fast playback operation, after this processing routine, only B-pictures to be displayed are decoded, in other words, B-pictures to be omitted are not supplied to the decode processor 77. I-pictures and P-pictures to be omitted are not displayed although they are decoded.

The frame counter is continuously incremented without being reset, independent of the GOP, until the speed setting is changed, i.e., until the input stream state is changed. The positions of the pictures that are not displayed are sometimes changed depending on the GOP since the denominator of the omission cycle is a value that cannot divide the number of frames forming one GOP, for example, when one GOP includes 15 frames and when the playback speed is ×2, ×4, ×−2 or ×−4. Even in this case, it can be easily determined based on the omission cycle whether the subject picture is displayed by using the frame counter value indicating the frame order in the input stream.

In this manner, B-pictures are omitted before being input into the decoder, and I-pictures and P-pictures are omitted at regular intervals without being displayed after being decoded, thereby implementing a fast playback operation by following a dynamic change in the speed. Since I-pictures and P-pictures may be used as reference images by other pictures during decoding, this method is effective in performing a fast playback operation by omitting pictures at regular intervals with a minimum number of banks in the memory.

According to the omission processing 1, while omitting pictures at regular intervals, the speed can be set in a range from ×−3 to ×3 if two decoders are used, and the speed can be set in a range from ×−6 to ×6 if three decoders are used. By using two or more decoders, omission processing similar to the above-described omission processing 1 can be performed, thereby implementing a fast playback operation.

Time-information re-setting processing executed in step S279 in FIG. 23 is discussed below with reference to the flowchart in FIG. 24.

In step S301, the CPU 20 detects the number of pictures added or deleted as a result of performing the omission processing 1 due to a change in the speed setting value.

In step S302, the CPU 20 sets the number of pictures added or deleted to be the time information adjusted value added_count.

In step S303, the CPU 20 re-sets the time information in the time-information display order setting queue so that it can be continuously arranged. The process then returns to step S279 in FIG. 23.

According to the time-information re-setting processing, the setting of the time-information display order setting queue after performing omission processing is changed in accordance with the playback speed. In the subsequent processing routine, the decode timing of B-pictures and display timing of all frames are controlled based on the changed time-information display order setting queue.

The setting of time-information display order setting queue in the omission processing 1 is described below with reference to FIGS. 25 through 30. The top sections of FIGS. 25 through 30 illustrate the schedule conditions before performing omission processing, frames to be omitted being indicated by the broken lines. The bottom sections of FIGS. 25 through 30 illustrate the schedule conditions after performing omission processing. In FIGS. 25 through 30, the number 0, 1, or 2 in parenthesis indicates to which decoder 22, 23, or 24 the information stored in the information queue corresponds to, or by which decoder 22, 23, or 24 the information stored in the information queue is executed.

Figure 25:
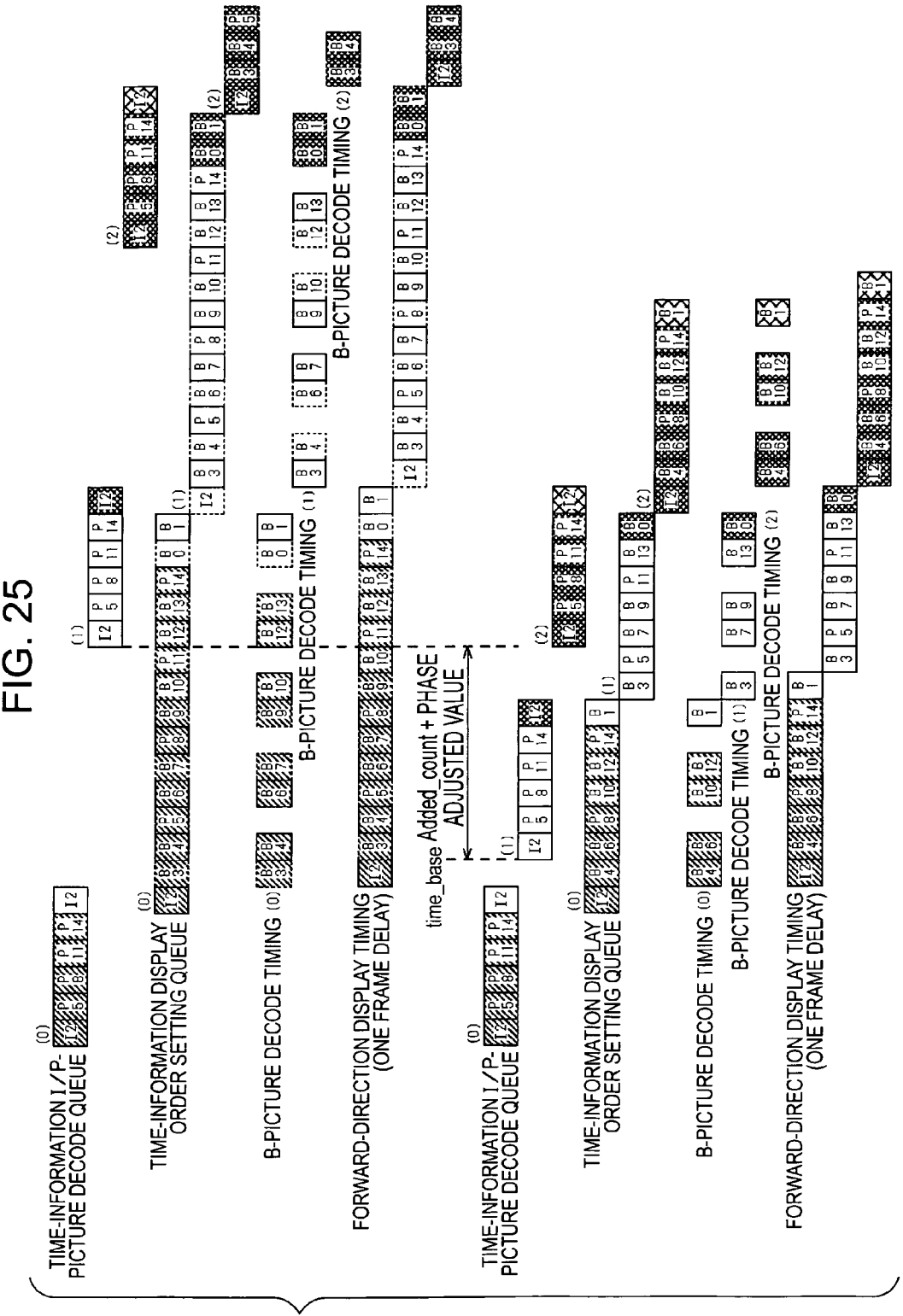
FIG. 25 illustrates decode and display scheduling before and after performing omission of pictures in a ×2 playback operation.

For example, in a ×2 fast playback operation, the changed number of pictures to be displayed in the decode unit after omitting pictures is −7, as shown in FIG. 25, and thus, the time-information adjusted value added_count becomes −7. Then, since the picture type of first picture in the subsequent decode unit is changed from an I-picture to a B-picture, the phase adjusted value becomes −1. Accordingly, if the phase displacement corrected value disp_zero is 0, the amount by which time_base is adjusted is −8. Since the first picture of the second GOP is a B-picture, the display start timing of the second GOP is later than the decode start timing of the I-picture by 7 frames.

Figure 26:
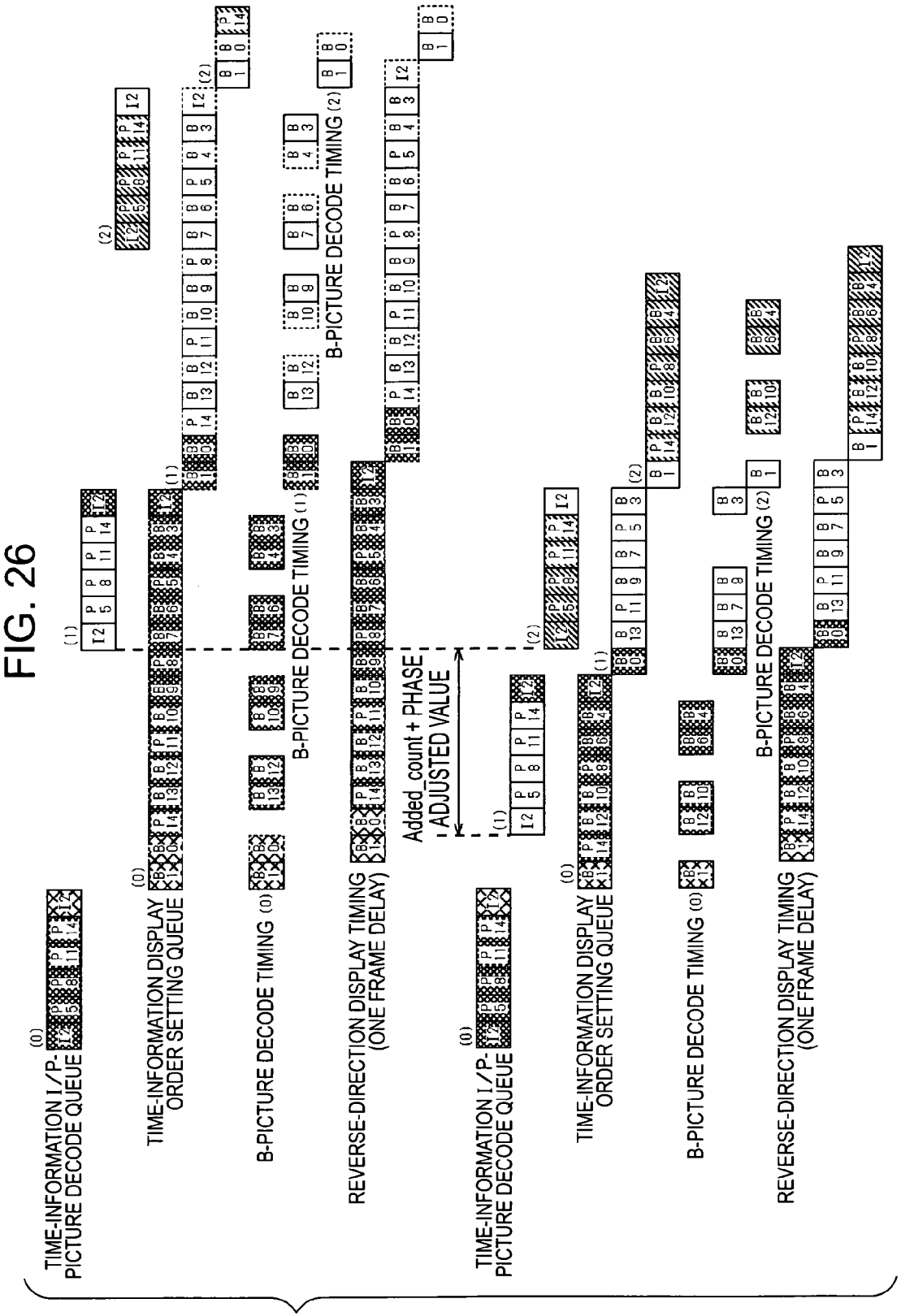
FIG. 26 illustrates decode and display scheduling before and after performing omission of pictures in a ×−2 playback operation.

For example, in a ×−2 fast playback operation, the changed number of pictures to be displayed in the decode unit after omitting pictures is −7, as shown in FIG. 26, and thus, the time-information adjusted value added_count becomes −7. Then, since the picture type of first picture in the subsequent decode unit remains the same as the B-picture, the phase adjusted value becomes 0. Accordingly, if the phase displacement corrected value disp_zero is 0, the amount by which time_base is adjusted is −7. Since the first picture of the second GOP is a B-picture, the display start timing of the second GOP is later than the decode start timing of the I-picture by 7 frames.

Figure 27:
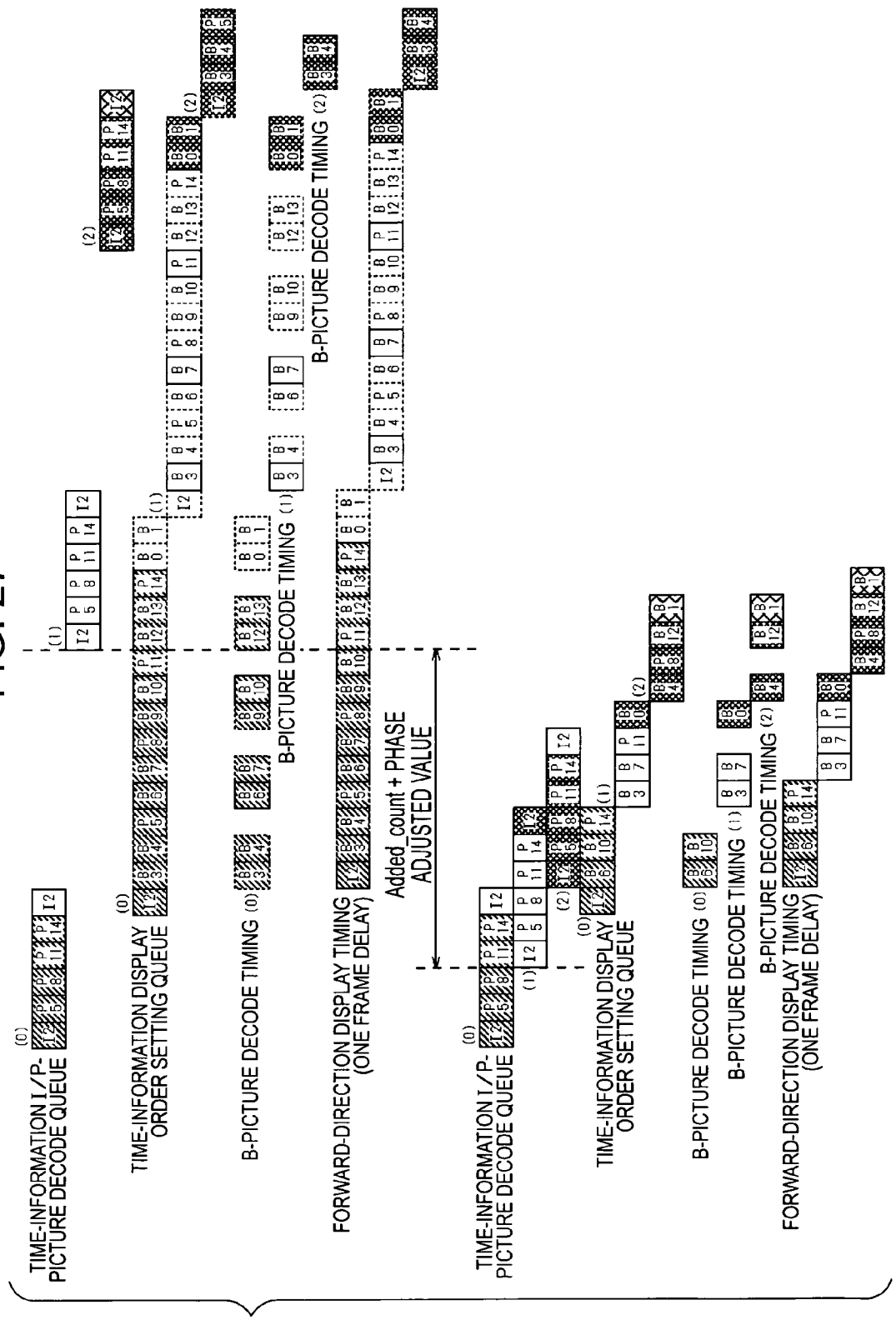
FIG. 27 illustrates decode and display scheduling before and after performing omission of pictures in a ×4 playback operation.

For example, in a ×4 fast playback operation, the changed number of pictures to be displayed in the decode unit after omitting pictures is −11, as shown in FIG. 27, and thus, the time-information adjusted value added_count becomes −11. Then, since the picture type of first picture in the subsequent decode unit is changed from an I-picture to a B-picture, the phase adjusted value becomes −1. Accordingly, if the phase displacement corrected value disp_zero is 0, the amount by which time_base is adjusted is −12. Since the first picture of the second GOP is a B-picture, the display start timing of the second GOP is later than the decode start timing of the I-picture by 7 frames.

Figure 28:
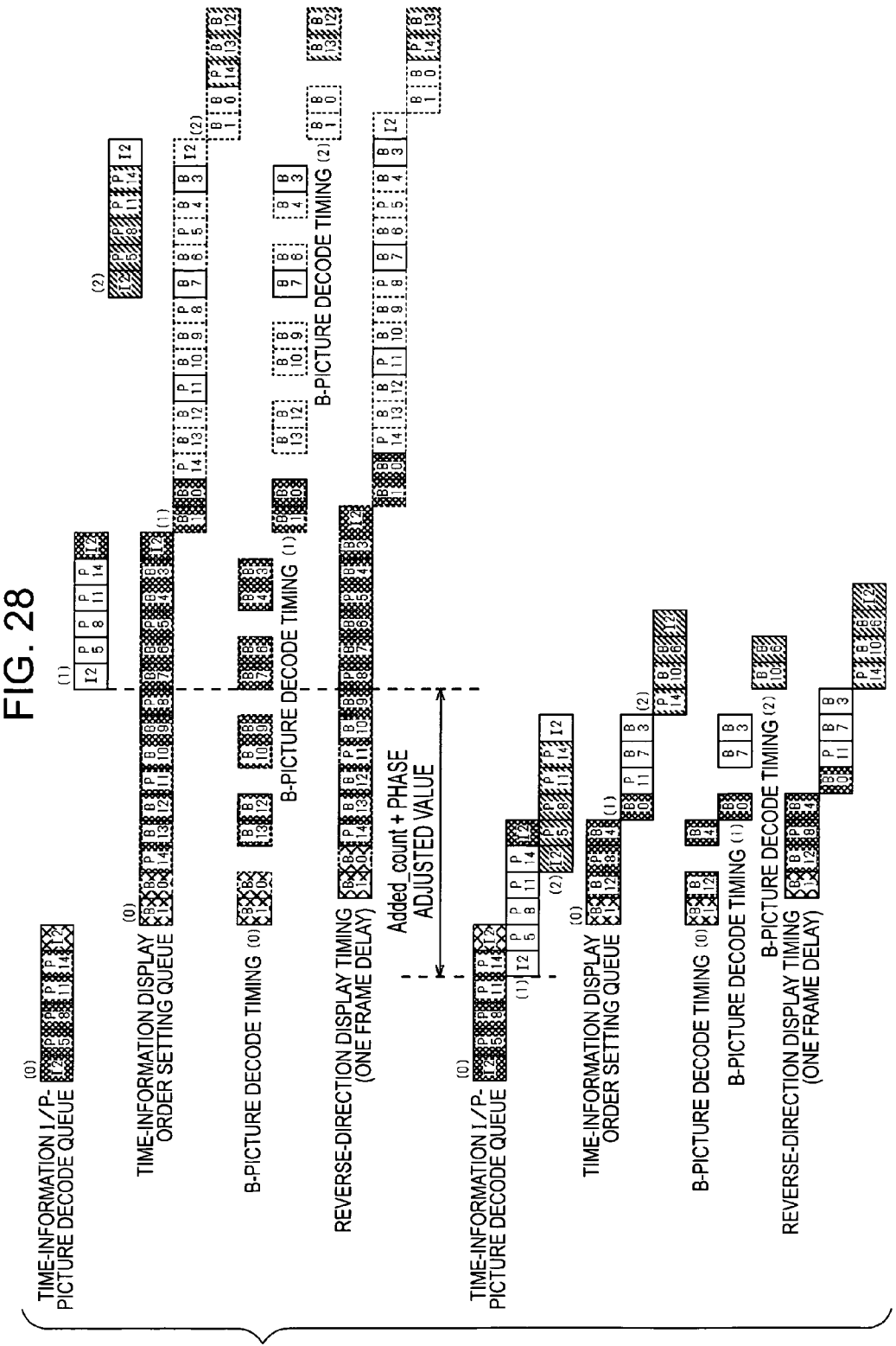
FIG. 28 illustrates decode and display scheduling before and after performing omission of pictures in a ×−4 playback operation.

For example, in a ×−4 fast playback operation, the changed number of pictures to be displayed in the decode unit after omitting pictures is −11, as shown in FIG. 28, and thus, the time-information adjusted value added_count becomes −11. Then, since the picture type of first picture in the subsequent decode unit remains the same as the B-picture, the phase adjusted value becomes 0. Accordingly, if the phase displacement corrected value disp_zero is 0, the amount by which time_base is adjusted is −11. Since the first picture of the second GOP is a B-picture, the display start timing of the second GOP is later than the decode start timing of the I-picture by 7 frames.

Figure 29:
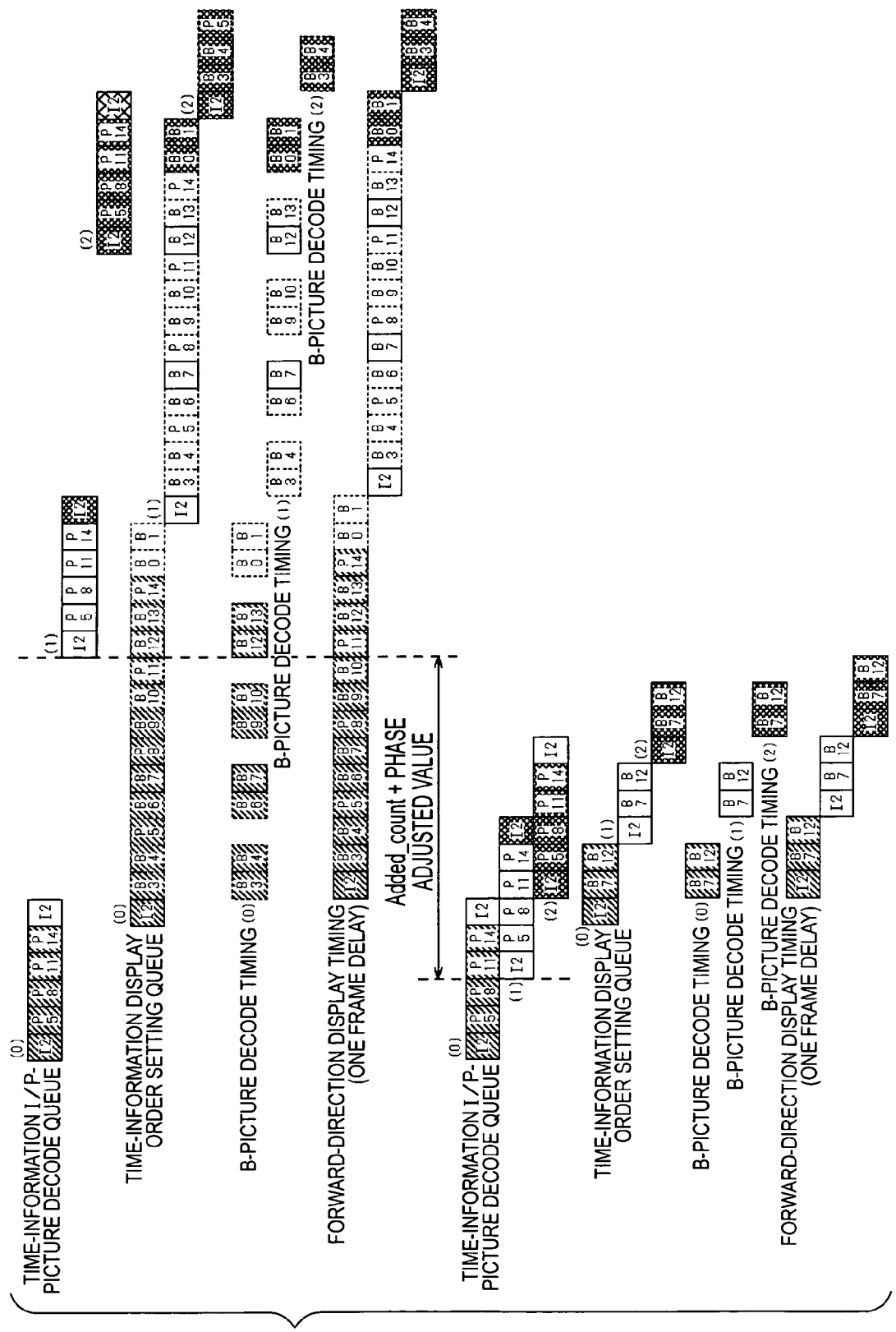
FIG. 29 illustrates decode and display scheduling before and after performing omission of pictures in a ×5 playback operation.

For example, in a ×5 fast playback operation, the changed number of pictures to be displayed in the decode unit after omitting pictures is −12, as shown in FIG. 29, and thus, the time-information adjusted value added_count becomes −12. Then, since the picture type of first picture in the subsequent decode unit remains the same as the I-picture, the phase adjusted value becomes 0. Accordingly, if the phase displacement corrected value disp_zero is 0, the amount by which time_base is adjusted is −12. Since the first picture of the second GOP is an I-picture, the display start timing of the second GOP is later than the decode start timing of the I-picture by 6 frames.

Figure 30:
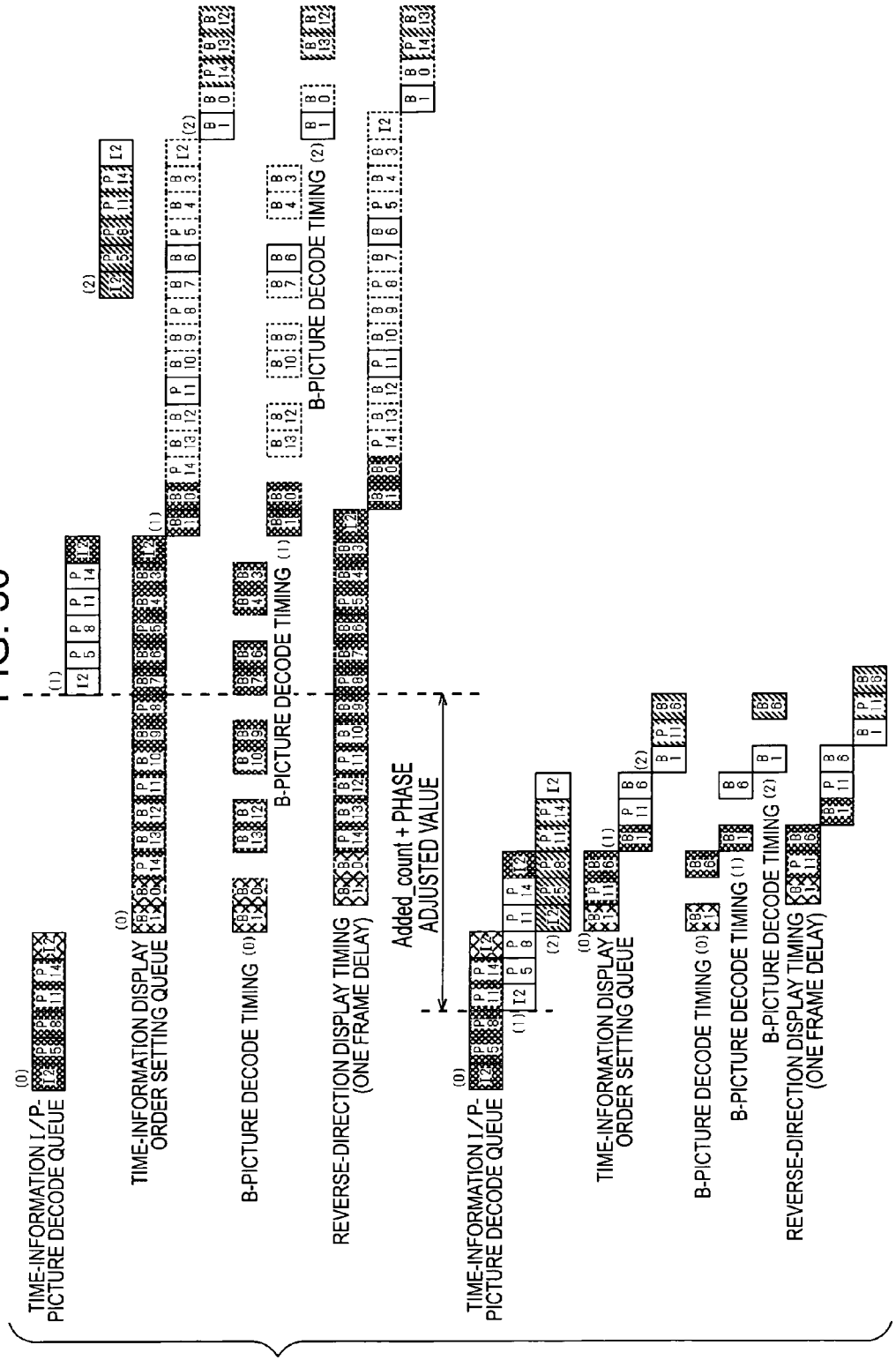
FIG. 30 illustrates decode and display scheduling before and after performing omission of pictures in a ×−5 playback operation.

For example, in a ×−5 fast playback operation, the changed number of pictures to be displayed in the decode unit after omitting pictures is −12, as shown in FIG. 30, and thus, the time-information adjusted value added_count becomes −12. Then, since the picture type of first picture in the subsequent decode unit remains the same as the B-picture, the phase adjusted value becomes 0. Accordingly, if the phase displacement corrected value disp_zero is 0, the amount by which time_base is adjusted is −12. Since the first picture of the second GOP is a B-picture, the display start timing of the second GOP is later than the decode start timing of the I-picture by 7 frames.

Then, in step S167 of the time-information schedule determining processing in FIG. 17, which is subsequently repeated, as shown in FIGS. 25 through 30, the decode start time information time_base is calculated according to equation (1). Then, the decode start timing of the I-pictures and P-pictures corresponding to the picture IDs set in the time-information I/P-picture decode queue is determined based on the calculated decode start time information time_base, and then, the decode and display schedule of the B-pictures after performing the omission processing 1 is determined based on the calculated decode start time information time_base and the time-information display order setting queue from which frames that are not displayed are deleted.

For example, it is now assumed that the playback apparatus 1 decodes an MPEG long GOP stream when N is 15 (N is the number of frames in one GOP), and M is 3 (M is an interval between I-pictures, P-pictures, or an I-picture and a P-picture). In this case, in 8 banks of the video bank memory 82 shown in FIG. 2, anchor frames, I, P, P, P, P, I are stored in banks No. 0 through No. 5 without being changed, and B-pictures are alternately stored in banks No. 6 and No. 7 so that they are decoded before being displayed by one frame. With this arrangement, although the number of banks in the video bank memory 82 is 8, the display operation can be performed within a speed range (forward and reverse directions), which is set according to the number of decoders (3 decoders in the playback apparatus 1 of this embodiment).

The setting of the video bank memory 82 is described below with reference to FIGS. 31 through 34.

Figure 31:
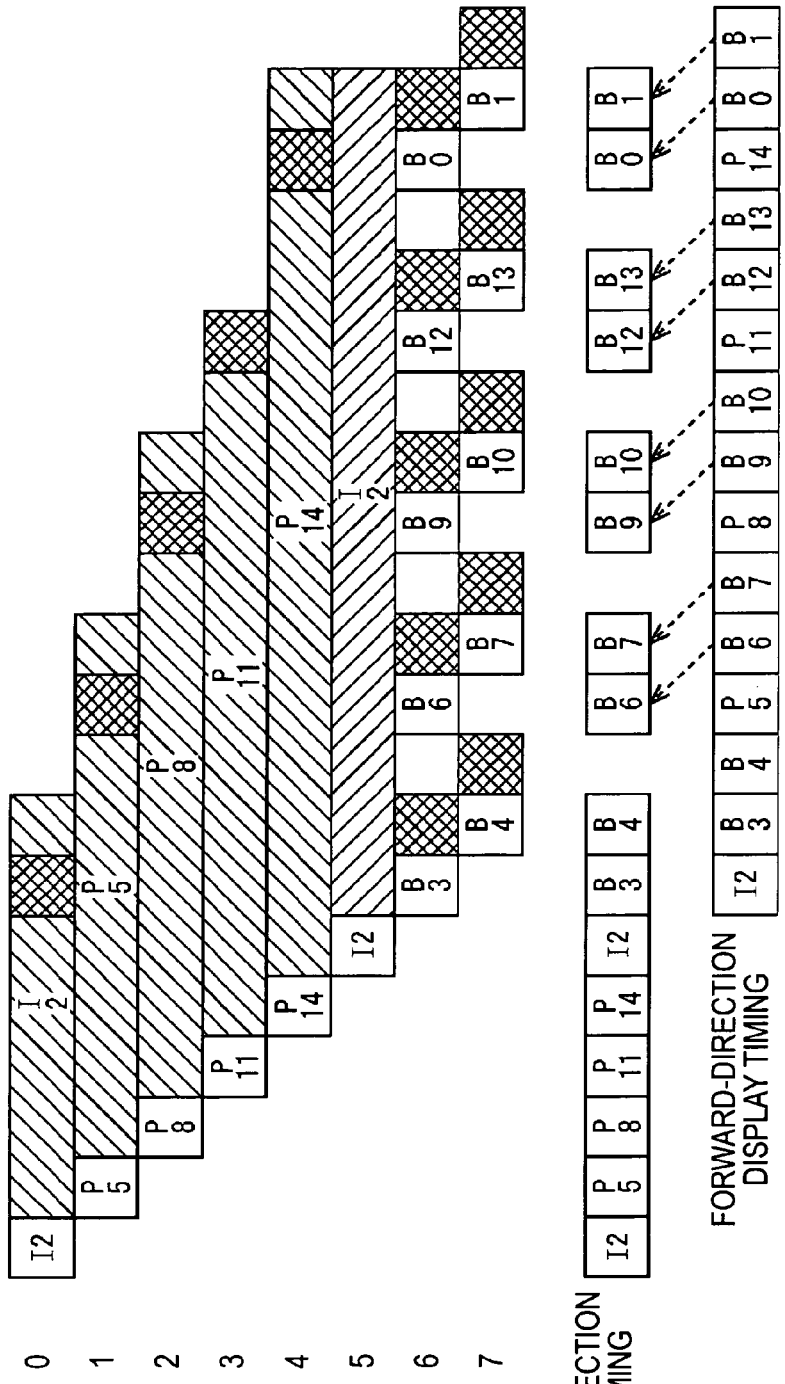
FIG. 31 illustrates bank control in a ×1 playback operation.

FIG. 31 illustrates the pictures stored in 8 banks of the video bank memory 82 shown in FIG. 2 when a ×1 playback operation is performed.

In banks No. 0 through No. 5, which are occupied by I-pictures and P-pictures, decoded I-pictures and P-pictures are sequentially stored in the decoding order. When the first I2 picture is displayed, B3 picture is stored in bank No. 6 at the same time, and when B3 picture is displayed, B4 picture is stored in bank No. 7 at the same time. When B3 picture is displayed, bank No. 6 storing B3 picture that has been displayed and bank No. 0 storing I2 picture that has been used as a reference image are released. Thereafter, B-pictures are alternately stored in banks No. 6 and No. 7 so that the display timing of B-pictures is later than the decode timing of B-pictures by one frame, and banks No. 6 and No. 7 are released after the B-pictures have been displayed. Banks No. 1 through 5 are released after the stored P-pictures have been used as reference images. That is, banks No. 0 through No. 5 are not released after the stored pictures have been displayed, but they are released after the stored pictures have been used as reference images and after they have been displayed.

Figure 32:
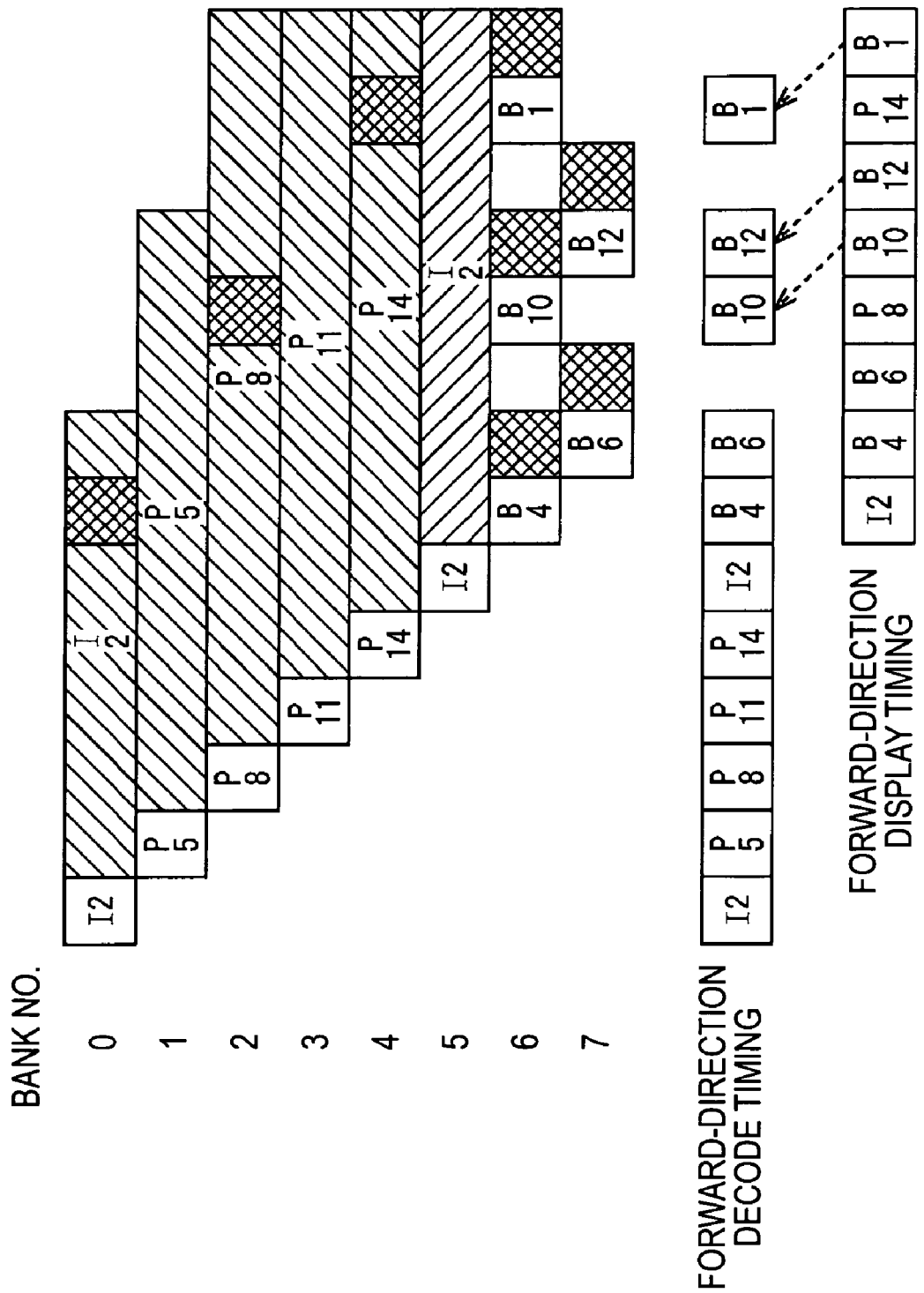
FIG. 32 illustrates bank control in a ×2 playback operation.

FIG. 32 illustrates the pictures stored in 8 banks of the video bank memory 82 shown in FIG. 2 when a ×2 playback operation is performed.

In banks No. 0 through No. 5, which are occupied by I-pictures and P-pictures, decoded I-pictures and P-pictures are sequentially stored in the decoding order. When the first I2 picture is displayed, B4 picture is stored in bank No. 6 at the same time, and when B4 picture is displayed, B6 picture is stored in bank No. 7 at the same time. Then, when B6 picture is displayed, bank No. 6 storing B4 picture that has been displayed and bank No. 0 storing I2 picture that has been used as a reference image are released. Thereafter, B-pictures that are not omitted are alternately stored in banks No. 6 and No. 7 so that the display timing of B-pictures is later than the decode timing of B-pictures by one frame, and banks No. 6 and No. 7 are released after the B-pictures have been displayed. Banks No. 0 through No. 5 are not released after the stored pictures have been displayed, but they are released after the stored pictures have been used as reference images and have also been displayed. Accordingly, banks No. 1 through 5 are released after the stored P-pictures and I-pictures have been used as reference images and after they have been displayed.

Figure 33:
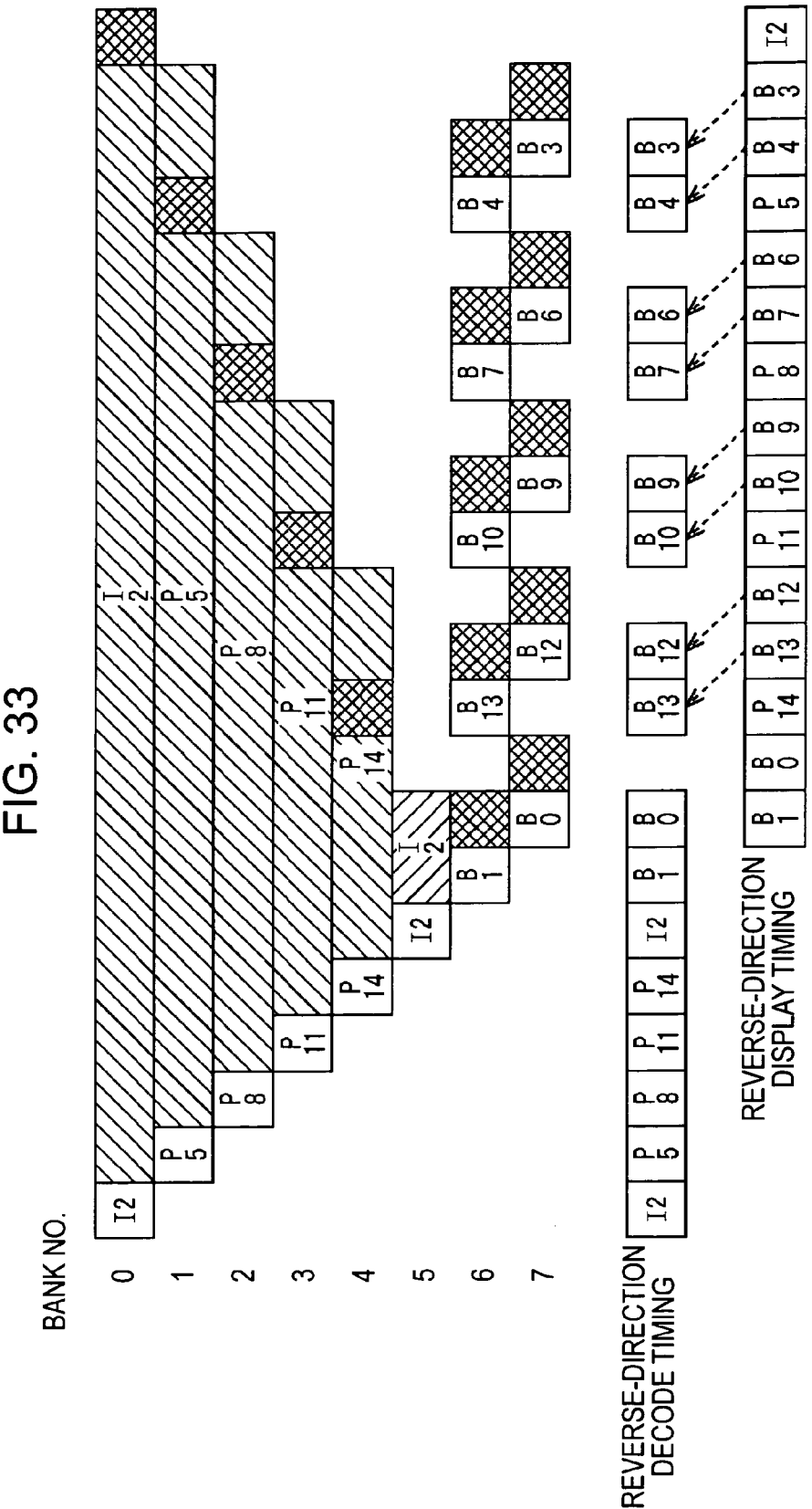
FIG. 33 illustrates bank control in a ×−1 playback operation.

FIG. 33 illustrates the pictures stored in 8 banks of the video bank memory 82 shown in FIG. 2 when a ×−1 playback operation is performed.

In banks No. 0 through No. 5, which are occupied by I-pictures and P-pictures, decoded I-pictures and P-pictures are sequentially stored in the decoding order. After I2 picture is stored in bank No. 5, B1 picture is stored in bank No. 6, and when B1 picture is displayed, B0 picture is stored in bank No. 7 at the same time. When B1 picture is displayed, bank No. 6 storing B1 picture that has been displayed is released. Thereafter, B-pictures are alternately stored in banks No. 6 and No. 7 so that the display timing of B-pictures is later than the decode timing of B-pictures by one frame, and banks No. 6 and No. 7 are released after the B-pictures have been displayed. Banks No. 0 through No. 5 are released after the stored pictures have been displayed and after the stored pictures have been used as reference images. That is, since the reverse-direction playback operation is performed in the example shown in FIG. 33, the I2 picture stored first in bank No. 0 is displayed for the last time, bank No. 0 is not released until the display of this GOP is finished.

Figure 34:
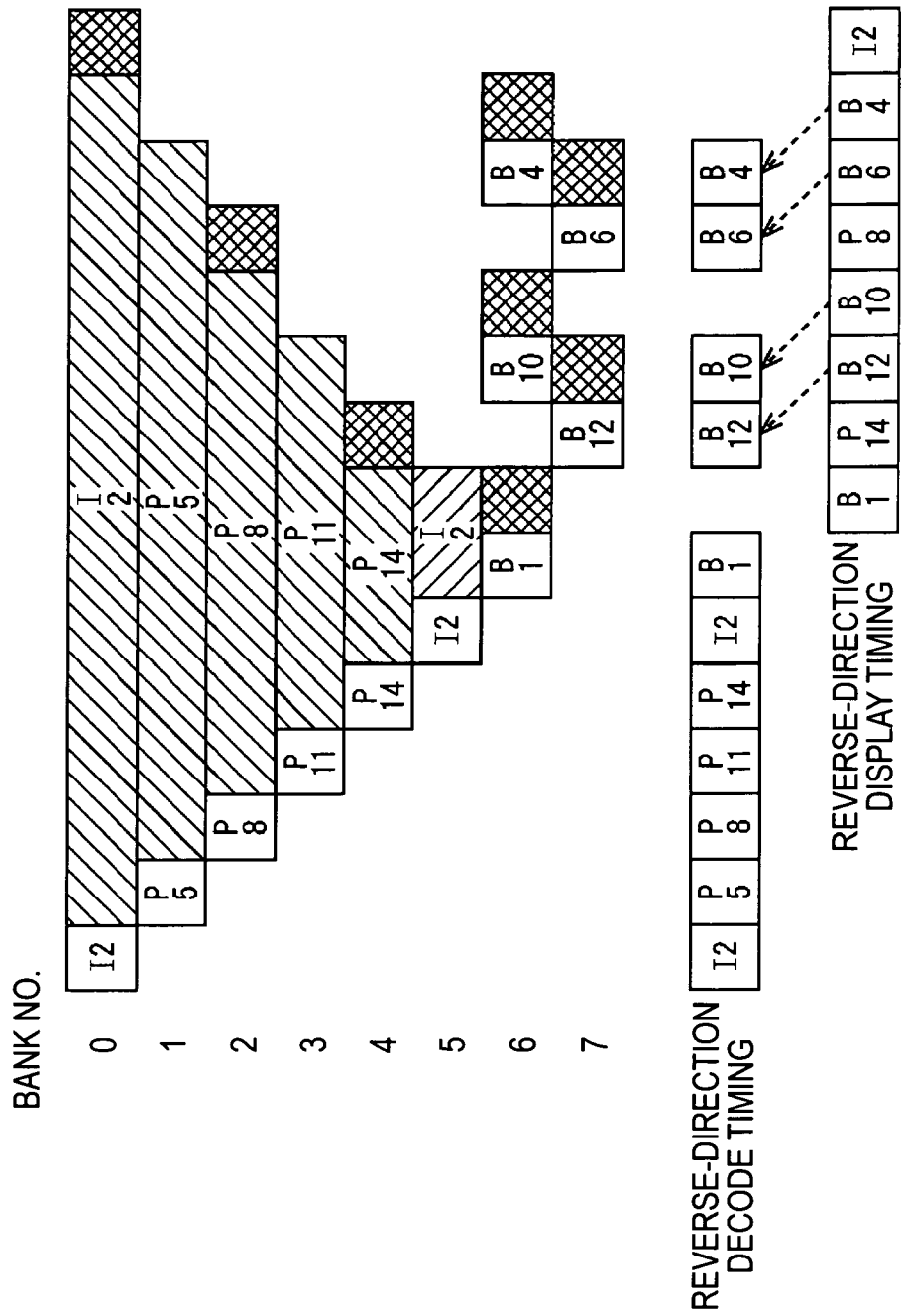
FIG. 34 illustrates bank control in a ×−2 playback operation.

FIG. 34 illustrates the pictures stored in 8 banks of the video bank memory 82 shown in FIG. 2 when a ×−2 playback operation is performed.

In banks No. 0 through No. 5, which are occupied by I-pictures and P-pictures, decoded I-pictures and P-pictures are sequentially stored in the decoding order. After I2 picture is stored in bank No. 5, B1 picture is stored in bank No. 6, and after B1 picture is displayed, B12 picture is stored in bank No. 7. Then, bank No. 6 storing B1 picture that has been displayed is released. Thereafter, B-pictures that are not omitted are alternately stored in banks No. 6 and No. 7 so that the display timing of B-pictures is later than the decode timing of B-pictures by one frame, and banks No. 6 and No. 7 are released after the B-pictures have been displayed. Banks No. 0 through No. 5 are released after the stored pictures have been displayed and after the stored pictures have been used as reference images. That is, since the reverse-direction playback operation is performed in the example shown in FIG. 34, the I2 picture stored first in bank No. 0 is displayed for the last time, bank No. 0 is not released until the display of this GOP is finished.

As described above, when performing a reverse-direction playback operation or a fast playback operation on image data compressed by using bidirectional inter-frame prediction, which is generally used in the image compression method, such as MPEG, decoding scheduling is conducted so that I-pictures and P-pictures are decoded first and the display timing of B-pictures becomes later than the decode timing of B-pictures by one frame, and thus, I-pictures and P-pictures can be stored at fixed positions of the banks. Thus, a reverse-direction playback operation or fast reverse-direction playback operation can be performed efficiently with a minimum number of banks without requiring a complicated bank control operation.

More specifically, it is sufficient if the number of banks for storing frames is the total number of the number of I-pictures and P-pictures contained in the decoding processing unit and two banks for storing B-pictures. In this case, by storing I-pictures and P-pictures, which are anchor frames, at fixed positions in the banks, a fast playback operation or a reverse-direction playback operation can be implemented without requiring a complicated bank control operation.

For example, in an MPEG long GOP stream when N is 15 (N is the number of frames in one GOP) and M is 3 (M is an interval between I-pictures, P-pictures, or an I-picture and a P-picture), as in this embodiment, a video bank memory having a total of 8 banks, i.e., 5 banks for I, P, P, P, and P pictures, one bank for the subsequent I picture, and two banks for B-pictures, is prepared. With this arrangement, by storing the I-pictures and P-pictures at fixed positions in the banks, a fast playback operation, a reverse-direction playback operation, or a fast reverse-direction playback operation can be implemented without requiring a complicated bank control operation.

To improve a response to an instruction to change the speed from a user, the decoding or display of B-pictures are sometimes suspended for changing the speed in units of frames. In this case, although the decode timing and display timing of B-pictures are separately managed, bank control can be simply performed. For example, even if an error occurs in predicting pictures by referring to other pictures when input streams are shifted, it restores the correct frame (underflow processing described below). Thus, the speed can be changed in units of frames.

The underflow processing executed in step S197 in FIG. 18 is described below with reference to the flowchart of FIG. 35.

In step S331, the CPU 20 determines by referring to the time management counter and the time counter whether the supply of stream data is delayed with respect to the display processing, i.e., whether underflow has occurred. If it is determined in step S331 that underflow has not occurred, the process returns to step S197 in FIG. 18, and proceeds to step S36 in FIG. 4.

If it is determined in step S331 that underflow has occurred, the process proceeds to step S332 in which the CPU 20 adjusts the value of the time counter to the time at the head of the time-information I/P-picture queue. The process then returns to step S197 in FIG. 18, and proceeds to step S36 in FIG. 4.

Figure 36:
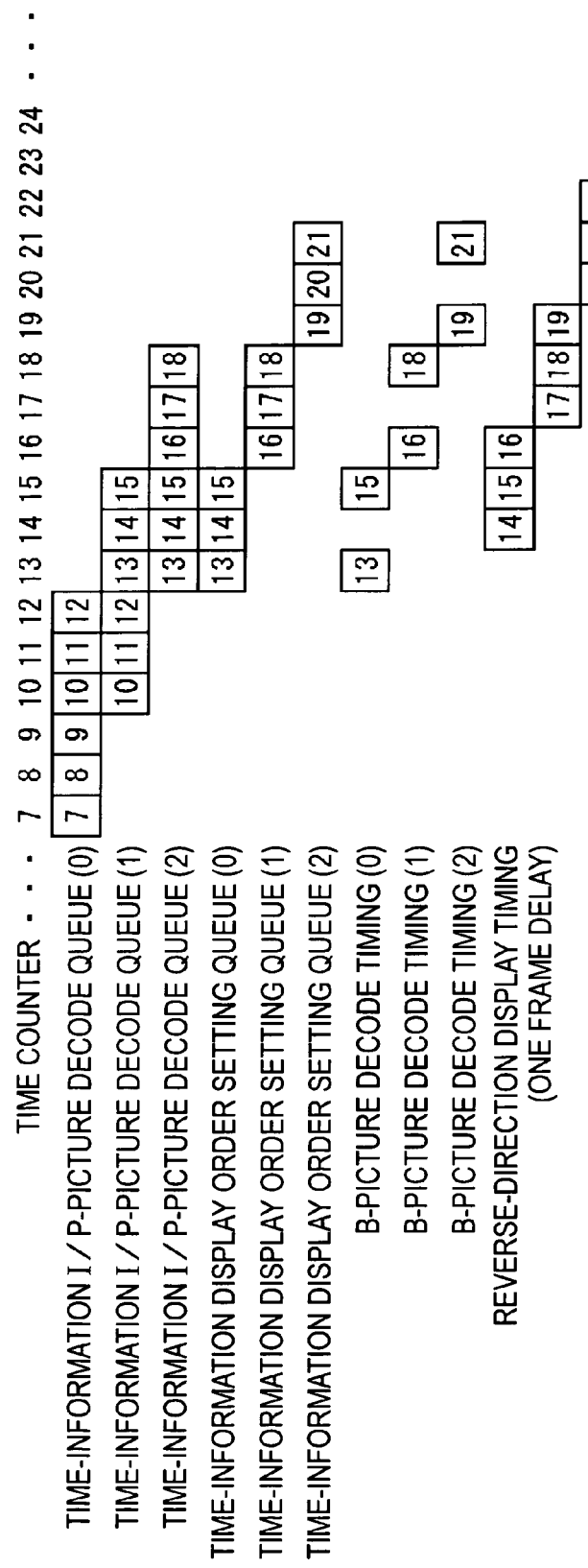
FIG. 36 illustrates a time counter when underflow does not occur.
Figure 37:
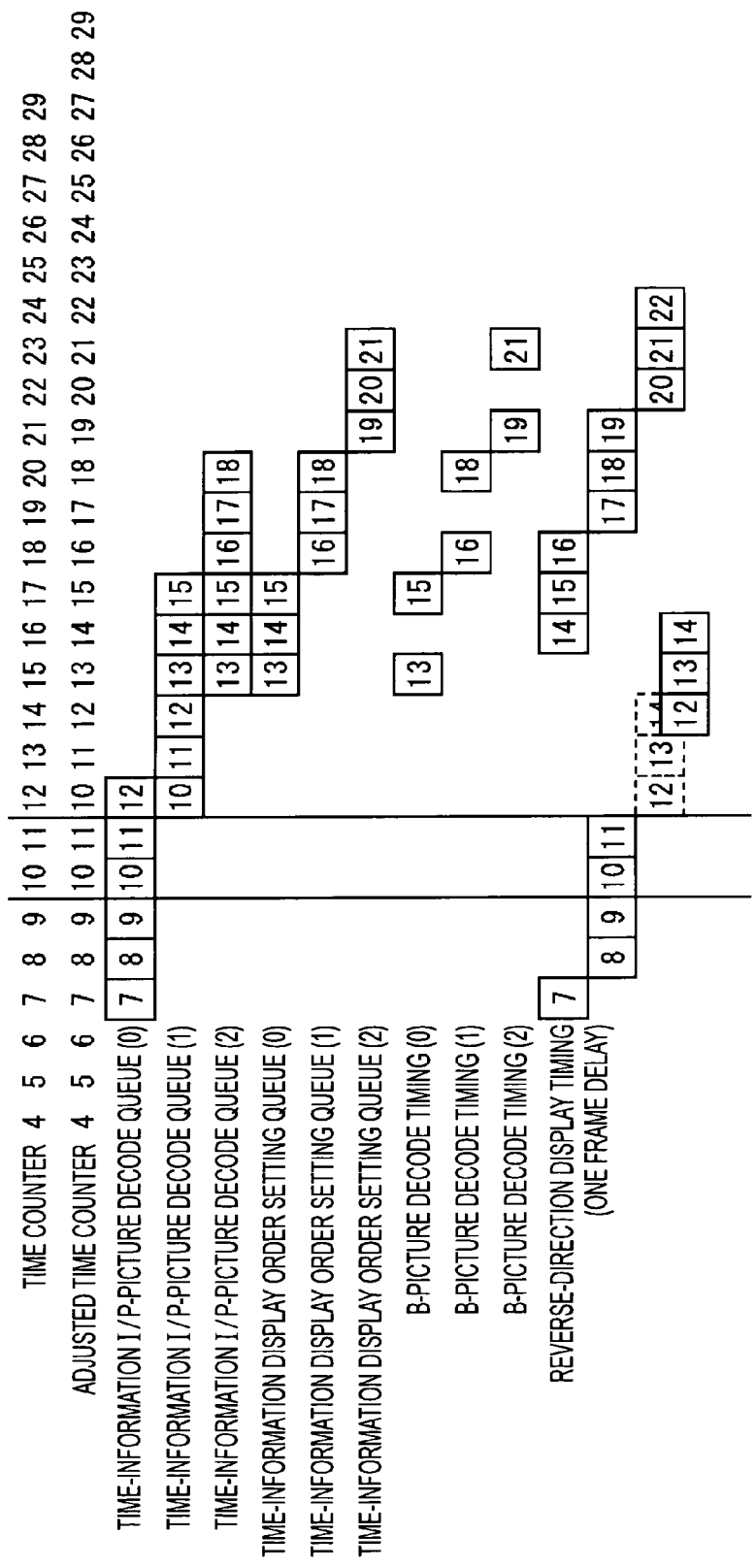
FIG. 37 illustrates the adjustment of a time counter when underflow occurs.

The adjustment of the time counter when underflow occurs is described below with reference to FIGS. 36 and 37. In FIGS. 36 and 37, the number 0, 1, or 2 in parenthesis indicates to which decoder 22, 23, or 24 the information stored in the information queue corresponds or by which decoder 22, 23, or 24 the information stored in the information queue is executed.

FIG. 36 illustrates information stored in the information queues and decode timing and display timing with respect to the time counter when underflow does not occur in the ×−5 playback operation as performed in FIG. 30. In FIG. 36, the time counter of the decode start timing of the I-picture of a GOP indicates 7 by way of example.

If, for example, underflow occurs by the amount of two frames, the time counter is delayed for two frames, as shown in FIG. 37, and the processing is restarted by referring to the adjusted time counter, thereby allowing the subsequent scheduling, decoding, and display control without any delay.

According to this processing, even if the supply of streams is delayed due to, for example, the reduced throughput of the HDD 16 when a fast playback operation is performed, the underflow caused by the delay of the supply of streams can be detected and the counting of time information is delayed for the time for which underflow has occurred, thereby restarting the playback processing without being interrupted.

If it is determined in step S36 in FIG. 4 that not all the frames have been processed, the process proceeds to step S37 in which the time counter is incremented. The process then returns to step S31, and the corresponding processing is repeated.

For the seventh or subsequent frame, since it is determined in step S33 that the subject frame is not one of the first through sixth frames, the one-frame delay display setting processing is executed in step S34.

A description is now given, with reference to the flowchart in FIG. 38, of the one-frame delay display setting processing executed in step S34 in FIG. 4.

In step S361, the CPU 20 sends a display instruction to the corresponding decoder 22, 23, or 24 via the control bus 19 on the basis of the information stored in the display queue so that the display processing becomes later than the decoding processing by one frame, and deletes the corresponding picture IDs from the display queue. In this case, the output address determining unit 80 of the corresponding decoder 22, 23, or 24 receives the control signal from the CPU 20 via the control bus 76, and controls the memory controller 80 to read out the corresponding pictures from the video bank memory 82 and to supply the read pictures to the selector 25.

In step S362, the CPU 20 controls the selector 25 to output the decoded frame based on the register value indicating the decoder that receives the subsequent data, which is set in step S81 in FIG. 6. The process then returns to step S34 in FIG. 4.

For example, if the playback speed is ×1, as shown in FIG. 21, the display control is performed as follows. Pictures are displayed in the order of pictures in the time-information display order setting queue so that the display timing of B-pictures becomes later than the decode timing of B-pictures based on the time information set in the time-information display order setting queue.

If the playback speed is ×−1, as shown in FIG. 22, the display control is performed as follows. Pictures are displayed in the order of pictures set in the time-information display order setting queue so that the display timing of B-pictures becomes later than the decode timing of B-pictures based on the time information set in the time-information display order setting queue.

The same applies to the playback operation at ×2 shown in FIG. 25, the playback operation at ×−2 shown in FIG. 26, the playback operation at ×4 shown in FIG. 27, the playback operation at ×−4 shown in FIG. 28, the playback operation at ×5 shown in FIG. 29, and the playback operation at ×−5 shown in FIG. 30.

According to this processing, if the number of banks storing frames is equal to the total number of I-pictures and P-pictures contained in the decoding processing unit and two banks for storing B-pictures, by storing the I-pictures and P-pictures, which are anchor frames, at fixed positions in the banks, a fast playback operation, a reverse-direction playback operation, or a fast reverse-direction playback operation can be implemented without requiring a complicated bank control operation.

The phase displacement between the decode timing and display timing is determined based on the number of I-pictures and P-pictures contained in the decoding processing unit. Alternatively, the phase displacement between the decode timing and display timing may be determined based on the number of frames to be displayed among the frames contained in the decoding processing unit.

When the fast forward-direction or reverse-direction playback operation is performed, in the decode scheduling for the second and subsequent decoding processing units, before determining frames to be displayed and frames not to be displayed, i.e., before performing frame omission, coding parameters, such as the picture type to be displayed at the head of the decoding processing unit, may be detected in advance.

For example, before determining frames to be displayed and frames not to be displayed, the picture type to be displayed at the head of the decoding processing unit is detected in advance, for example, based on the frame counter counted in the scheduling of the previous decoding processing unit and the calculated omission cycle.

With this arrangement, the decode schedule processing can be executed more precisely and more quickly.

A specific example of the processing for detecting the picture type of picture displayed at the head of the decoding processing unit is described below.

Figure 39:
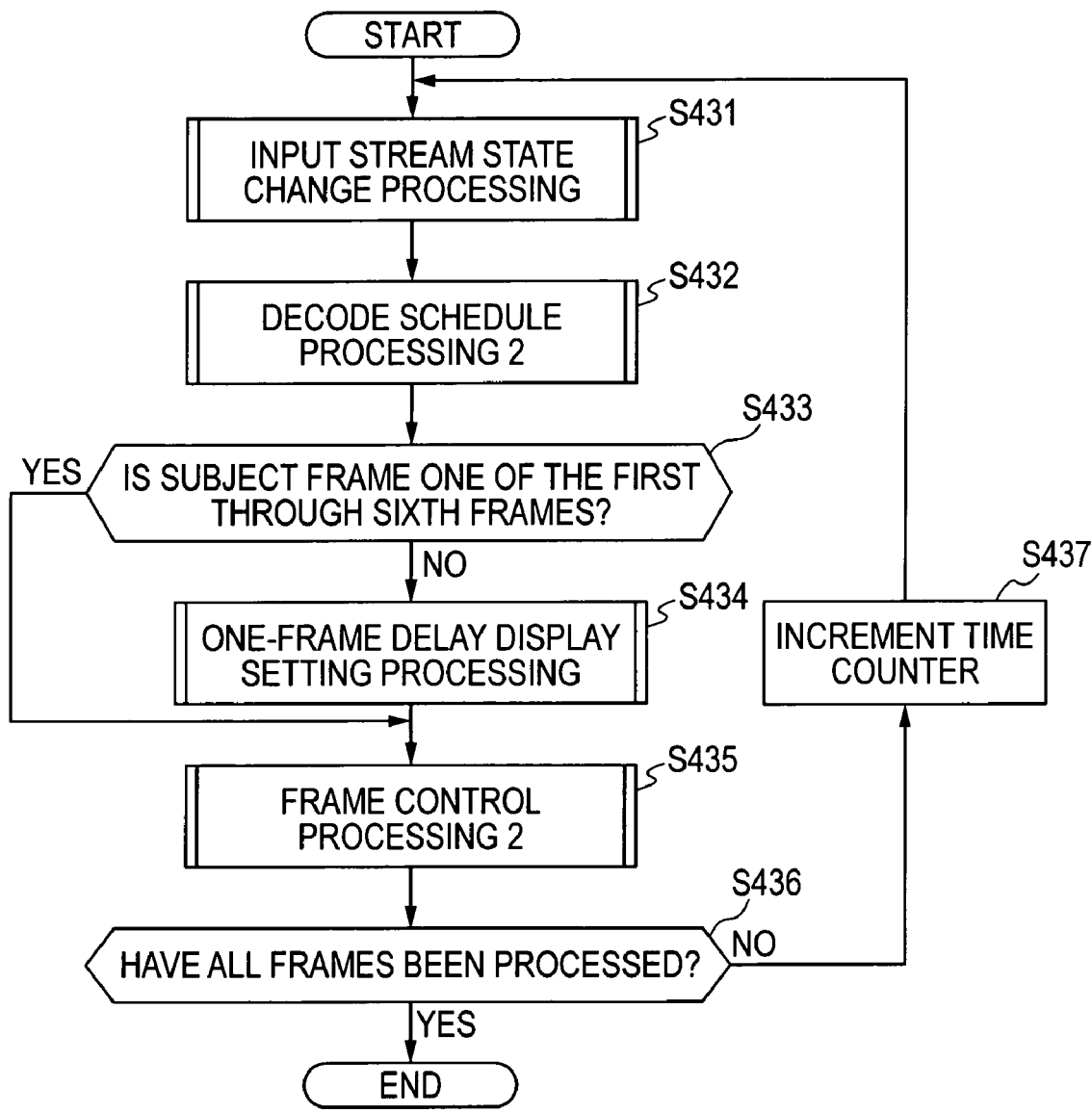
FIG. 39 is a flowchart illustrating frame processing 2.

A description is given, with reference to the flowchart in FIG. 39, of frame processing 2 to be performed on each frame in which the picture type of picture displayed at the head of the decoding processing unit can be detected before executing scheduling. This processing routine is repeated for each frame until stream data to be displayed has been processed or until an instruction to finish a displaying operation is provided.

In step S431, the input stream state changing processing discussed with reference to FIG. 5 is executed.

Figure 40:
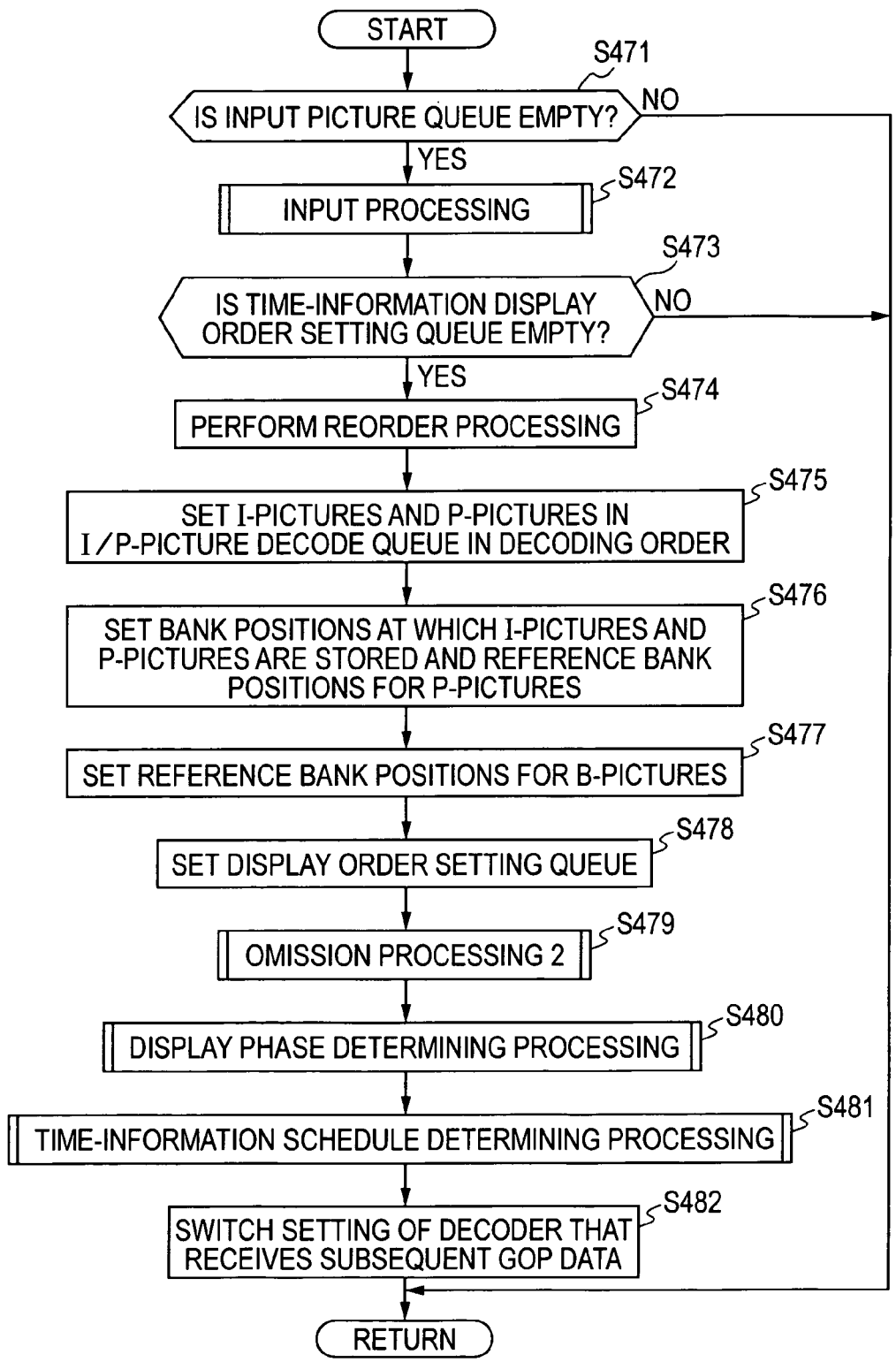
FIG. 40 is a flowchart illustrating decode scheduling 2.

In step S432, decode schedule processing 2, which is described below with reference to FIG. 40, is executed. In the decode schedule processing 2, the decode timing is scheduled. Before the decode timing scheduling processing, the picture type of picture displayed at the head of the decoding processing unit is detected.

Then, in step S433, the CPU 20 determines by referring to the time counter indicating the processing time for each frame whether the subject frame is one of the first through sixth frames of stream data to be played back in the decoding order.

If it is determined in step S433 that the subject frame is not one of the first through sixth frames, the process proceeds to step S434 in which the one-frame delay display setting processing discussed with reference to FIG. 38 is executed.

If it is determined in step S433 that the subject frame is one of the first through sixth frames of the stream data to be played back, or after step S434, the process proceeds to step S435 in which frame control processing 2, which is discussed below with reference to FIG. 42, is executed. In the frame control processing 2, the subject frame is decoded.

The CPU 20 determines in step S436 whether all frames have been processed. If it is determined in step S436 that not all frames have been processed, the process proceeds to step S437 in which the CPU 20 increments the time counter for each frame.

After step S437, the process returns to step S431, and the subsequent processing is repeated. If it is determined in step S436 that all the frames have been processed, the processing is completed.

As discussed above, the CPU 20 increments the time counter for each frame, performs decode scheduling in accordance with the playback speed instructed by the user, and decodes each frame. In this processing, before performing decode timing scheduling, the picture type of picture displayed at the head of the decoding processing unit is detected.

The decode schedule processing 2 executed in step S432 in FIG. 39 is described below with reference to the flowchart in FIG. 40.

Steps S471 through S478 are basically similar to steps S71 through S78, respectively, in FIG. 6.

In step S471, the CPU 20 determines by referring to the input queue whether the input queue is empty. If the input queue is not empty, the process returns to step S432 in FIG. 39. If the input queue is found to be empty in step S471, the process proceeds to step S472 in which the input processing discussed with reference to FIG. 15 is executed.

It is then determined in step S473 whether the time-information display order setting queue, which is set for the decoder that receives the subsequent data, is empty. If the time-information display order setting queue is not empty, that is, if decoding processing or display processing is being executed on each frame of a scheduled GOP, the process returns to step S432 in FIG. 39.

If the time-information display order setting queue is found to be empty in step S473, the process proceeds to step S474 in which the reorder processing is executed.

In step S475, the picture IDs of I-pictures and P-pictures of a GOP to be decoded are set in the I/P-picture decode queue in the decoding order. Then, in step S476, the bank positions at which the I-pictures and P-pictures are stored, and the reference image banks used for decoding the P-pictures are designated. In step S477, based on the bank positions for storing the I-pictures and P-pictures, the positions of reference image banks used for decoding B-pictures are designated. Then, the display order setting queue shown in FIGS. 12A and 12B is set.

In step S479, omission processing 2, which is described below with reference to FIG. 41, is executed. In the omission processing 2, the picture type of picture to be displayed at the head of the decoding processing unit is detected before performing decode timing scheduling processing.

Steps S480 through S482 are basically similar to steps S79 through S81, respectively, in FIG. 6. That is, in step S480, the display phase determining processing shown in FIG. 16 is executed. In step S481, the time-information schedule determining processing shown in FIG. 17 is executed so that decode timing and display timing are scheduled.

More specifically, because of the omission processing 2 in step S479, the picture type of picture to be displayed at the head of the decoding processing unit can be detected before performing decode timing scheduling. Accordingly, for example, if the head of the display is an I-picture or a P-picture, as shown in FIG. 13, the decode timing and display timing are scheduled so that the I-pictures and P-pictures are decoded before decoding B-pictures and so that the display timing becomes later than the decode timing by 6 pictures, with the result that the display timing of B-pictures becomes later than the decode timing of B-pictures by one frame. If the head of the display is a B-picture, as shown in FIG. 14, the decode timing and display timing are scheduled so that the I-pictures and P-pictures are decoded before decoding B-pictures and so that the display timing becomes later than the decode timing by 7 pictures, with the result that the display timing of B-pictures is later than the decode timing of B-pictures by one frame.

In step S482, the setting of the decoder that receives the subsequent data is switched. Then, the process returns to step S432 in FIG. 39.

According to the decode scheduling 2, the decode timing and display timing are scheduled.

The omission processing 2 executed in step S479 in FIG. 40 is discussed below with reference to the flowchart in FIG. 41.

In step S501, the CPU 20 determines based on the input stream state set in the input stream state changing processing discussed with reference to FIG. 5 whether the playback speed instructed by the user is fast. If it is determined in step S501 that the playback speed is not fast, the process proceeds to step S510, which is discussed below.

If the playback speed is found to be fast in step S501, the process proceeds to step S502 to determine whether the subject frame is the first frame of the first GOP after the speed setting is changed.

If the subject frame is found to be first frame of the first GOP in step S502, the process proceeds to step S503 in which the CPU 20 determines the omission cycle based on the speed setting value GOP_Speed and stores the determined omission cycle in the register.

More specifically, if the playback speed is ×2 or ×−2, the CPU 20 sets the omission cycle to be ½ and stores it in the register. If the playback speed is ×3 or ×−3, the CPU 20 sets the omission cycle to be ⅓ and stores it in the register.

In step S504, the CPU 20 resets the frame counter for counting the number of frames regardless of the decoding processing unit in the omission processing 2.

If it is determined in step S502 that the subject frame is not the first frame of the first GOP after the input stream state is changed, or after step S504, the process proceeds to step S505. In step S505, it is determined whether all the pictures IDs stored in the display order setting queue have been checked by determining whether check flags in association with the picture IDs stored in the display order setting queue have been set. The check flag is a flag set in the display order setting queue in step S509, which is discussed below. If it is determined in step S505 that all the picture IDs in the display order setting queue have been checked, the process proceeds to step S510.

If it is determined in step S505 that not all the picture IDs in the display order setting queue are checked, in other words, that there are some picture IDs for which check flags are not set in the display order setting queue, the process proceeds to step S506 in which the CPU 20 increments the frame counter by one.

Then, in step S507, the CPU 20 refers to the omission cycle determined and stored in the register and the frame counter value to determine whether the frame indicated in the frame counter is to be displayed. More specifically, if the frame counter indicates 2n (n is a positive integer) when the omission cycle is ½, the CPU 20 determines that the subject frame is to be displayed, and in other cases, the CPU 20 determines that the subject frame is not displayed. If the frame counter indicates 3n (n is a positive integer) when the omission cycle is ⅓, the CPU 20 determines that the subject frame is to be displayed, and in other cases, the CPU 20 determines that the subject frame is not displayed. If it is determined in step S507 that the subject frame is to be displayed, i.e., the frame is not omitted, the process proceeds to step S509.

If it is determined in step S507 that the frame is not displayed, i.e., that the frame is omitted, the process proceeds to step S508 in which the CPU 20 sets a delete flag in the subject frame in the display order setting queue.

If it is determined in step S507 that the frame is displayed, or after step S508, the process proceeds to step S509. In step S509, the CPU 20 sets a check flag in the picture ID corresponding to the frame indicated in the frame counter. The process returns to step S505, and the corresponding processing is repeated.

If it is determined in step S501 that the playback speed is not fast, or if it is determined in step S505 that all the picture IDs in the display order setting queue have been checked, the process proceeds to step S510. In step S510, the CPU 20 sets, in the display order setting queue, the speed setting value GOP_Speed when executing the omission processing 2. The process returns to step S479 in FIG. 40.

According to the omission processing 2, before performing decode scheduling, a delete flag is set in a frame to be omitted in the display order setting queue, and the picture type of picture to be displayed at the head of the decoding processing unit can be detected when conducting decode scheduling. After this processing routine, only B-pictures to be displayed are decoded, and B-pictures to be omitted are not supplied to the decode processor 77. I-pictures or P-pictures to be omitted are not displayed although they are decoded.

The frame control processing 2 executed in step S435 in FIG. 39 is described below with reference to FIG. 42.

In step S541, the CPU 20 determines whether there is any stream data for which the display time has passed by referring to the time-information I/P-picture decode queue and the time management counter for managing the timing of each processing executed in the playback apparatus 1. If it is determined in step S541 that there is stream data for which the display time has passed, the process proceeds to step S547 in which the underflow processing discussed with reference to FIG. 35 is executed. The process then returns to step S435 in FIG. 39.

If it is determined in step S541 that there is no stream data for which the display time has passed, steps S542 through S545, which are basically similar to steps S192 through S195, respectively, in FIG. 18, are executed.

More specifically, in step S542, I-picture/P-picture decoding processing, which is discussed below with reference to FIG. 19, is executed. In step S543, B-picture decoding processing, which is discussed below with reference to FIG. 20, is executed. In step S544, the CPU 20 sends display picture information to the CPU 11 and increments the time management counter. Steps S542 through S544 are executed on frames in which delete flags are not set (frames that are not omitted) in step S508 in FIG. 41.

Figure 43:
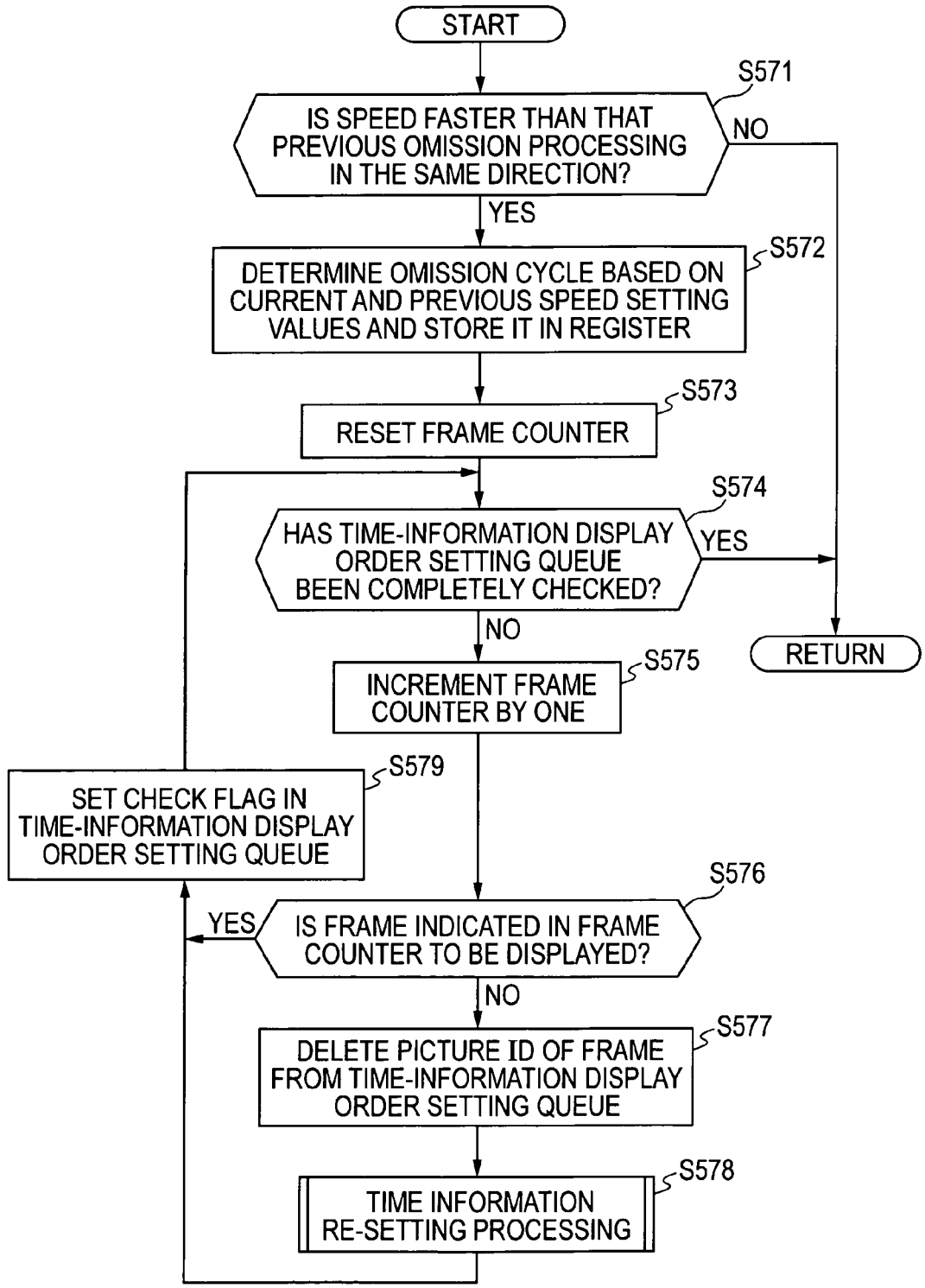
FIG. 43 is a flowchart illustrating omission processing 3.

Then, in step S546, omission processing 3, which is described below with reference to FIG. 43, is executed, and the process then returns to step S435 in FIG. 39.

According to the frame control processing 2, if there is no stream data for which the display time has passed, one frame is decoded based on the decode schedule, and the display picture information is sent to the CPU 11, and the omission processing 3 is executed. If there is stream data for which the display time has passed, the underflow processing described with reference to FIG. 35 is executed.

A description is now given, with reference to the flowchart in FIG. 43, of the omission processing 3 executed in step S546 in FIG. 42.

In step S571, the CPU 20 determines whether the playback speed is faster than that when the previous omission processing (omission processing 2 if the omission processing 2 is executed in decode schedule processing 2) in the same direction. More specifically, the CPU 20 determines that the playback speed becomes faster if the current speed (speed) is greater than GOP_speed set in the display order setting queue, i.e., if speed/GOP_speed>1 holds true. If it is determined in step S571 that the playback speed is not faster than that in the previous omission processing in the same direction, i.e., the playback speed remains the same or is slower, or the playback direction is reversed, the process returns to step S546 in FIG. 42 and proceeds to step S436 in FIG. 39.

If it is determined in step S571 that the current speed becomes faster than that in the previous omission processing in the same direction, the process proceeds to step S572. In step S572, the CPU 20 determines the omission cycle based on the current speed setting value and the speed setting value in the previous omission processing 2 and stores the determined omission cycle.

More specifically, the CPU 20 sets the omission cycle based on the reciprocal of the absolute value of speed/GOP_speed. For example, if the current speed is changed to ×4 from the previous speed ×2, the CPU 20 sets the omission cycle to be ½ and stores it in the register.

In step S573, the CPU 20 resets the frame counter for counting the number of frames regardless of the decoding processing unit in the omission processing 3.

In step S574, it is determined whether a check flag is set in association with each picture ID stored in the time-information display order setting queue, thereby determining whether all the picture IDs set in the time-information display order setting queue have been checked. The check flag is a flag set in the time-information display order setting queue in step S579, which is discussed below. If all the picture IDs stored in the time-information display order setting queue are found to be checked in step S574, the process returns to step S546 in FIG. 42 and proceeds to step S436 in FIG. 39.

If it is determined in step S574 that not all the picture IDs in the time-information display order setting queue are checked, i.e., that there are some picture IDs for which check flags are not set, the process proceeds to step S575 in which the CPU 20 increments the frame counter by one.

Then, in step S576, the CPU 20 refers to the omission cycle determined and stored in the register and the frame counter value to determine whether the frame indicated in the frame counter is to be displayed. More specifically, if the frame counter indicates 2n (n is a positive integer) when the omission cycle is ½, the CPU 20 determines that the subject frame is to be displayed, and in other cases, the CPU 20 determines that the subject frame is not displayed. If the frame counter indicates 3n (n is a positive integer) when the omission cycle is ⅓, the CPU 20 determines that the subject frame is to be displayed, and in other cases, the CPU 20 determines that the subject frame is not displayed. If it is determined in step S576 that the subject frame is to be displayed, i.e., the frame is not omitted, the process proceeds to step S579.

If it is determined in step S576 that the subject frame is not displayed, i.e., the frame is to be omitted, the process proceeds to step S577. In step S577, the CPU 20 deletes the picture ID of the subject frame from the time-information display order setting queue or sets a flag indicating that the frame is not displayed (non-display flag) in the picture ID in the time-information display order setting queue.

In step S578, time-information re-setting processing described with reference to FIG. 24 is executed. In this case, the time information added value added_count calculated in step S302 is the number of pictures changed by the omission processing in steps S576 and S577 when the speed is changed from the previous omission processing.

If it is determined in step S576 that the frame indicated in the frame counter is to be displayed, or after step S578, the process proceeds to step S579. In step S579, the CPU 20 sets a check flag in the picture ID of the frame indicated in the frame counter in the time-information display order setting queue. The process then returns to step S574 and the corresponding processing is repeated.

According to the omission processing 3, if the speed is changed to be faster than that in the omission processing 2 in the same direction, the picture IDs of frames that are not displayed are deleted from the time-information display order setting queue, or a non-display flag is set in the corresponding picture IDs in the time-information display order setting queue. The B-picture display processing and one-frame delay display setting processing are performed by referring to the re-set time-information display order setting queue. If the speed is changed to be faster than that in the omission processing 2 in the same direction, the setting of the time-information display order setting queue is changed based on the set speed. Accordingly, after this processing routine, only B-pictures to be displayed are decoded, in other words, B-pictures to be omitted are not supplied to the decode processor 77. I-pictures and P-pictures to be omitted are not displayed although they are decoded.

Thus, even after finishing the decode scheduling, it is determined for each frame whether the speed setting is changed. If the speed is changed to be faster than that in the omission processing 2 in the same direction, the time-information display order setting queue is re-set, thereby performing decode scheduling so that stream data can be played back by quickly responding to a speed change.

The decoding processing has been described above when one GOP includes 15 pictures. The case where the number of anchor frames (I-pictures and P-pictures) contained in one GOP is 6 or more or 4 or less is described below with reference to FIGS. 44 through 64.

Figure 44:
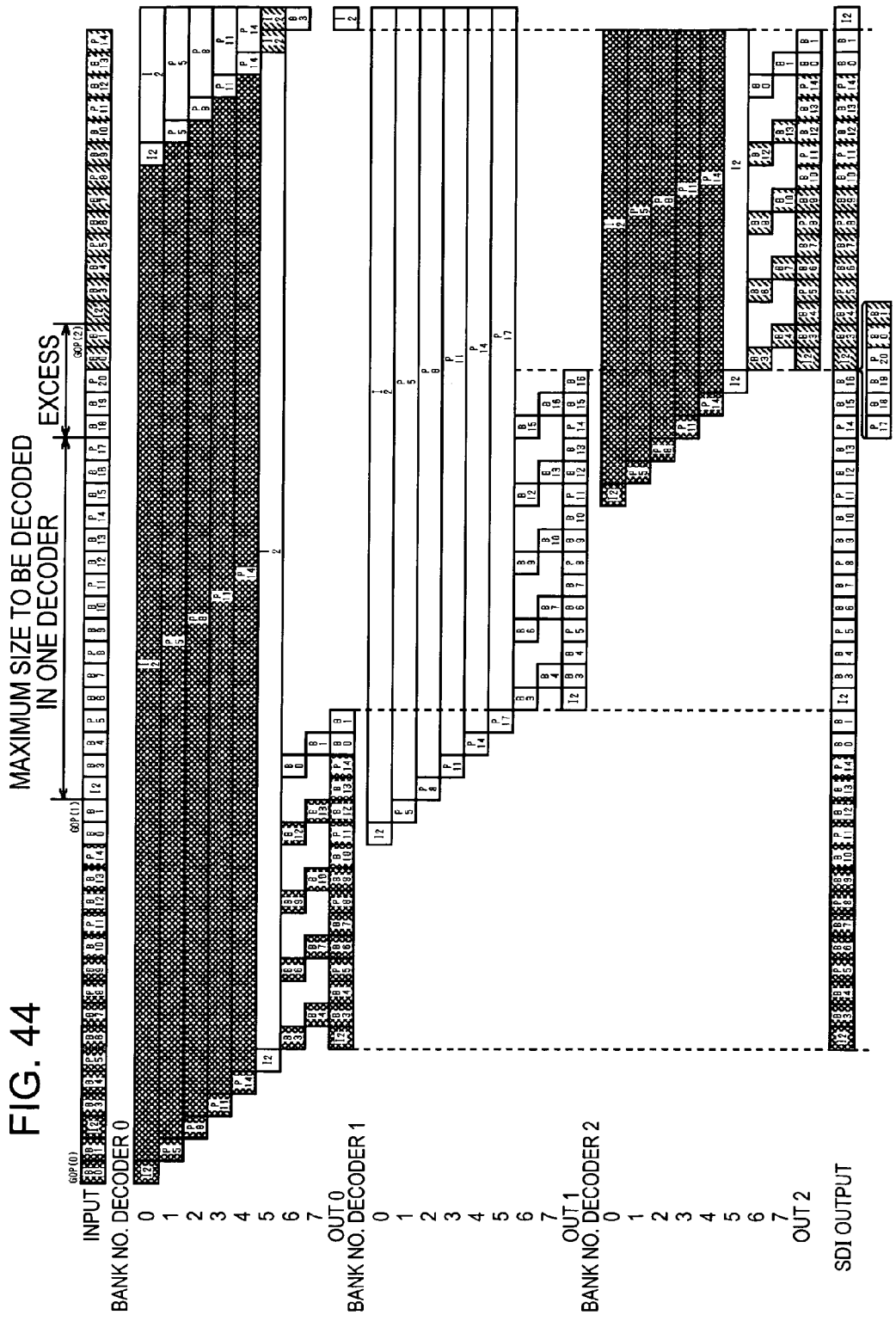
FIGS. 44 and 45 illustrate decoding of GOPs having a large number of anchor frames.
Figure 45:
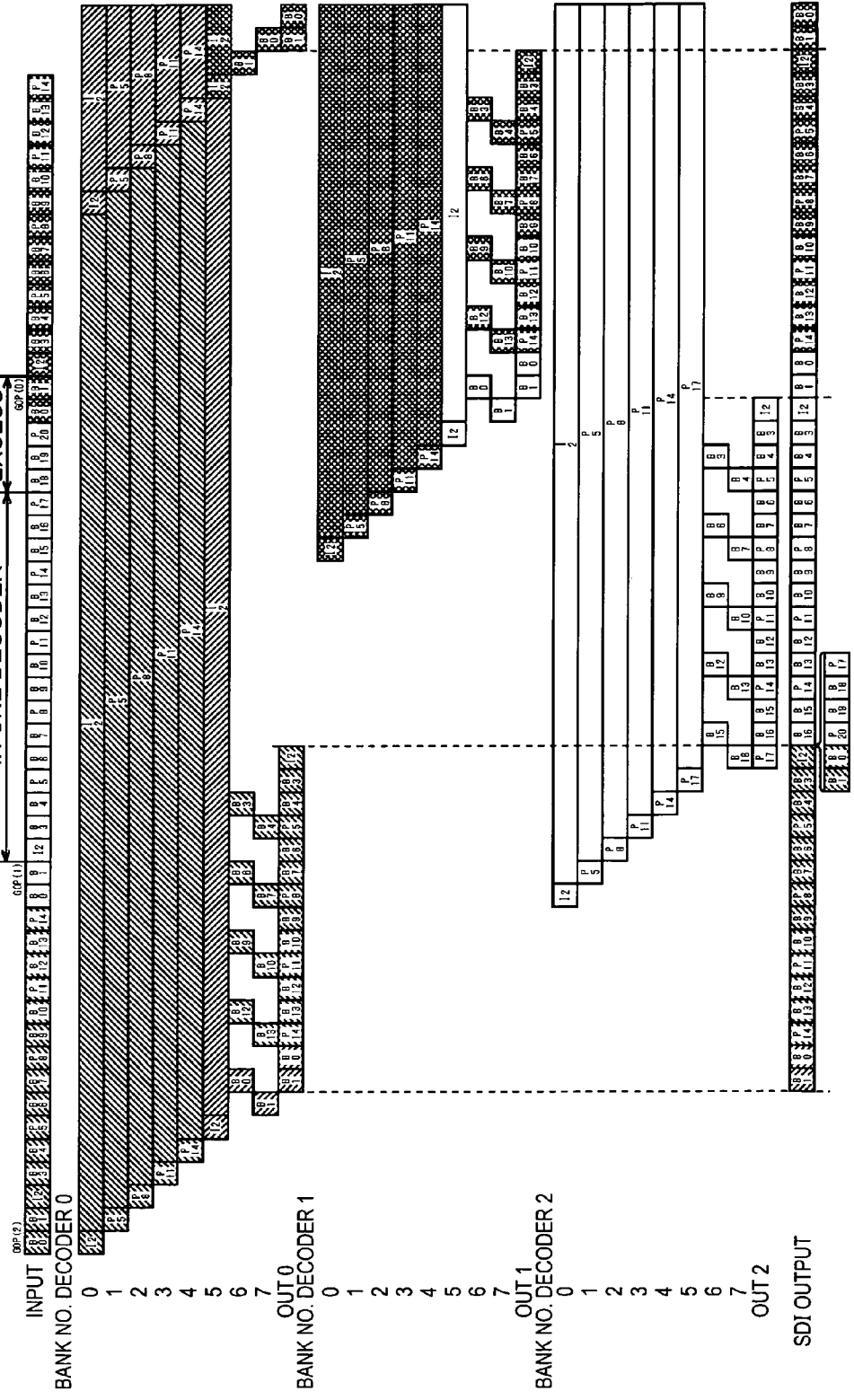

If decoding is performed for each GOP including many anchor frames, as shown in FIGS. 44 and 45, in a manner similar to the decoding processing performed for each GOP including 15 pictures by the playback apparatus 1 shown in FIG. 1, some pictures are not decoded or the decoding of some pictures is delayed.

A description is now given, with reference to FIG. 44, a case where a stream including GOP(0) formed of 15 pictures from B0 through P14, GOP(1) formed of 21 pictures from B0 through P20, and GOP(2) formed of 15 pictures from B0 through P14 is played back at ×1 in the forward direction by decoding one GOP by one decoder (one of the decoders 22, 23, and 24) in a manner similar to the decoding processing performed for one GOP including 15 pictures.

The B picture at the head of each GOP is decoded with the previous GOP. Since there are 7 anchor frames in GOP(1), among the 8 banks in the video bank memory 82, the 6 banks used for decoding anchor frames are occupied by I2 through P17, and there is no room for the following anchor frames P20 of GOP(1) and I2 of GOP(2). Accordingly, in the decoder that decodes the GOP(1), anchor frames P20 of GOP(1) and I2 of GOP(2) cannot be used as reference images during decoding, thereby failing to decode P17 and the subsequent frames of GOP(1) and B0 and B1 of GOP(2).

A description is now given, with reference to FIG. 45, a case where a stream including GOP(0) formed of 15 pictures from B0 through P14, GOP(1) formed of 21 pictures from B0 through P20, and GOP(2) formed of 15 pictures from B0 through P14 is played back at ×−1 in the reverse direction by decoding one GOP by one decoder (one of the decoders 22, 23, and 24) in a manner similar to the decoding processing performed for one GOP including 15 pictures.

The B picture at the head of each GOP is decoded with the subsequent GOP. Since there are 7 anchor frames in GOP(1), as in FIG. 44, among the 8 banks in the video bank memory 82, the 6 banks used for decoding anchor frames are occupied by I2 through P17, and there is no room for the following anchor frame P20 of GOP(1) and I2 of the previous GOP(2). Accordingly, in the decoder that decodes the GOP(1), anchor frames P20 of GOP(1) and I2 of the previous GOP(2) cannot be used as reference images during decoding, thereby failing to decode P17 and the subsequent frames of GOP(1) and B0 and B1 of GOP (2).

As discussed above, with a large number of anchor frames of pictures forming one GOP, some frames are not decoded if decoding processing is performed in a manner similar to that performed for each GOP including 15 pictures by the playback apparatus 1 shown in FIG. 1.

A case where a fast playback operation is continuously performed on a GOP having 4 or less anchor frames and a GOP having 5 or more anchor frames is discussed below with reference to FIGS. 46 and 47.

Figure 46:
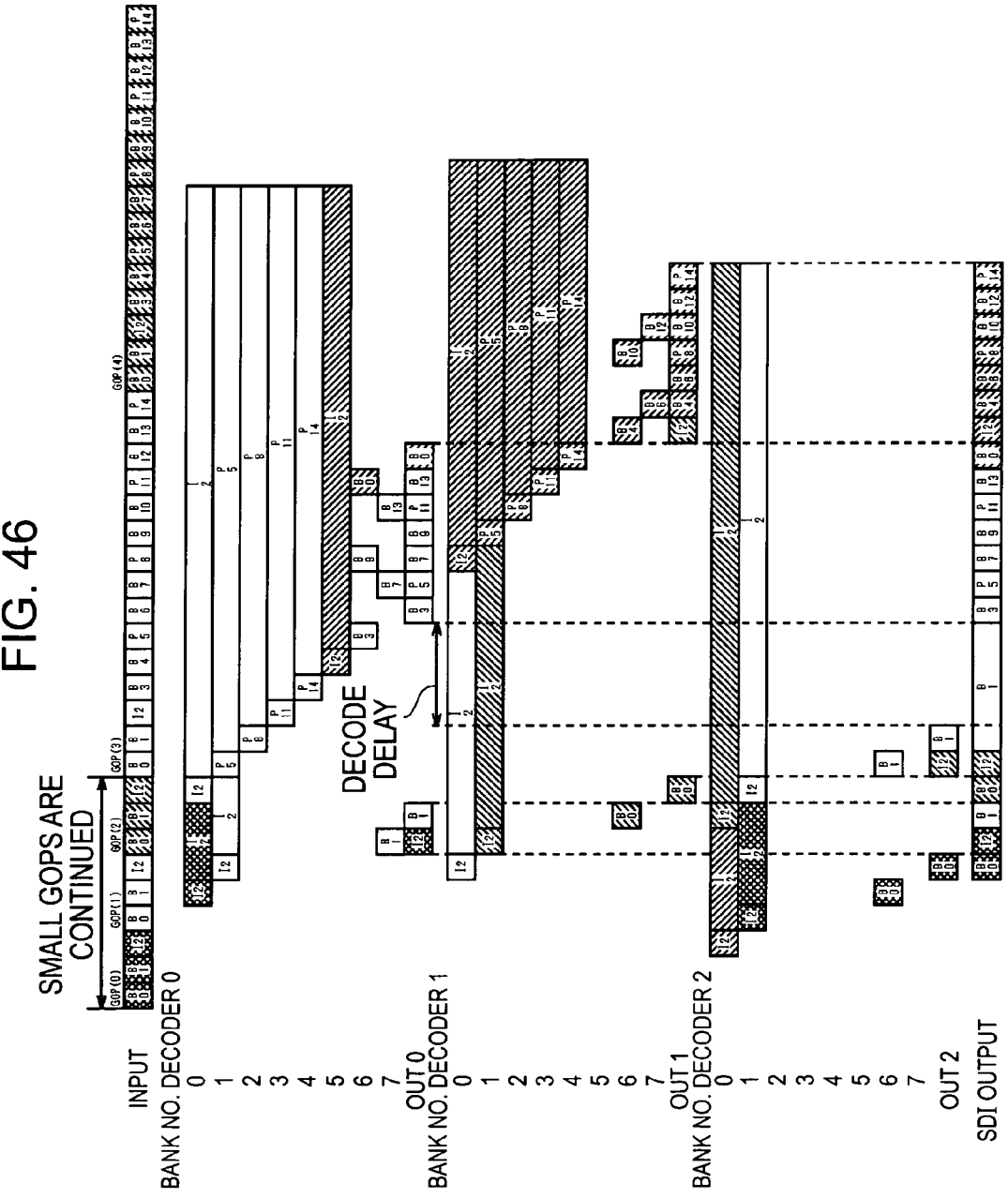
FIGS. 46 and 47 illustrates decoding of GOPs having a small number of anchor frames.

A description is now given, with reference to FIG. 46, of a case where a stream including GOP(0), GOP(1), and GOP(2), each being formed of 3 pictures B0, B1, and I2, and including GOP(3) and GOP(4) formed of 15 pictures from B0 to P14 is played back at ×2 in the forward direction by decoding one GOP by one decoder (one of the decoders 22, 23, and 24) in a manner similar to the decoding processing performed on one GOP including 15 pictures.

The B-pictures at the head of each GOP is decoded with the previous GOP. There is only one anchor frame in GOP(0), GOP(1), and GOP(2), and there are 5 anchor frames in the subsequent GOP(3). Between B0 and B1 of GOP(0), B0, which is to be displayed, is decoded with the previous frame in decoder 2, and then, I2 of GOP(0) and B1, which is to be displayed, of GOP(1) are decoded in decoder 0, and then, I2 of GOP(1) and B0, which is to be displayed, of GOP(2) are decoded in decoder 1. In each decoder, the subsequent decoding processing is not started until all the pictures in the previous decoding processing are output.

That is, since decoder 0 starts decoding the anchor frames of GOP(3) after outputting B1 of GOP(1), a delay occurs in the decoding processing. Accordingly, B1 of GOP(3) decoded by decoder 2 remains output until the decoding of B3, which is first displayed, is finished after decoding the anchor frames of GOP(3).

Figure 47:
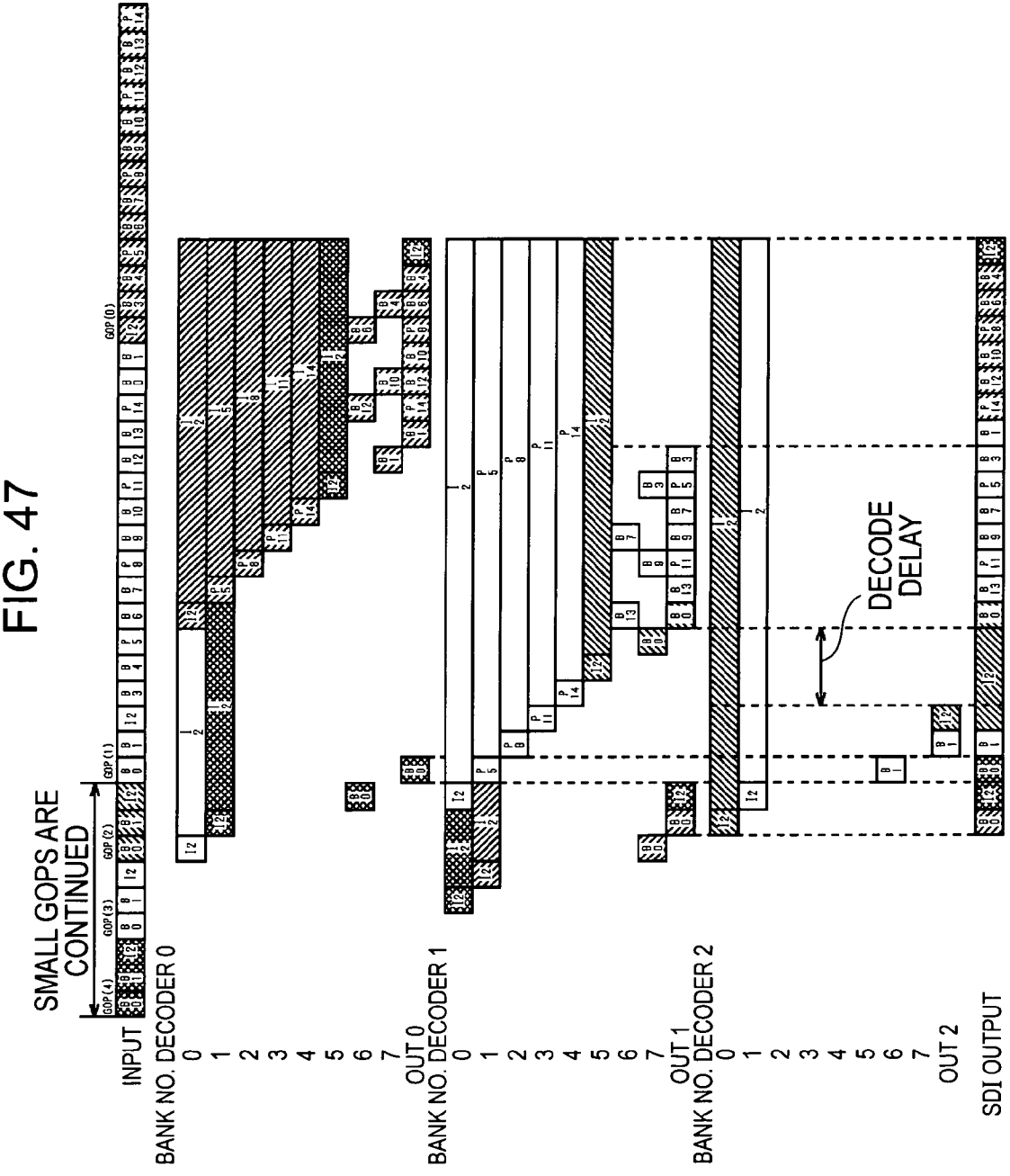

A description is now given, with reference to FIG. 47, a case where a stream including GOP(4), GOP(3, and GOP(2), each being formed of 3 pictures B0, B1, and I2, and including GOP(1) and GOP(0) formed of 15 pictures from B0 to P14 is played back at ×−2 in the reverse direction by decoding one GOP by one decoder (one of the decoders 22, 23, and 24) in a manner similar to the decoding processing performed on one GOP including 15 pictures.

The B-picture at the head of each GOP is decoded with the subsequent GOP. There is only one anchor frame in GOP(4), GOP(3), and GOP(2), and there are 5 anchor frames in the subsequent GOP(1). Between B0 and B1 of the GOP prior to GOP(4), B0, which is to be displayed, is decoded with I2 of GOP(4) in decoder 1, and then, between B0 and B1 of GOP (4), B1, which is to be displayed, is decoded together with I2 of GOP(3) in decoder 0. Then, between B0 and B1 of GOP(3), B1, which is to be displayed, is decoded together with I2 of GOP(2) in decoder 2. Then, between B0 and B0 of GOP(2), B0, which is to be displayed, is decoded together with GOP (1) in decoder 1. In each decoder, the subsequent decoding processing is not started until all the pictures in the previous decoding processing are output.

That is, since decoder 1 starts decoding the anchor frames of GOP(1) after outputting I2 of GOP(4), a delay occurs in decoding processing. Accordingly, I2 of GOP(3) decoded by decoder 2 remains output until the decoding of B0, which is first displayed, of GOP(2) is finished after decoding the anchor frames of GOP(1).

In this manner, if decoding processing similar to that performed on one GOP including 15 pictures by the playback apparatus 1 shown in FIG. 1 is performed on a GOP including a small number of anchor frames and a GOP including a large number of anchor frames, it takes time to decode anchor frames, thereby causing a delay in decoding processing.

To deal with the situation where the number of pictures in a GOP is other than 15 in the playback apparatus 1 shown in FIG. 1, as described with reference to FIGS. 44 through 47, the following measure can be taken. After detecting the structure of each GOP, the decode unit, which serves as the decoding processing unit, including anchor frames corresponding to the number of banks of the video bank memory 82 of the decoder 22, 23, or 24 may be reconstructed by dividing or combining the GOPs.

The dividing of a GOP containing 30 frames and the decoding the divided GOPs are discussed below with reference to FIGS. 48 through 50B.

Figure 48:
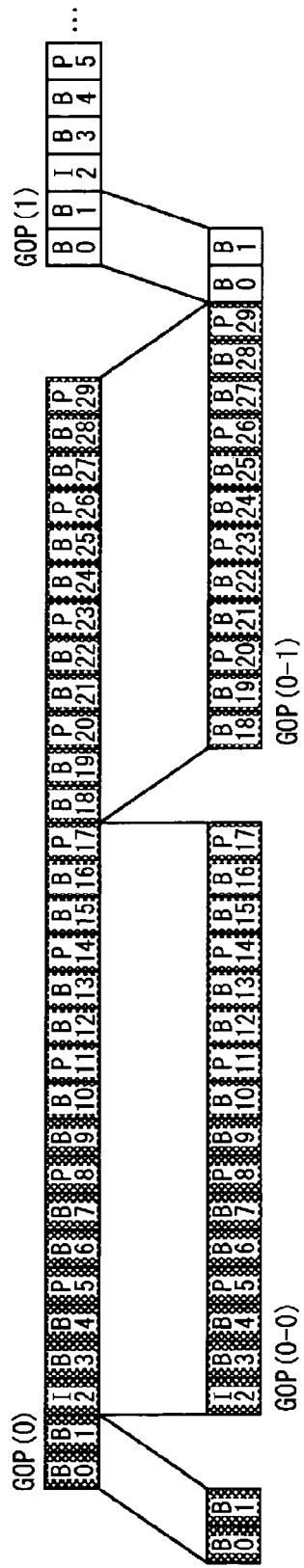

GOP(0) is formed of 30 frames, i.e., B0 through P29, as shown in FIG. 48, followed by GOP(1). In each decoding processing unit, the first two B-pictures are decoded together with the previous GOP.

Among the 8 banks of the video bank memory 82, 6 banks can be allocated to anchor frames. Since there are 10 anchor frames in GOP(0), not all the frames can be decoded by the same decoding processing as that on each GOP including 15 pictures. Accordingly, GOP(0) is divided into two decoding processing units, as indicated in the bottom section of FIG. 48, so that the number of anchor frames becomes 6 or less, and then, decoding is performed so that anchor frames necessary for decoding all the P-pictures and B-pictures contained in the divided GOPs are also decoded.

GOP(0) is divided into two decoding processing units GOP (0-0) including I2 through P17 and GOP(0-1) including B18 through P29 and B0 and B1, as shown in FIGS. 49A and 49B, and GOP(0-0) and GOP(0-1) are decoded by different decoders. The final anchor frame P17 of GOP(0-0) is required for decoding the two B pictures B18 and B19 at the head of GOP(0-1). That is, P17 also serves as the anchor frame of GOP(0-1). The anchor frames of GOP(0-0) are required for decoding the anchor frames of GOP(0-1). Accordingly, after decoding the anchor frames of GOP(0-0) by using the 6 banks for decoding anchor frames, the anchor frames of GOP(0-1) and the first I-picture of the subsequent GOP are decoded by using the 6 banks (by overwriting the banks).

Thus, in either decoder for decoding GOP(0-0) or GOP(0-1), the anchor frames are decoded in fixed banks, and the decoding order of anchor frames is unchanged regardless of whether the playback direction is forward or reverse or whether the playback speed is normal or fast. In contrast, in both the GOP(0-0) and GOP(0-1), the decoding order of B-pictures are different depending on the playback direction or playback speed. In FIGS. 49A and 49B, the decoding orders at the ×1 and ×−1 forward and reverse playback speeds are shown.

In the ×1 playback operation, as shown in FIG. 50A, in one decoder, after decoding the anchor frames I2 through P17 of GOP(0-0), B-pictures B3 through B16 of GOP(0-0) are decoded. Meanwhile, in the other decoder, after decoding the anchor frames I2 through P14, the anchor frames P17 through P29 of GOP(0-1) and the first I2 picture of GOP(1) are decoded by using the anchor frames I2 through P14 as reference images, and then, B-pictures B18 through B28 of GOP (0-1) and B0 and B1 of GOP(1) are decoded.

In the ×−1 playback operation, as shown in FIG. 50B, in one decoder, after decoding the anchor frames I2 through P14, the anchor frames P17 through P29 of GOP(0-1) and the first I2 frame of GOP(1) are decoded by using the anchor frames I2 through P14 as reference images, and then, B1 and B0 of GOP(1) and B-pictures B28 through B18 of GOP(0-1) are decoded. In the other decoder, after the anchor frames I2 through P17 of GOP(0-0) are decoded, B-pictures B16 through B3 of GOP(0-0) are decoded.

Next, the setting of the decoding processing unit and the decoding processing when GOPs, each including 4 or less anchor frames, are continued are described below with reference to FIGS. 51 through 53B.

Figure 51:
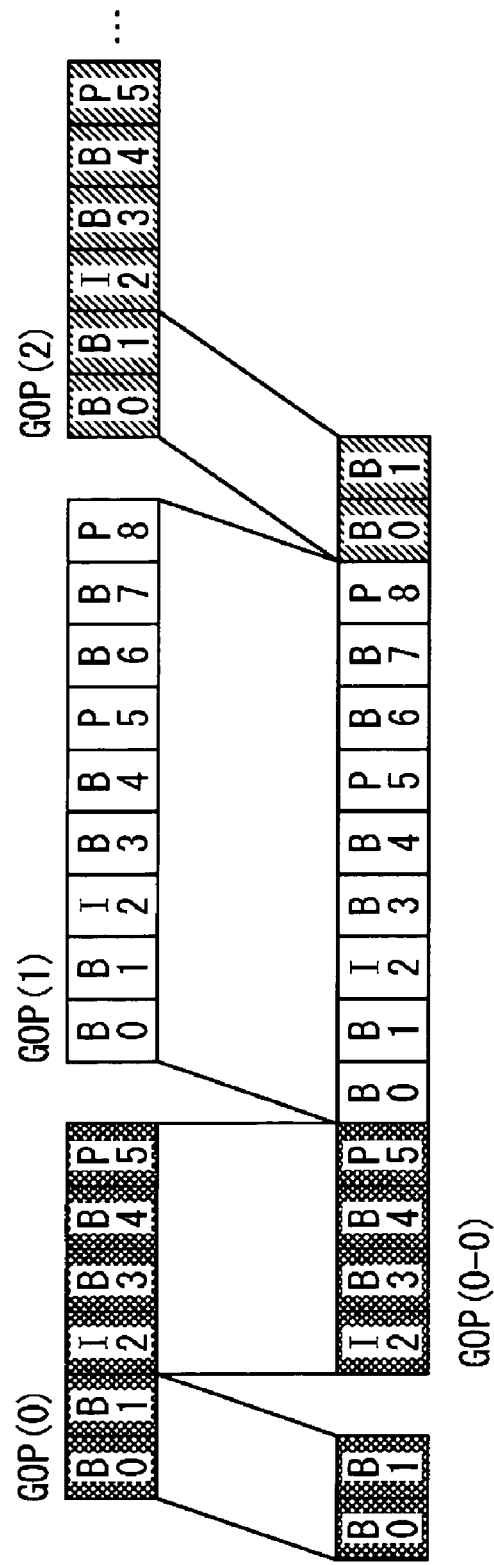

As shown in FIG. 51, GOP(0) is formed of 6 frames B0 through P5, and GOP(1) is formed of 9 frames B0 through P8, followed by GOP(2). In each decoding processing unit, the first two B-pictures are decoded together with the previous GOP.

Among the 8 banks of the video bank memory 82, 6 banks are allocated to anchor frames. There are two anchor frames in GOP(0) and there are three anchor frames in GOP(1). Accordingly, GOP(0) and GOP(1) are combined, as indicated in the bottom section of FIG. 51, so that the number of anchor frames becomes 6 or less.

Figure 52:
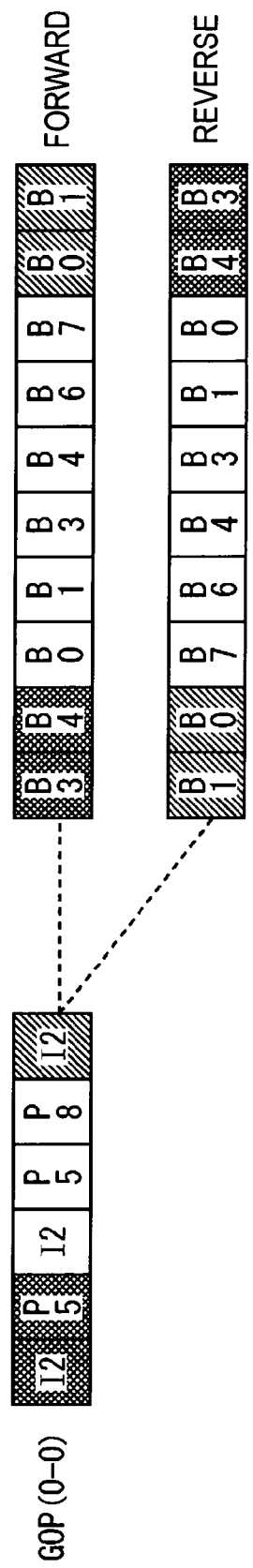

In this case, the first two B-frames B0 and B1 of GOP(0) are decoded together with the previous GOP, and I2 through P5 of GOP(0), GOP(1), and the first two B-pictures B0 and B1 of GOP(2) are decoded as the same decoding processing unit GOP(0-0). The anchor frames are decoded in the fixed banks, and the decoding order of anchor frames is unchanged, as shown in FIG. 52, regardless of whether the playback direction is forward or reverse or whether the playback speed is normal or fast. In contrast, the decoding order of B-pictures is different depending on the playback direction or playback speed. In FIG. 52, the decoding orders at the ×1 or ×−1 forward and reverse playback speeds are shown.

In the ×1 forward-direction playback operation, as shown in FIG. 53A, in either decoder, the anchor frames of GOP(0-0) and the first I2 frame of GOP(2) are decoded, and then, B-pictures of GOP(0-0) are decoded. Then, in the ×−1 reverse-direction playback operation, as shown in FIG. 53B, in either decoder, to perform the reverse-direction playback operation, the anchor frames of GOP(0-0) and the first I2 frame of GOP(2) are decoded, and then, B-pictures of GOP (0-0) are decoded.

There may be the case where a GOP including 6 or more anchor frames and a GOP having 4 or less anchor frames are continued. In this case, the setting of the decoding processing units by combining such GOPs and then re-dividing them to equally distribute the load to decoders is described below with reference to FIGS. 54 through 56B.

As shown in FIG. 54, GOP(0) includes 21 frames B0 through P20, and GOP(1) includes 9 frames B0 through P8, followed by GOP(2). In each decoding processing unit, the first two B-pictures are decoded together with the previous GOP.

Among the 8 banks of the video bank memory 82, 6 banks can be allocated to anchor frames. However, since there are 7 anchor frames in GOP(0), errors occur if decoding is performed on GOP(0) in a manner similar to that when one GOP includes 15 pictures. In this case, GOP(0) may be divided into two decoding processing units so that the number of anchor frames becomes 6 or less. However, since the number of frames of the following GOP is small, GOP(0) and GOP(1) are combined and are re-divided, as indicated in the bottom section of FIG. 54, so that two decoding processing units GOP(0-0) and GOP(0-1) are generated from GOP(0) and GOP(1), and decoding is then performed based on those decoding processing units.

Figure 55A:
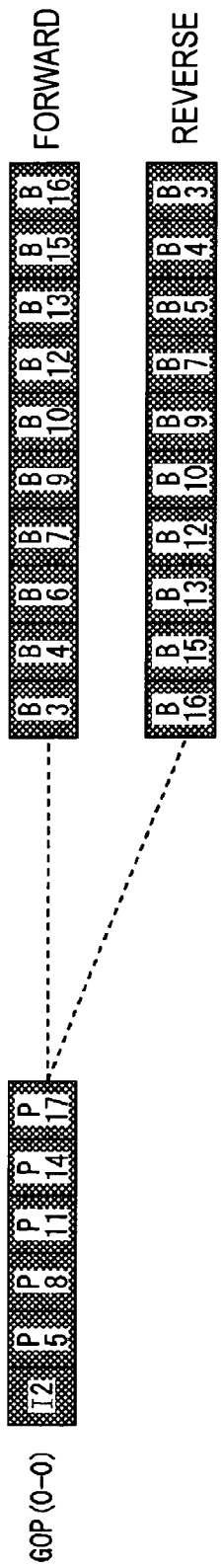
Figure 55B:
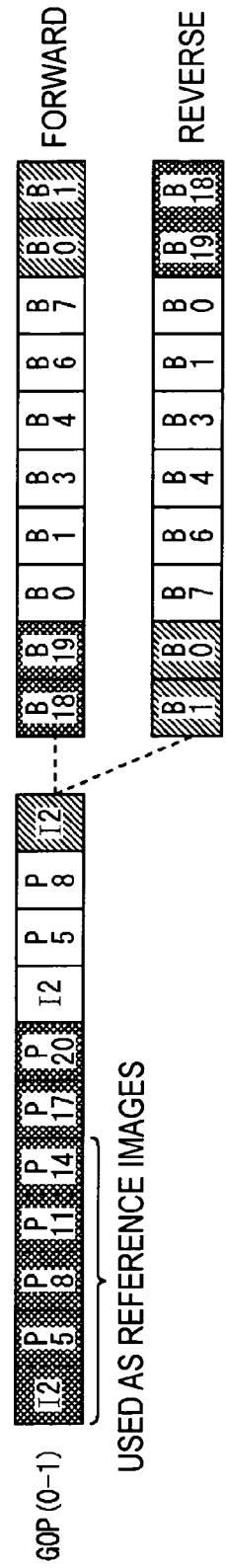

After combining GOP(0) and GOP(1), I2 through P17 of GOP(0) are set, as shown in FIG. 55A, to be a first decoding processing unit GOP(0-0), and B18 through P20 of GOP(0), the entire GOP(1), and B1 and B2 of GOP(2) are set, as shown in FIG. 55B, to be a second decoding processing unit, and the first and second decoding processing units are decoded in different decoders. The final anchor frame P17 of G(0-0) is required for decoding the first two B-pictures B18 and B19 of GOP(0-1). That is, P17 also serves as the anchor frame of GOP(0-1). The anchor frames of GOP(0-0) are required for decoding the anchor frames of GOP(0-1). Accordingly, after decoding the anchor frames of GOP(0-0) by using the 6 banks for decoding anchor frames, the anchor frames of GOP(0-1) and the first I-picture of the subsequent GOP are decoded by using the 6 banks (by overwriting the 6 banks).

Thus, in either decoder for decoding GOP(0-0) or GOP(0-1), the anchor frames are decoded in the fixed banks, and the decoding order of anchor frames is unchanged regardless of whether the playback direction is forward or reverse or whether the playback speed is normal or fast. In contrast, in both the GOP(0-0) and GOP(0-1), the decoding order of B-pictures is different depending on the playback direction or playback speed. In FIGS. 55A and 55B, the decoding orders at the ×1 or ×−1 forward and reverse playback speeds are shown.

More specifically, in the ×1 forward-direction playback operation, as shown in FIG. 56A, in one decoder, after decoding I2 through P17 of GOP(0), which are anchor frames of GOP(0-0), B3 through B16 of GOP(0), which are B-pictures of GOP(0-0), are decoded. In the other decoder, after decoding the anchor frames I2 through P14 of GOP(0-0), P17 and P20 of GOP(0) and I2, P5, and P8 of GOP(1), which are the anchor frames of GOP(0-1), and the first I2 of GOP(2) are decoded by using I2 through P14 as reference images, and then, B18 and B19 of GOP(0) and B0 through B7 of GOP(1), which are B-pictures of GOP(0-1), and B0 and B1 of GOP(2) are decoded.

In the ×−1 reverse-direction playback operation, as shown in FIG. 56B, in one decoder, after decoding the anchor frames I2 through P14 of GOP(0-0), P17 and P20 of GOP(0) and I2, P5, and P8 of GOP(1), which are anchor frames of GOP(01), and the first I2 of GOP(2) are decoded by using I2 through P14 as reference images. Then, B1 and B0 of GOP(2) and B7 through B0 of GOP(1) and B19 and B18 of GOP(0), which are B-pictures of GOP(0-1), are decoded. In the other decoder, after decoding I2 through P17, which are anchor frames of GOP(0-0), B16 through B3 of GOP(0), which are B-pictures of GOP(0-0), are decoded.

There may be the case where a GOP including 4 or less anchor frames and a GOP having 6 or more anchor frames are continued. In this case, the setting of the decoding processing units by combining such GOPs and then re-dividing them to equally distribute the load to decoders is described below with reference to FIGS. 57 through 59B.

Figure 57:
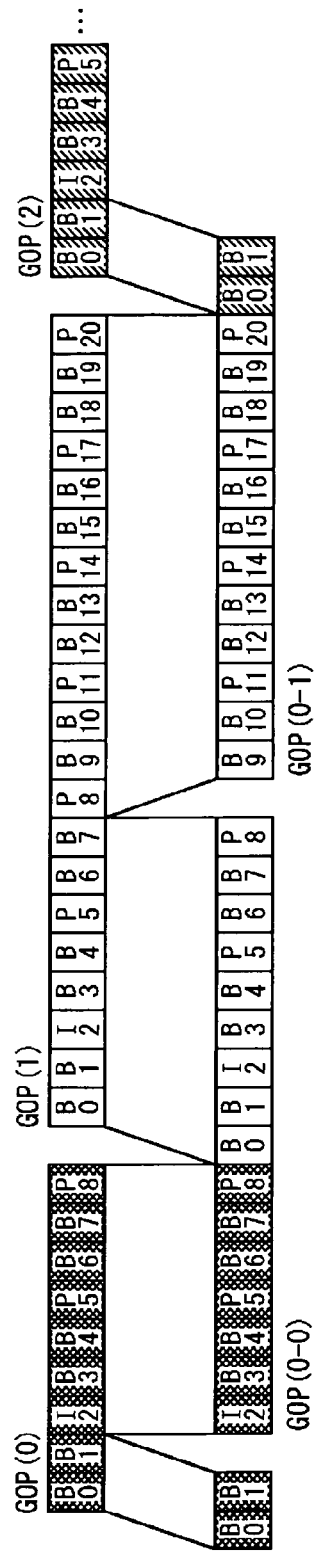

As shown in FIG. 57, GOP(0) includes 9 frames B0 through P8, and GOP(1) includes 21 frames B0 through P20, followed by GOP(2). In each decoding processing unit, the first two B-pictures are decoded together with the previous GOP.

Among the 8 banks of the video bank memory 82, 6 banks can be allocated to anchor frames. Although there are only three anchor frames in GOP(0), there are 7 anchor frames in GOP(1), and thus, GOP(0) and GOP(1) are combined and are re-divided, as indicated in the bottom section of FIG. 57, so that two decoding processing units GOP(0-0) and GOP(0-1) are generated from GOP(0) and GOP(1), and decoding is then performed based on those decoding processing units.

After combining GOP(0) and GOP(1), I2 of GOP(0) through P8 of GOP(1) are set, as shown in FIG. 58A, to be a first decoding processing unit GOP(0-0), and B9 through P20 of GOP(1) and B1 and B2 of GOP(2) are set, as shown in FIG. 58B, to be a second decoding processing unit, and the first and second decoding processing units are decoded in different decoders. The final anchor frame P8 of GOP(0-0) is required for decoding the first two B-pictures B9 and B10 of GOP(0-1). That is, P8 also serves as the anchor frame of GOP(0-1). Among the anchor frames of GOP(0-0), the anchor frames I2 and P5 of GOP(1) are required for decoding the anchor frames of GOP(0-1). Accordingly, after decoding I2 and P5 of GOP(1) by using one of the 6 banks for decoding anchor frames, the anchor frames of GOP(0-1) and the first I-picture of the subsequent GOP are decoded by using the 6 banks (by overwriting the 6 banks).

Thus, in either decoder for decoding GOP(0-0) or GOP(0-1), the anchor frames are decoded in the fixed banks, and the decoding order of anchor frames is unchanged regardless of whether the playback direction is forward or reverse or whether the playback speed is normal or fast. In contrast, in both the GOP(0-0) and GOP(0-1), the decoding order of B-pictures is different depending on the playback direction or playback speed. In FIGS. 58A and 58B, the decoding orders at the ×1 and ×−1 forward and reverse playback speeds are shown.

More specifically, in the ×1 forward-direction playback operation, as shown in FIG. 59A, in one decoder, after decoding I2 through P8 of GOP(0) and I2 through P8 of GOP (1), which are anchor frames of GOP(0-0), B3 through B7 of GOP(0) and B0 through B7 of GOP(1), which are B-pictures of GOP(0-0), are decoded. In the other decoder, after decoding the anchor frames I2 through P5 of GOP(1), which are anchor frames of GOP(0-0), P8 through P20 of GOP(1), which are anchor frames of GOP(0-1), and the first I2 of GOP(2) are decoded by using I2 through P5 as reference images, and then, B9 through B19 of GOP(1), which are B-pictures of GOP(0-1), and B0 and B1 of GOP(2) are decoded.

In the ×−1 reverse-direction playback operation, as shown in FIG. 59B, in one decoder, after decoding the anchor frames I2 and P5 of GOP(1), which are anchor frames of GOP(0-0), P8 through P20 of GOP(1), which are the anchor frames of GOP(0-1), and the first I2 of GOP(2) are decoded by using I2 and P5 as reference images. Then, B1 and B0 of GOP(2) and B19 through B9 of GOP(1), which are B-pictures of GOP(0-1), are decoded. In the other decoder, after decoding I2 through P8 of GOP(0) and I2 through P8 of GOP(1), which are anchor frames of GOP(0-0), B7 through B0 of GOP(1) and B7 through B3 of GOP(0), which are B-pictures of GOP (0-0), are decoded.

As described with reference to FIGS. 48 through 59B, the decode unit, which serves as the decoding processing unit, is constructed. Then, decoding scheduling is conducted for each decode unit, and frame omission is performed as required so that the playback operation can be performed in the specified playback direction and at the specified playback speed. Then, decoding is performed and streams are played back and output.

More specifically, among a plurality of GOPs transferred and stored in the memory 18, the CPU 20 reads the structures of a GOP to be decoded and the subsequent GOP and then constructs the decode unit, which serves as the decoding processing unit, by dividing and combining the GOPs based on the number of anchor frames. The CPU 20 then sends a control command to the PCI bridge 17 to control the PCI bridge 17 to read stream data for each decode unit from the memory 18 and to supply the read stream data to one of the decoders 22, 23, and 24.

Then, the CPU 20 carries out scheduling as described above. In this case, as in GOP(0-1) discussed with reference to FIG. 48, 54, or 57, to decode anchor frames of the corresponding decode unit, if it is necessary that at least part of anchor frames of another decode unit be decoded, the anchor frames of that decode unit are also set in the input picture queue, and they are sequentially set from the head of the I/P-picture decode queue. However, anchor frames required for decoding anchor frames of another decode unit are not set in the display order setting queue since they are not displayed.

The CPU 20 then controls the decoder 22, 23, or 24 to perform decoding by referring to the register value indicating the decoder that receives the subsequent data. The elementary-stream address determining unit 73 of the decoder 22, 23, or 24 allows, under the control of the controller 20, the memory controller 74 to read the picture data corresponding to the picture ID set in the time-information I/P-picture decode queue from the input buffer 75 and to supply the read data to the decode processor 77.

If the picture to be decoded is an I-picture, the CPU 20 controls the decode processor 77 to decode the I-picture supplied from the memory controller 74 and also controls the write-image address determining unit 78 to supply the decoded frame data to the memory controller 81 and to store it in a bank specified for storing I-pictures of the video bank memory 82. If the picture to be decoded is a P-picture, the CPU 20 controls the reference-image address determining unit 79 to allow the memory controller 81 to read the reference image stored in the video bank memory 82 based on the reference bank position of the P-picture and to supply the read reference image to the decode processor 77 and controls the decode processor 77 to decode the P-picture supplied from the memory controller 74. The CPU 20 also controls the write-image address determining unit 78 to supply the decode frame data to the memory controller 81 and to store it in a bank specified for storing P-pictures of the video bank memory 82. If the picture to be decoded is a B-picture, the CPU 20 controls the reference-image address determining unit 79 to allow the memory controller 81 to read the reference images stored in the video bank memory 82 based on the reference bank positions of the B-picture and to supply the read reference images to the decode processor 77, and controls the decode processor 77 to decode the B-picture supplied from the memory controller 74.

Figure 60:
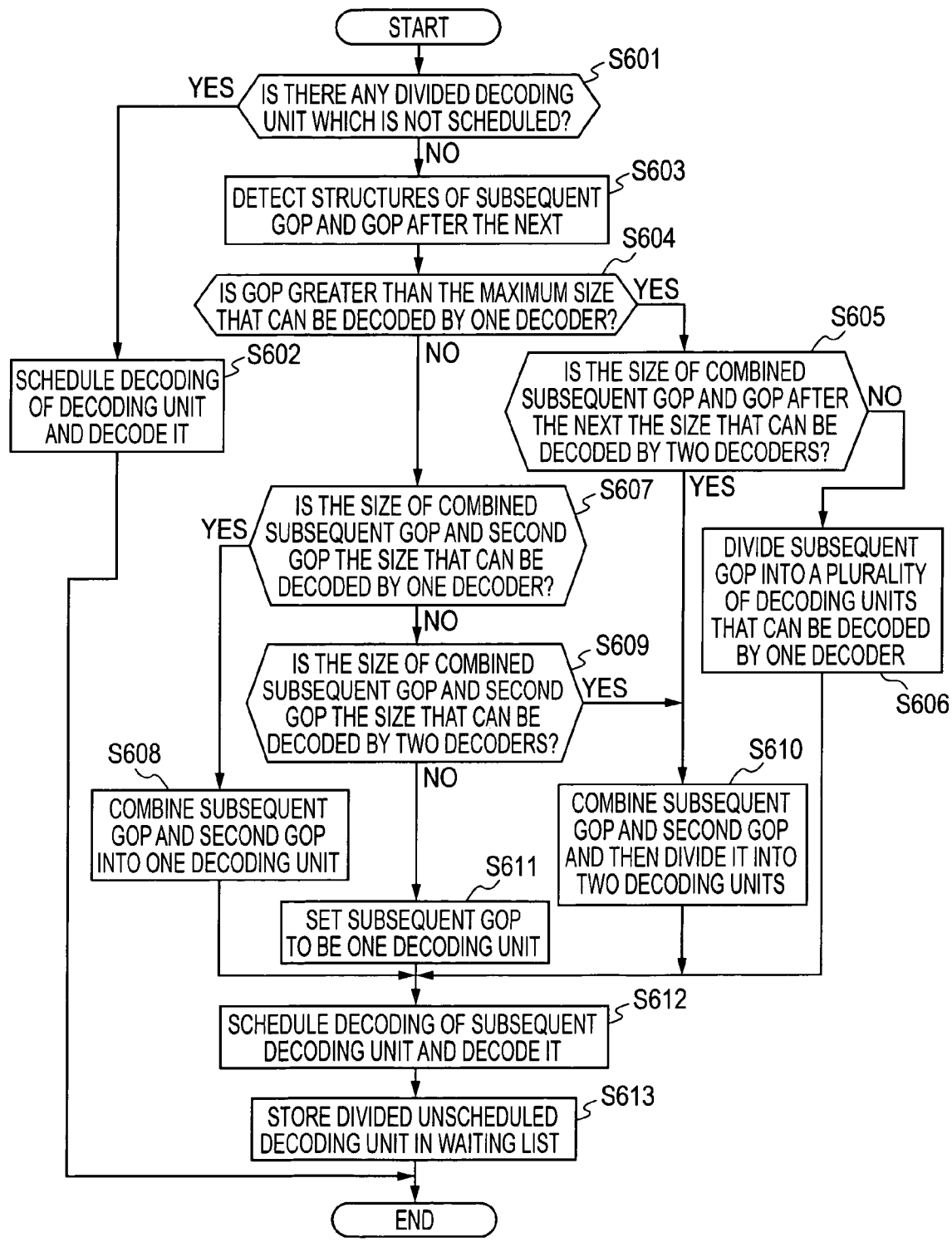
FIG. 60 is a flowchart illustrating GOP dividing/combining processing.

The GOP dividing/combining processing when the number of pictures forming a GOP is other than 15 is described below with reference to the flowchart of FIG. 60.

In step S601, the CPU 20 determines whether there is any decode unit that has not been scheduled after dividing a GOP.

If an unscheduled decode unit is found in step S601, the process proceeds to step S602 in which the CPU 20 carries out scheduling of the unscheduled decode unit by performing the frame processing 1 shown in FIG. 4 or the frame processing 2 shown in FIG. 39 and decodes the decode unit.

If it is determined in step S601 that there is no unscheduled decode unit, the process proceeds to step S603 in which the CPU 20 detects the structures of the subsequent GOP and the GOP after the next, which have not been scheduled.

In step S604, the CPU 20 determines whether the subsequent GOP is greater than the maximum size that can be decoded by one decoder. More specifically, the CPU 20 checks the number of anchor frames of the subsequent GOP and compares the checked number of anchor frames with the number of banks for decoding anchor frames in one decoder to determine whether the subsequent GOP is greater than the maximum size.

If it is determined in step S604 that the subsequent GOP is greater than the maximum size that can be decoded by one decoder, the process proceeds to step S605 to determine whether the combined size of the subsequent GOP and the GOP after the next is the size that can be decoded by two decoders. More specifically, if the video bank memory 82 has 8 banks, the CPU 20 determines whether the number of anchor frames of the combined GOP is 10 or less, i.e., twice or less than the number obtained by subtracting three from the number of banks in the video bank memory 82.

If it is determined in step S605 that the combined size is a suitable size that can be decoded by two decoders (for example, when a long GOP having 6 or more anchor frames and a short GOP having 4 or less anchor frames are continued, as described with reference to FIGS. 54 through 56B), the process proceeds to step S610.

If it is determined in step S605 that the combined GOP is not a size that can be decoded by two decoders, the process proceeds to step S606. In step S606, the CPU 20 divides the subsequent GOP into a plurality of decode units that can be decoded by one decoder, as in a long GOP having 30 pictures discussed with reference to FIGS. 48 through 50B. The process then proceeds to step S612.

If it is determined in step S604 that the subsequent GOP is not greater than the maximum size that can be decoded by one decoder, the process proceeds to step S607 to determine whether the combined size of the subsequent GOP and the GOP after the next is a suitable size that can be decoded by one decoder.

If it is determined in step S607 that the combined size is a size that can be decoded by one decoder, the process proceeds to step S608. In step S608, the subsequent GOP and the GOP after the next are combined into one decode unit, as in the case where GOPs, each having 4 or less anchor frames, are continued, as described with reference to FIGS. 51 through 53B. The process then proceeds to step S612.

If it is determined in step S607 that the combined size does not become a size that can be decoded by one decoder, the process proceeds to step S609 to determine whether the combined size is a size that can be decoded by two decoders. More specifically, if a short GOP having 4 or less anchor frames and a long GOP having 6 or more anchor frames are continued, as discussed with reference to FIGS. 57 through 59B, and if the video bank memory has 8 banks, the CPU 20 determines whether the number of anchor frames of the combined GOP is 10 frames or less, i.e., twice or less than the number obtained by subtracting 3 from the number of banks in the video bank memory 82.

If it is determined in step S605 or S609 that the combined size becomes a size that can be decoded by two decoders, the process proceeds to step S610. In step S610, the CPU 20 combines the two GOPs and then re-divides them into two decode units, as discussed with reference to FIGS. 54 through 56B or FIGS. 57 through 59B. The process then proceeds to step S612.

If it is determined in step S609 that the combined size does not become a size that can be decoded by two decoders, the process proceeds to step S611 in which the CPU 20 sets the subsequent GOP as one decode unit.

After step S606, S608, S610, or S611, the process proceeds to step S612 in which the CPU 20 schedules the decoding of the subsequent decode unit by performing the frame processing 1 shown in FIG. 4 or the frame processing 2 shown in FIG. 39, and decodes the decode unit.

Then, in step S613, if there is any unscheduled divided decode unit, the CPU 20 stores it in a waiting list. The processing is then completed.

According to the above-described GOP dividing/combining processing, even if the number of pictures forming a GOP is other than 15 or even if the number of pictures is different depending on the GOP, the dividing or combining of GOPs can be performed to achieve fast decoding processing.

In the above-described example, the dividing or combining of GOPs to achieve efficient scheduling when the video bank memory 82 of the decoder 22, 23, or 24 has 8 banks and when 6 banks of the 8 banks are fixed for decoding anchor frames has been described. Even if the number of banks (frames) to be stored in the video bank memory 82 is other than 8 or even if the number of banks fixed for decoding anchor frames is other than 6, the dividing or combining of GOPs is suitably performed in accordance with the number of banks in the video bank memory 82 or the number of banks fixed for decoding anchor frames. More specifically, if the number of banks fixed for decoding anchor frames is less than 6, the decode unit is set so that the number of anchor frames contained in one decode unit becomes less than 6. Conversely, if the number of banks fixed for decoding anchor frames is more than 6, the decode unit is set so that the number of anchor frames contained in one decode unit becomes smaller than the number of banks.

Figure 61:
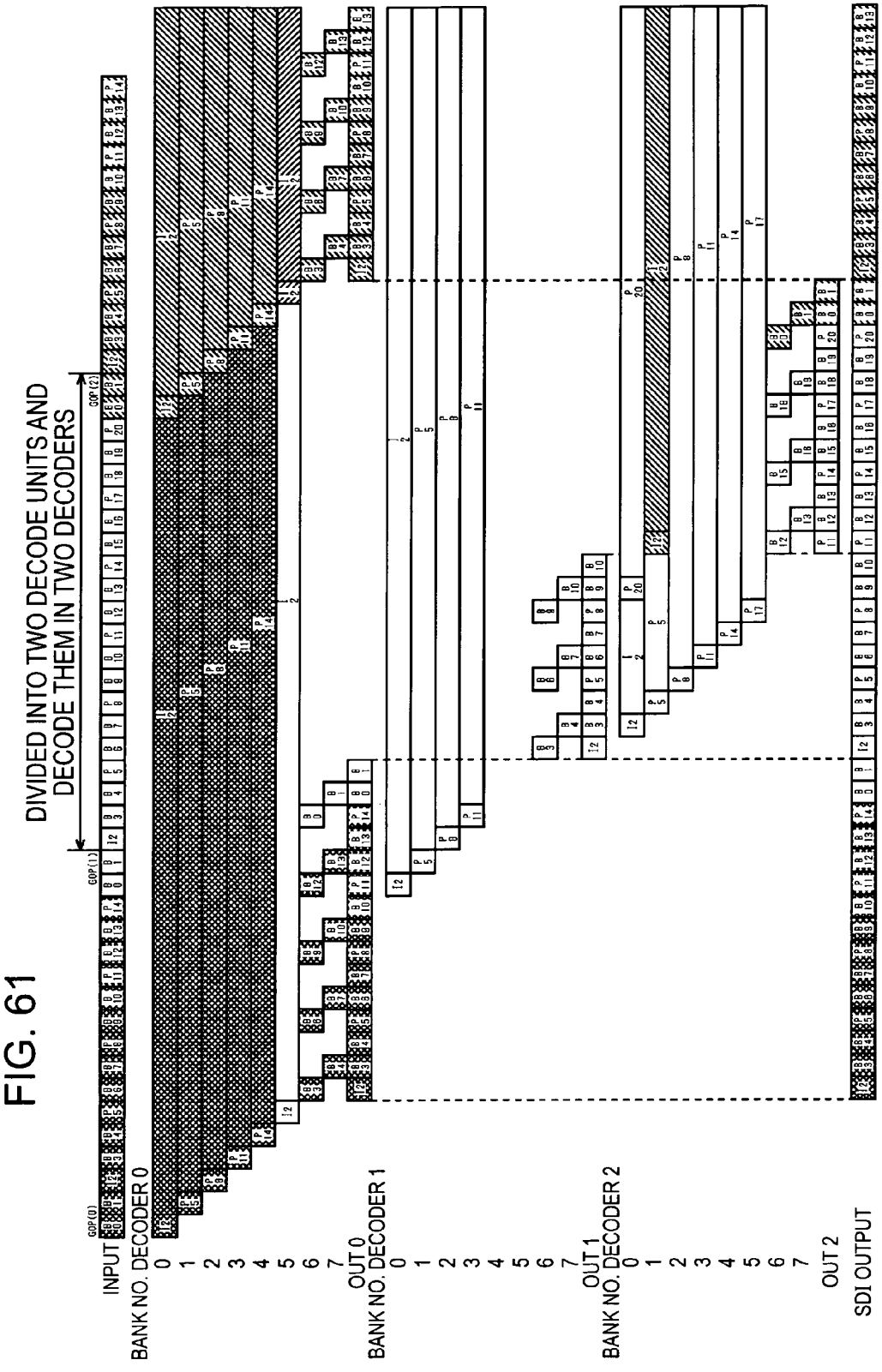
FIGS. 61 and 62 illustrate decoding processing by a decode unit formed by dividing GOPs.

According to the GOP dividing/combining processing, decoding processing can be performed without any problem, as shown in FIG. 61, on a GOP including 21 frames shown in FIG. 44 in the ×1 playback operation.

More specifically, GOP(1) including 21 frames is divided into two decode units, i.e., a first decode unit and a second decode unit, which are then decoded by decoder 1 and decoder 2. In this case, after decoding anchor frames of the first decode unit that are not output from decoder 2 in order to decode anchor frames of the second decode unit, the anchor frames of the second decode unit are decoded by using banks fixed for anchor frames (by overwriting the anchor frames of the first decode unit if necessary).

Figure 62:
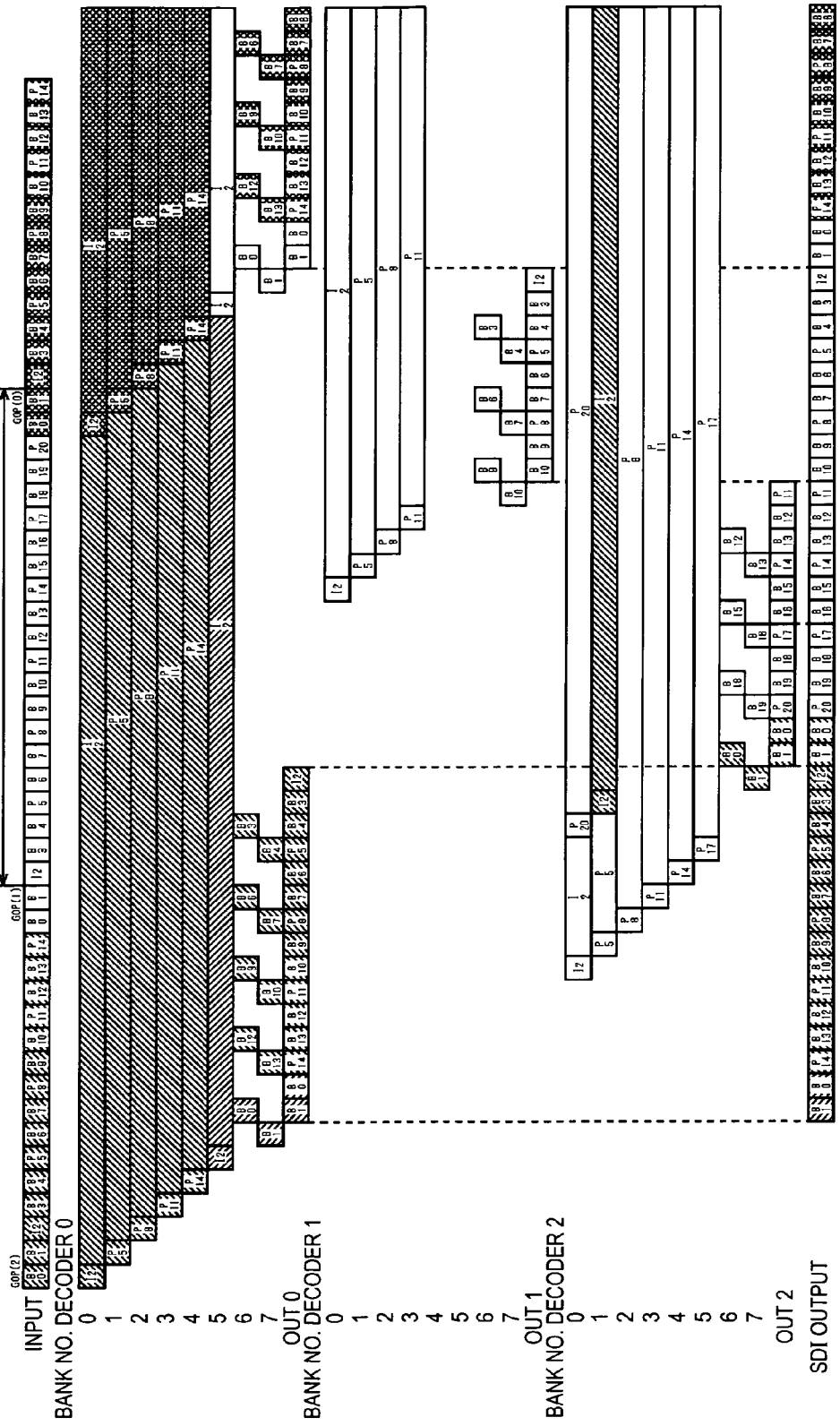

Similarly, decoding processing can be performed without any problem, as shown in FIG. 62, on a GOP including 21 frames shown in FIG. 45 in the ×−1 playback operation.

More specifically, GOP(1) including 21 frames is divided into two decode units, i.e., a first decode unit and a second decode unit, which are then decoded by decoder 2 and decoder 1. In this case, after decoding anchor frames of the first decode unit that are not output from decoder 2 in order to decode anchor frames of the second decode unit, the anchor frames of the second decode unit are decoded by using banks fixed for anchor frames (by overwriting the anchor frames of the first decode unit if necessary).

Figure 63:
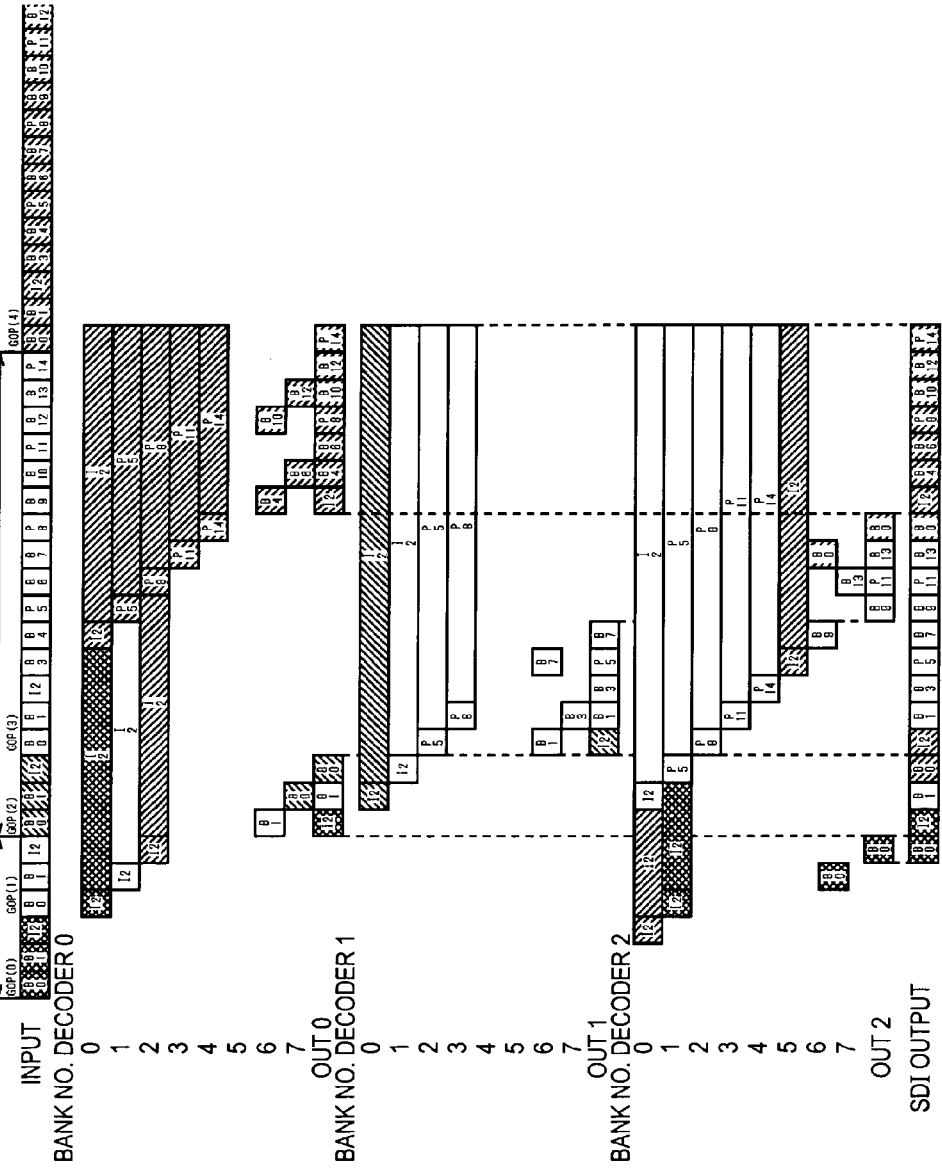
FIGS. 63 and 64 illustrate decoding processing by a decode unit formed by combining GOPs and dividing them.

Similarly, decoding processing can be performed without any problem, as shown in FIG. 63, when a GOP having a small number of anchor frames and a GOP having a large number of anchor frames are continued, as shown in FIG. 46, in the ×2 playback operation.

More specifically, GOP(0) and GOP(1), each including B0, B1, and I2, are combined into one decode unit, and GOP(2) including B0, B1, and I2 and GOP(3) including 15 frames from B0 through P14 are combined and are then re-divided.

Between B0 and B1 of the combined decode unit of GOP (0) and GOP(1) (B0 and B1 of GOP(0)), B(0), which is to be displayed and I2, which is a reference image required for decoding B(0), are decoded in decoder 2 together with the previous GOP or the previous decode unit. Between B0 and B1 of the combined decode unit of GOP(2) and the first half of GOP(3) (B0 and B1 of GOP(2)), B(0), which is to be displayed, and I2, which is a reference image required for decoding B(0), are decoded in decoder 0 together with the combined decode unit of GOP(0) and GOP(1). B(7), which is the head of B-pictures to be displayed of the decode unit of the second half of GOP(3), is decoded in decoder 1 together with the combined decode unit of GOP(2) and the first half of GOP(3). Between B0 and B1 of GOP(4), B0, which is to be displayed, and I2, which is a reference image required for decoding B0, are decoded in decoder 2 together with the decode unit of the second half of GOP(3). I2 and the subsequent pictures of GOP(4) are decoded in decoder 0.

Figure 64:
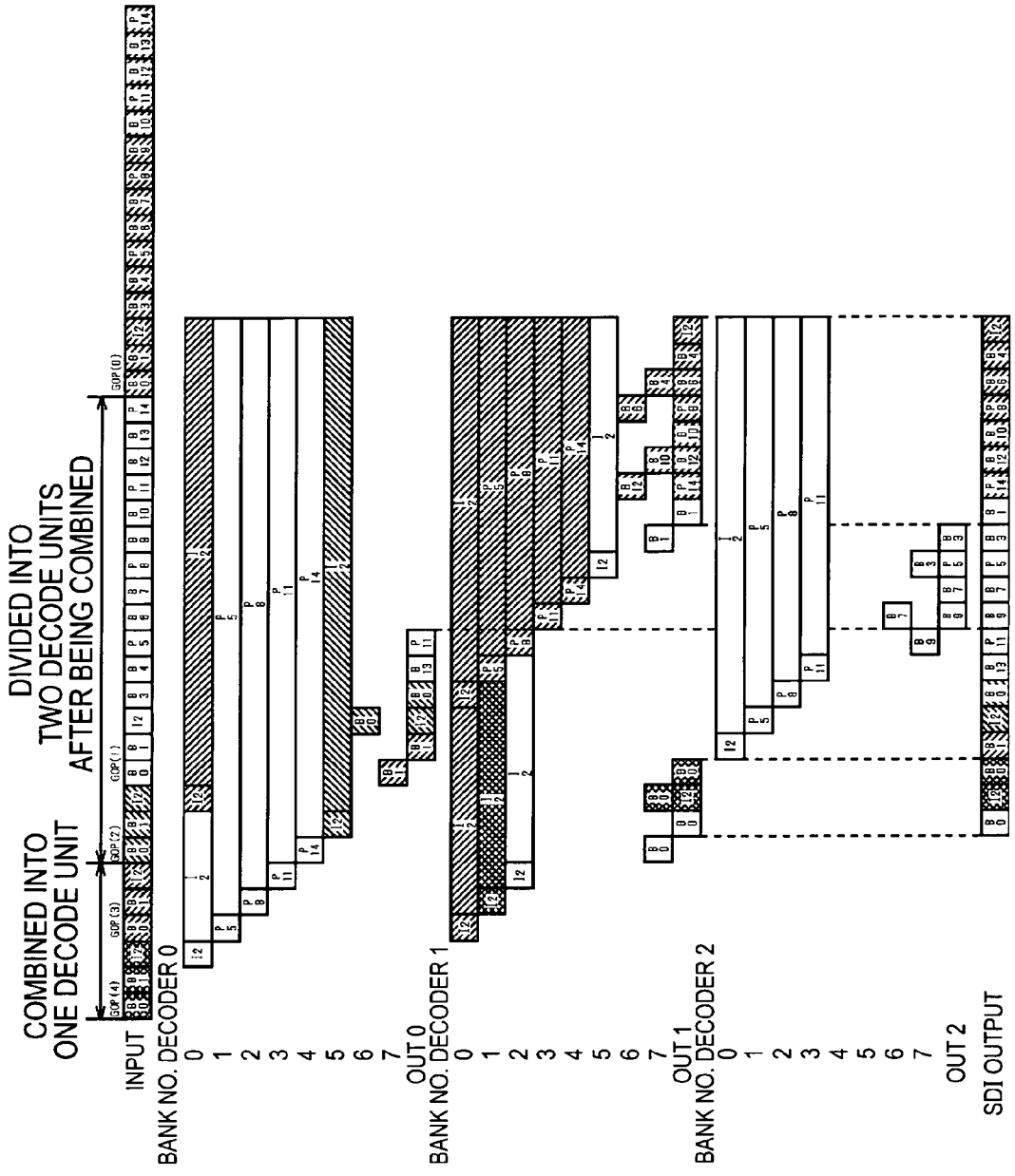

Similarly, decoding processing can be performed without any problem, as shown in FIG. 64, when a GOP having a small number of anchor frames and a GOP having a large number of anchor frames are continued, as shown in FIG. 47, in the ×−2 playback operation.

More specifically, GOP(4) and GOP(3), each including B0, B1, and I2, are combined into one decode unit, and GOP(2) including B0, B1, and I2 and GOP(1) including 15 frames from B0 through P14 are combined and are then re-divided.

The pictures of the combined decode unit of GOP(4) and GOP(3) other than B0 and B1 (B0 and B1 of GOP(3)), a B-picture (B0 in FIG. 64) to be displayed between the two B-pictures in the previous decode unit, and I2, which is a reference image required for decoding B(0), are decoded in decoder 1. Between B0 and B1 of the combined decode unit of GOP(4) and GOP(3) (B0 and B1 of GOP(3)), B(0), which is to be displayed, and I2, which is a reference image required for decoding B(0), are decoded in decoder 0 together with the combined decode unit of GOP(2) and the second half of GOP(1). Between B9 and B10 (B9 and B10 of GOP(1)) of the combined decode unit of GOP(2) and the second half of GOP(1), B9, which is to be displayed, and P8 and P11, which are reference images required for decoding B9, are decoded in decoder 2 together with the subsequent decode unit, i.e., the first half of GOP(1). B(1), which is the head of B-pictures to be displayed of the decode unit of the first half of GOP(1), is decoded in decoder 1 together with GOP(0).

As described above, the CPU 20 suitably divides or combines GOPs based on the number of anchor frames to form a decode unit having a number of anchor frames in accordance with the number of banks of the video bank memory 82 provided for the decoder 22, 23, or 24. The CPU 20 then controls the PCI bridge 17 to supply a stream of each decode unit to the decoder 22, 23, or 24, and performs decode scheduling or display scheduling for each decode unit, and then controls the decoder 22, 23, or 24 to perform decoding. With this arrangement, even if the number of anchor frames is different depending on the GOP, the playback apparatus 1 can perform fast decode processing by reliably decoding all frames without causing any delay in decoding processing.

After dividing GOPs, in the second decode unit, i.e., in the decode unit having anchor frames that should be decoded after decoding the anchor frames of the previous decode unit, if the number of anchor frames of the second decode unit is 6, the displacement of the display start timing from the decode start timing for decoding the anchor frames of the second decode unit is 6 pictures if the head of the decode unit is an I-picture or P-picture, and is 7 pictures if the head is a B-picture. If the number of anchor frames in the second decode unit is n frames (n is 5 or less), the displacement of the display start timing from the decode start timing is changed based on the number of anchor frames, i.e., it is n frames if the head is an I-picture or P-picture and is n+1 frames if the head is a B-picture.

In the above description, the number of anchor frames contained in one decode unit is set to be the same or smaller than the number of banks fixed for decoding anchor frames. More preferably, by comparing the number of anchor frames of a subject decode unit with that of the previous decode unit, the number of anchor frames is set such that it does not become greater than that of the previous decode unit by m frames (m is an integer greater than 1, which can be set experimentally or empirically, and more preferably, 2 to 4).

For example, if a GOP having one anchor frame and a GOP having 10 anchor frames are continued, the total number of the anchor frames of the two GOPs is 11, and it is difficult to form two decode units from those two GOPs. Accordingly, decoding is conducted such that "one anchor frame+1", "5 anchor frames+1", and "5 anchor frames+1", thereby causing a delay in the decoding processing.

Thus, by comparing the number of anchor frames of the decode unit with that of the previous decode unit, the number of anchor frames is set such that it does not become greater than that of the previous decode unit by 2 or more. In this case, when the total number of anchor frames of the two GOPs is 11, decoding is conducted such that "one anchor frame+1", "3 anchor frames+1", "3 anchor frames+1", and "4 anchor frames+1". Thus, a delay does not occur in the decoding processing.

Additionally, in the above-described processing (regardless of whether the above-described two omission processing routines are performed or only one omission processing routine is performed), the following flag sets may be provided as metadata for the compression-coded video data stored in the HDD 16. A read flag set indicates whether compression-coded video data stored in the HDD 16 is effective as data to be read from the HDD 16, a decode flag set indicates whether the coded data is effective as data to be decoded based on decode scheduling, and a display flag set indicates whether the coded data is effective as data to be displayed based on the display scheduling. Then, the flag sets are automatically updated according to the playback speed or playback direction, thereby enhancing the management of scheduling.

In this case, a series of scheduling and flag sets used for previous variable-speed playback operations may be separately managed as scheduling metadata (log information). If necessary, the metadata may be embedded in the compression-coded video data as the syntax or recorded in a recording medium, such as the HDD 16.

The number of decoders, the number of banks, the decoder IDs, etc. may be managed as metadata (structure log information). Additionally, the playback speed and playback direction may be managed as metadata (playback log information). In this case, the metadata may be embedded in the compression-coded video data as the syntax, or may be recorded in a recording medium, such as the HDD 16.

By referring to the metadata (log information), the past schedule processing can be reused, thereby making schedule processing faster and more precise.

The above-described metadata may be managed in an external device as a database.

In the above-described embodiment, it is not necessary that the decoder 22, 23, or 24 completely decode compression-coded video data stored in the HDD 16.

More specifically, in the embodiment of the present invention, the decoder 22, 23, or 24 may only decode and dequantize variable-length codes without performing inverse discrete cosine transform (IDCT) or the decoder 22, 23, or 24 may dequantize variable-length codes without decoding them. In this case, the decoder 22, 23, or 24 may generate log information indicating to which degree (for example, to dequantizing) the coding or decoding processing has been executed, and outputs the log information in association with the incompletely decoded data.

Additionally, in the foregoing embodiment, incompletely coded data (for example, data subjected to DCT and quantization without being subjected to variable-length coding) and, if necessary, log information concerning the coding and decoding processing, may be stored in the HDD 16. In this case, the decoder 22, 23, or 24 may decode the incompletely coded data and convert it into a baseband signal under the control of the CPU 20.

More specifically, the decoder 22, 23, or 24 may perform IDCT and dequantization without decoding variable-length codes on incompletely coded data which is subjected to DCT conversion and quantization without being subjected to variable-length coding.

In this case, the CPU 20 may obtain log information concerning the coding and decoding processing stored in the HDD 16 in association with the incompletely coded data, and conducts decoding scheduling based on the obtained log information.

In the foregoing embodiment, incompletely coded data, and if necessary, log information concerning coding and decoding processing, may be stored in the HDD 16, and it is not necessary that the decoder 22, 23, or 24 decode completely the incompletely coded data under the control of the CPU 20.

In this case, too, for example, the CPU 20 may obtain log information concerning the coding and decoding processing stored in the HDD 16 in association with the incompletely coded data, and conducts decoding scheduling based on the obtained log information. The decoder 22, 23, or 24 may also generate log information concerning the coding and decoding processing and outputs it in association with the incompletely decoded data.

In other words, the decoder 22, 23, or 24 may partially conduct decoding (execute part of the steps of the decoding processing) under the control of the CPU 20. The CPU 20 may obtain log information concerning the coding and decoding processing stored in the HDD 16 in association with the incompletely coded data and executes scheduling for decoding performed by the decoder 22, 23, or 24 based on the obtained log information. If necessary, the decoder 22, 23, or 24 may generate log information concerning the coding and decoding processing and outputs the log information in association with the incompletely decoded data.

In the HDD 16, log information concerning the coding and decoding processing may also be stored in association with compression-coded stream data, and the CPU 20 can execute decoding scheduling based on the log information. Even when the decoder 22, 23, or 24 can decode compression-coded stream data under the control of the CPU 20 and convert it into a baseband signal, log information concerning the coding and decoding processing may be generated, if necessary, and is output in association with the baseband signal.

Although in the above-described embodiment the playback apparatus 1 contains a plurality of decoders therein, decoders may be separately provided from the playback apparatus 1.

In this case, each independent decoder can receive and decode compression-coded video data, and display and output the resulting data. Additionally, as described above, each decoder may receive and partially decode compression-coded video data, and outputs the decoded data to an external source together with log information concerning the coding and decoding processing. Alternatively, each decoder may receive and decode partially coded data and converts it into a baseband signal, and outputs it to an external source. Alternatively, each decoder may receive and partially decode partially compression-coded video data and outputs the decoded data to an external source together with log information concerning the coding and decoding processing.

In the foregoing embodiment, the CPU 11 and the CPU 20 are separately provided. However, the CPU 11 and the CPU 20 may be integrated into one CPU for controlling the overall playback apparatus 1, or even if the CPU 11 and the CPU 20 are separately configured, they may be integrated into one chip.

If the CPU 11 and the CPU 20 are separately provided, at least part of the processing executed by the CPU 11 in the foregoing embodiment may be executed by the CPU 20 in a time-sharing manner. Alternatively, part of the processing executed by the CPU 20 may be executed by the CPU 11 in a time-sharing manner. That is, processors that can execute distribute processing may be used as the CPU 11 and the CPU 20.

Alternatively, the playback apparatus 1 may be configured to connect to a network, and at least part of the processing executed by the CPU 11 or the CPU 20 in the above-described embodiment may be executed by a CPU of another apparatus connected to the network.

Similarly, although in the foregoing embodiment the memory 13 and the memory 21 are provided separately, they may be integrated into one memory in the playback apparatus 1.

In the foregoing embodiment, the HDD 16, the decoders 22, 23, and 24, and the selector 25 are connected to each other via the bridges and buses so that they are integrated into the playback apparatus 1. However, some of those elements may be connected externally by wiring or wireless means, or those elements may be connected to each other in another connection mode.

Although in the foregoing embodiment the compressed stream data is stored in the HDD 16, it may be stored in another recording medium, such as an optical disc, a magneto-optical disk, a semiconductor memory, or a magnetic disk.

The CPU 20, the memory 21, the memory 18, the decoders 22, 23, and 24, and the selector 25 are mounted on the same expansion card, for example, a PCI card or a PCI-express card. However, those elements may be separately mounted on different expansion cards if the transfer rate between the cards is high by using, for example, a PCI-express technique.

A coding method other than MPEG, for example, H264/AVC, may be used.

The above-described series of processing jobs may be executed by hardware or software. If software is used, a corresponding software program is installed from a recording medium into a computer built in dedicated hardware or a computer, such as a personal computer, that can execute various functions by installing various program thereinto. In this case, the playback apparatus 1 shown in FIG. 1 can be formed by, for example, a personal computer 201 shown in FIG. 65.

In the personal computer 201 shown in FIG. 65, a central processing unit (CPU) 211 executes various processing jobs according to programs stored in a read only memory (ROM) 212 or programs loaded from a storage unit 218 into a random access memory (RAM) 213. In the RAM 213, data required for executing processing by the CPU 211 is also stored.

The CPU 211, the ROM 212, and the RAM 213 are connected to each other via a bus 214. An input/output interface 215 is also connected to the bus 214.

An input unit 216, such as a keyboard and a mouse, an output unit 217, such as a display or a speaker, the storage unit 218, such as a hard disk, and a communication unit 219, such as a modem or a terminal adapter, are connected to the input/output interface 215. The communication unit 219 performs communication via a network, such as the Internet.

A drive 220 is also connected to the input/output interface 215 if necessary, and a magnetic disk 231, an optical disc 232, a magneto-optical disk 233, or a semiconductor memory 234 is installed in the drive 220 if necessary, and a computer program read from such a recording medium is installed into the storage unit 218.

As described above, if software is used for performing a series of processing jobs, a corresponding software program may be installed into a computer from a recording medium or via a network.

Such a recording medium may be a package medium storing the program therein, distributed for providing the program to the user separately from the apparatus, such as the magnetic disk 231 (including a floppy disk), the optical disc 232 (including a compact disk read only memory (CD-ROM) or a digital versatile disk (DVD)), the magneto-optical disk 233 (including a mini disk (MD) (registered trademark)), or the semiconductor memory 234. Alternatively, the recording medium may be the ROM 212 or a hard disk contained in the storage unit 218 storing the program therein, which is supplied to the user while being built in the apparatus.

In this specification, steps forming the program recorded in a recording medium include processing performed in chronological order as described in the specification, and they also include processing executed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for decoding compression-coded video data, comprising:
   at least one decode means for decoding the compression-coded video data;
   supply control means for controlling the supply of the compression-coded video data to the decode means; and
   control means for controlling processing executed by the supply control means and the decode means,
   wherein the control means determines the order of decoding processing performed by the decode means so that, among pictures contained in a decoding processing unit for the decoding processing performed by the decode means, I-pictures and P-pictures are decoded before B-pictures,
   the control means selects pictures to be output from the decode means from among the pictures contained in the decoding processing unit on the basis of a playback speed instruction provided by playback speed instruction means, and
   when the picture at the head of the decoding processing unit is a B-picture among decoded pictures output from the decode means, the control means controls the decode means so that a decode start timing at which the decode means starts decoding and a display output timing at which the decode means starts outputting the decoded pictures are displaced from each other by a first predetermined number of pictures.

2. The information processing apparatus according to claim 1, wherein the decode means includes:
   decode processing execution means for executing decoding processing, and
   picture supply control means for controlling the supply of pictures to the decode processing execution means,
   the picture supply control means supplies, under the control of the control means, the I-pictures and the P-pictures, and B-pictures to be selected as pictures output from the decode means to the decode processing execution means among the pictures contained in the decoding processing unit, and
   the decode processing execution means decodes the pictures supplied from the picture supply control means and also outputs the pictures selected as pictures to be output from the decode means under the control of the control means.

3. The information processing apparatus according to claim 1, wherein a plurality of the decode means are provided, the information processing apparatus further comprising:
   output switch means for receiving non-compressed data output from the plurality of decode means and for selectively outputting the received non-compressed data,
   wherein the control means further controls processing performed by the output switch means.

4. The information processing apparatus according to claim 1, wherein the decode means includes a bank memory for storing decoded pictures, the bank memory having a number of banks smaller than the number of pictures contained in the decoding processing unit, and
   the decode means performs decoding processing by using the decoded pictures stored in the bank memory as reference images if necessary.

5. The information processing apparatus according to claim 4, wherein the bank memory is capable of storing the number of pictures greater than the number of I-pictures and P-pictures contained in the decoding processing unit by two.

6. The information processing apparatus according to claim 4, wherein the number of the decode means is three, and each of the decode means includes the bank memory which is capable of storing 8 pictures.

7. The information processing apparatus according to claim 4, wherein the control means controls the decode means to store the I-pictures and the P-pictures at fixed positions for the I-pictures and the P-pictures of the bank memory.

8. The information processing apparatus according to claim 4, wherein the compression-coded video data includes groups of pictures, and
   upon receiving a group of pictures including I-pictures or P-pictures having a number greater than a value obtained by subtracting three from the number of banks of the bank memory, the control means divides the group of pictures into decoding processing units, each including I-pictures or P-pictures having a number smaller than a value obtained by subtracting two from the number of banks of the bank memory, and controls the supply control means to supply the compression-coded video data of the decoding processing units to the decode means.

9. The information processing apparatus according to claim 8, wherein the control means forms the decoding processing units such that the total number of the I-pictures or the P-pictures contained in the divided decoding processing units does not become greater by a predetermined number or more than a total number of I-pictures or P-pictures contained in a temporally prior group of pictures or a temporally prior decoding processing unit.

10. The information processing apparatus according to claim 4, wherein the compression-coded video data includes groups of pictures, and
    upon receiving a first group of pictures including I-pictures or P-pictures having a number smaller than a value obtained by subtracting three from the number of banks of the bank memory, the control means detects a structure of a second group of pictures temporally continuous from the first group of pictures, and, if the total number of the I-pictures or the P-pictures contained in the first group of pictures and the second group of pictures is smaller than a value obtained by subtracting two from the number of banks of the bank memory, the control means combines the first group of pictures and the second group of pictures to form a decoding processing unit, and controls the supply control means to supply the compression-coded video data of the decoding processing unit to the decode means.

11. The information processing apparatus according to claim 10, wherein the control means forms the decoding processing unit such that the total number of the I-pictures or the P-pictures contained in the combined decoding processing unit does not become greater than a total number of I-pictures and P-pictures contained in a temporally prior group of pictures by a predetermined number or more.

12. The information processing apparatus according to claim 4, wherein the compression-coded video data includes groups of pictures, and the control means detects a structure of a first group of pictures and a structure of a second group of pictures temporally continuous from the first group of pictures, and if the total number of I-pictures or P-pictures contained in the first group of pictures and the second group of pictures is smaller than a twice a value obtained by subtracting three from the number of banks of the bank memory, the control means combines the first group of pictures and the second group of pictures and then divides the combined group of pictures to form a first decoding processing unit and a second decoding processing unit, each including the I-pictures or the P-pictures smaller than a value obtained by subtracting two from the number of banks of the bank memory, and the control means controls the supply control means to individually supply the compression-coded video data of the first decoding processing unit and the compression-coded video data of the second decoding processing unit to the decode means.

13. The information processing apparatus according to claim 12, wherein the control means forms the first decoding processing unit and the second decoding processing unit such that the total number of the I-pictures or the P-pictures contained in the first decoding processing unit and the second decoding processing unit does not become greater than a total number of I-pictures or P-pictures of a temporally prior decoding processing unit or a temporally prior group of pictures by a predetermined number or more.

14. The information processing apparatus according to claim 1, wherein, when the picture at the head of the decoding processing unit is an I-picture or a P-picture among decoded pictures output from the decode means, the control means controls the decode means so that a decode start timing at which the decode means starts decoding and a display output timing at which the decode means starts outputting the decoded pictures are displaced from each other by a second predetermined number of pictures.

15. The information processing apparatus according to claim 14, wherein the second predetermined number is greater than a total number of the I-pictures and the P-pictures by one.

16. The information processing apparatus according to claim 1, wherein the first predetermined number is greater than a total number of the I-pictures and the P-pictures by two.

17. The information processing apparatus according to claim 1, wherein the control means controls the decode means so that the decode start timing at which the decode means starts decoding and the display output timing at which the decode means starts outputting decoded pictures are displaced from each other by a second predetermined number of pictures when a playback speed and a playback direction instructed by the playback speed instruction means are normal and forward, respectively.

18. The information processing apparatus according to claim 17, wherein the second predetermined number is greater than a total number of the I-pictures and the P-pictures by one.

19. The information processing apparatus according to claim 1, wherein the control means controls the decode means so that the decode start timing at which the decode means starts decoding and the display output timing at which the decode means starts outputting decoded pictures are displaced from each other by a second predetermined number of pictures when a playback speed and a playback direction instructed by the playback speed instruction means are normal and reverse, respectively.

20. The information processing apparatus according to claim 19, wherein the second predetermined number is greater than a total number of the I-pictures and the P-pictures by two.

21. The information processing apparatus according to claim 1, wherein the control means determines a timing at which the decode means performs decoding processing so that a timing at which the B-pictures are decoded by the decode means is earlier than a timing at which the decoded B-pictures are output by one picture.

22. An information processing method for an information processing apparatus that decodes compression-coded video data, comprising:

obtaining, at the information processing apparatus that decodes compression-coded video data, a playback speed instruction;

determining, at the information processing apparatus that decodes compression-coded video data, the order of decoding processing for pictures contained in a decoding processing unit for performing the decoding processing so that I-pictures and P-pictures are decoded before B-pictures;

selecting, at the information processing apparatus that decodes compression-coded video data, pictures to be output from among the pictures contained in the decoding processing unit on the basis of the obtained playback speed instruction;

controlling, at the information processing apparatus that decodes compression-coded video data the supply of the I-pictures and the P-pictures, and B-pictures selected as pictures to be output from among the pictures contained in the decoding processing unit to a decoder;

decoding, at the information processing apparatus that decodes compression-coded video data, the pictures supplied to the decoder;

controlling, at the information processing apparatus that decodes compression-coded video data, an output of the pictures selected as pictures to be output from among the decoded pictures; and when the picture at the head of the decoding processing unit is a B-picture among decoded pictures output from the decode means, controlling, at the information processing apparatus that decodes compression-coded video data, a decode start timing at which the decoding is started and a display output timing at which outputting the decoded pictures are displaced from each other by a predetermined number of pictures.

23. An information processing apparatus for decoding compression-coded video data, comprising:

at least one decoder unit that decodes the compression-coded video data;

a supply control unit that controls the supply of the compression-coded video data to the decoder unit; and a control unit that controls processing executed by the supply control unit and the decoder unit, wherein the control unit determines the order of decoding processing performed by the decoder unit so that, among pictures contained in a decoding processing unit for the decoding processing performed by the decoder unit, I-pictures and P-pictures are decoded before B-pictures, the control unit selects pictures to be output from the decoder unit from among the pictures contained in the decoding processing unit on the basis of a playback speed instruction provided by a playback speed instruction unit, and when the picture at the head of the decoding processing unit is a B-picture among decoded pictures output from the decoder unit, the control unit controls the decoder unit so that a decode start timing at which the decoder unit starts decoding and a display output timing at which the decoder unit starts outputting the decoded pictures are displaced from each other by a first predetermined number of pictures.

24. A computer readable storage medium encoded with instruction, which when executed by an information processing apparatus that decodes compression-coded video data, causes the information processing apparatus to implement a method comprising:

obtaining, at the information processing apparatus that decodes compression-coded video data, a playback speed instruction;

determining, at the information processing apparatus that decodes compression-coded video data, the order of decoding processing for pictures contained in a decoding processing unit for performing the decoding processing so that I-pictures and P-pictures are decoded before B-pictures;

selecting, at the information processing apparatus that decodes compression-coded video data, pictures to be output from among the pictures contained in the decoding processing unit on the basis of the obtained playback speed instruction;

controlling, at the information processing apparatus that decodes compression-coded video data, the supply of the I-pictures and the P-pictures, and B-pictures selected as pictures to be output from among the pictures contained in the decoding processing unit to a decoder;

decoding, at the information processing apparatus that decodes compression-coded video data, the pictures supplied to the decoder;

controlling, at the information processing apparatus that decodes compression-coded video data, an output of the pictures selected as pictures to be output from among the decoded pictures; and when the picture at the head of the decoding processing unit is a B-picture among decoded pictures output from the decode means, controlling, at the information processing apparatus that decodes compression-coded video data, a decode start timing at which the decoding is started and a display output timing at which outputting the decoded pictures are displaced from each other by a predetermined number of pictures.

* * * * *